US011063655B1

(12) United States Patent
Babaei

(10) Patent No.: US 11,063,655 B1
(45) **Date of Patent: *Jul. 13, 2021**

(54) RANDOM ACCESS AND CONSISTENT LBT FAILURE RECOVERY

(71) Applicant: PanPsy Technologies, LLC, Fairfax, VA (US)

(72) Inventor: Alireza Babaei, Fairfax, VA (US)

(73) Assignee: PanPsy Technologies, LLC, Fairfax, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/200,992

(22) Filed: Mar. 15, 2021

Related U.S. Application Data

(63) Continuation of application No. 17/113,851, filed on Dec. 7, 2020, now Pat. No. 10,979,128.

(60) Provisional application No. 62/945,154, filed on Dec. 7, 2019.

(51) Int. Cl.

| | |
|---|---|
| ***H04B 7/08*** | (2006.01) |
| ***H04W 76/19*** | (2018.01) |
| ***H04W 74/08*** | (2009.01) |
| ***H04W 52/36*** | (2009.01) |
| ***H04W 80/02*** | (2009.01) |

(52) U.S. Cl.
CPC ............ *H04B 7/088* (2013.01); *H04W 52/36* (2013.01); *H04W 74/0816* (2013.01); *H04W 76/19* (2018.02); *H04W 80/02* (2013.01)

(58) Field of Classification Search
CPC ....... H04L 5/001; H04L 5/0091–0098; H04W 72/04–0493; H04W 74/08–0891
See application file for complete search history.

(56) References Cited

U.S. PATENT DOCUMENTS

| | | | |
|---|---|---|---|
| 2019/0200248 A1 | 6/2019 | Mallick et al. | |
| 2020/0154480 A1 | 5/2020 | Jose et al. | |
| 2020/0221495 A1 | 7/2020 | Chen et al. | |
| 2020/0314903 A1 | 10/2020 | Jang et al. | |
| 2021/0029768 A1 * | 1/2021 | Shih .................. | H04W 72/0453 |

(Continued)

OTHER PUBLICATIONS

3GPP TS 38.211 V15.7.0 (Sep. 2019); Technical Specification; 3rd Generation Partnership Project; Technical Specification Group Radio Access Network; NR; Physical channels and modulation; (Release 15).

(Continued)

*Primary Examiner* — Marcus Smith
(74) *Attorney, Agent, or Firm* — Alireza Babaei

(57) ABSTRACT

A wireless device receives configuration parameters comprising first random access parameters, associated with beam failure recovery, and second random access parameters. The wireless device may initiate, in response to detecting a beam failure on a primary cell and based on the first random access parameters, a first random access process on a first BWP of the primary cell. The wireless device may stop the first random access process in response to triggering consistent LBT failure for the primary cell. The wireless device may switch from the first BWP to a second BWP of the primary cell as an active BWP. The wireless device may initiate a second random access process on the second BWP for consistent LBT failure recovery and based on the second random access parameters.

20 Claims, 47 Drawing Sheets

(56) References Cited

U.S. PATENT DOCUMENTS

2021/0144762 A1* 5/2021 Tsai ........................ H04L 5/001

OTHER PUBLICATIONS

3GPP TS 38.212 V15.7.0 (Sep. 2019); Technical Specification; 3rd Generation Partnership Project; Technical Specification Group Radio Access Network; NR; Multiplexing and channel coding; (Release 15).
3GPP TS 38.213 V15.7.0 (Sep. 2019); Technical Specification; 3rd Generation Partnership Project; Technical Specification Group Radio Access Network; NR; Physical layer procedures for control; (Release 15).
3GPP TS 38.214 V15.7.0 (Sep. 2019); Technical Specification; 3rd Generation Partnership Project; Technical Specification Group Radio Access Network; NR; Physical layer procedures for data; (Release 15).
3GPP TS 38.300 V15.7.0 (Sep. 2019); Technical Specification; 3rd Generation Partnership Project; Technical Specification Group Radio Access Network; NR; NR and NG-RAN Overall Description; Stage 2; (Release 15).
3GPP TS 38.321 V15.7.0 (Sep. 2019); Technical Specification; 3rd Generation Partnership Project; Technical Specification Group Radio Access Network; NR; Medium Access Control (MAC) protocol specification; (Release 15).
3GPP TS 38.331 V15.7.0 (Sep. 2019); Technical Specification; 3rd Generation Partnership Project; Technical Specification Group Radio Access Network; NR; Radio Resource Control (RRC); Protocol specification; (Release 15 ).
3GPP RAN WG2 Meeting #107; R2-1909604; Prague, Czech Republic, Aug. 26-30, 2019 Revision of R2-1906403; Agenda Item: 11.2.1.2; Source: InterDigital; Title: Handling UL LBT Failures in MAC; Document for: Discussion, Decision.
3GPP TSG-RAN WG2 Meeting #107bis; R2-1912095; Chongqing, China, Oct. 14-Oct. 18, 2019; Agenda Item: 6.2.2.2; Source: OPPO; Title: Remaining issues of detecting uplink LBT failure in NR-U; Document for: Discussion, Decision.
3GPP TSG-RAN WG2 Meeting #107bis; R2-1912096; Chongqing, China, Oct. 14-Oct. 18, 2019; Agenda Item: 6.2.2.2; Source: OPPO; Title: Uplink LBT failure recovery for NR-U; Document for: Discussion, Decision.
3GPP TSG-RAN WG2 Meeting #107bis; R2-1912177; Chongqing, China, Oct. 14-18, 2019; Source: vivo; Title: Remaining issues of uplink LBT failure; Agenda Item: 6.2.1.2; Document for: Discussion and Decision.
3GPP TSG-RAN WG2 Meeting #107bis; R2-1912178; Chongqing, China, Oct. 14-18, 2019; Source: vivo; Title: Issue on the autonomous BWP switching; Agenda Item: 6.2.1.2; Document for: Discussion and Decision.
3GPP TSG-RAN2#107bis; R2-1912304; Chongqing, China, Oct. 14-18, 2019; Agenda item: 6.2.1.4; Source: Qualcomm Incorporated; Title: Details of the Uplink LBT failure mechanism; Document for Discussion/Decision.
3GPP TSG-RAN WG2 Meeting #107bis; R2-1912474; Chongqing, China, Oct. 14-18, 2019; Agenda item: 6.2.2.2; Source: Samsung; Title: Recovery of consistent UL LBT failures; Document for Discussion and Agreement.
3GPP TSG-RAN WG2 Meeting #107bis; R2-1912569; Chongqing, China, Oct. 14-18, 2019; Source: Panasonic; Title: Handling UL LBT Failures in NR-U; Agenda Item: 6.2.2.2; Document for Discussion and Decision.
3GPP TSG-RAN WG2 107bis; R2-1912625; Chongqing, China, Oct. 14-18, 2019; Agenda Item: 6.2.1.2; Source: Intel Corporation; Title: Detecting and Handling of UL LBT failures; Document for: Discussion and Decision.
3GPP TSG-RAN WG2 Meeting #107bis; R2-1912684; Chongqing, China, Oct. 14-18, 2019; resubmission of R2-1910099; Agenda item: 6.2.2.2; Source: Lenovo, Motorola Mobility; Title: Impact of systematic LBT failure on UL transmission procedure; Document for: Discussion and Decision.
3GPP RAN WG2 Meeting #107bis; R2-1912889; Chongqing, China, Oct. 14-18, 2019; Revision of R2-1909604; Agenda Item: 6.2.2.2; Source: InterDigital; Title: Handling UL LBT Failures in MAC; Document for: Discussion, Decision.
3GPP TSG-RAN WG2 Meeting 107bis; R2-1913029; Chongqing, China, Oct. 14-18, 2019; Agenda Item: 6.2.2.2; Source: Huawei, HiSilicon; Title: UL LBT failure; Document for Discussion, Decision.
3GPP TSG-RAN WG2 Meeting #107bis; R2-1913260; Chongqing, China, Oct. 14-18, 2019; Agenda Item: 6.2.2.2; Souce: MediaTek Inc.; Title: On consistent LBT failures; Document for: Discussion and decision.
3GPP TSG-RAN WG2 Meeting #107bis; R2-1913287; Chongqing, China, Oct. 14-18, 2019; Agenda item: 6.2.2.2; Source: Nokia, Nokia Shanghai Bell; Title: Remaining issues on UL LBT; WID/SID: NR_unlic-Core—Release 16; Document for: Discussion and Decision.
3GPP TSG-RAN WG2 Meeting #107bis; R2-1913294; Chongqing, China, Oct. 14-18, 2019; Agenda Item: 6.2.2.2; Source: Fujitsu; Title: UE behaviour upon consistent UL LBT failures; Document for: Discussion & Decision.
3GPP TSG-RAN WG2 Meeting #107bis; R2-1913649; Chongqing, China, Oct. 14-18, 2019; Agenda item: 6.2.2.2; Source: Charter Communications; Title: Remaining Issues on Consistent LBT Failure Detection in NRU; WID/SID: NR-U WID—Release 16; Document for: Discussion and Decision.
3GPP TSG-RAN WG2 Meeting #108; R2-1914367; Reno, USA, Nov. 18-22, 2019; Source: vivo; Title: Remaining issues on uplink LBT failure; Agenda Item: 6.2.2.2; Document for: Discussion and Decision.
3GPP TSG-RAN WG2 Meeting #108; R2-1914400; Reno, USA, Nov. 18-Nov. 22, 2019; Agenda Item: 6.2.2.2; Source: OPPO; Title: Remaining issues of consistent UL LBT failure; Document for: Discussion, Decision.
3GPP TSG-RAN WG2 108; R2-1914572; Reno, USA, Nov. 18-22, 2019; Agenda Item: 6.2.2.2; Source: Intel Corporation; Title: Handling of UL LBT failures; Document for: Discussion and Decision.
3GPP TSG RAN WG2 NR #108 Meeting; R2-1914791; Reno, USA, Nov. 18-22, 2019; Agenda Item: 6.2.2.2; Source: ZTE Corporation, Sanechips; Title: LBT failure report on SCell; Document for: Discussion and Decision.
3GPP TSG-RAN WG2 Meeting #108; R2-1915015; Reno, USA, Nov. 18-22, 2019; Revision of R2-1912243; Agenda item: 6.2.2.2; Source: Spreadtrum Communications, Huawei, HiSilicon; Title: LBT Failures Handling in Non-Connected State; Document for: Discussion and Decision.
3GPP TSG-RAN WG2 Meeting #108; R2-1915105; Reno, USA, Nov. 18-22, 2019; Agenda item: 6.2.2.2; Source: Lenovo, Motorola Mobility; Title: UE behavior upon consistent LBT failure; Document for: Discussion and Decision.
3GPP TSG-RAN WG2 Meeting 108; R2-1915141; Reno, USA, Nov. 18-22, 2019; Agenda Item: 6.2.2.2; Source: Huawei, HiSilicon; Title: Handling of UL LBT failure; Document for: Discussion, Decision.
3GPP TSG-RAN WG2 Meeting #108; R2-1915177; Reno, USA, Nov. 18-Nov. 22, 2019; Source: Panasonic; Title: Remaining issue on detecting UL LBT Failures; Agenda Item: 6.2.2.2; Document for: Discussion and Decision.
3GPP TSG-RAN WG2 Meeting #108; R2-1915197; Reno, USA, Nov. 18-Nov. 22, 2019; Agenda item: 6.2.2.2 Source: CMCC; Title: Details on determining consistent LBT failure of a BWP; Document for: Discussion.
3GPP TSG-RAN WG2 Meeting #108; R2-1915544; Reno, USA, Nov. 18-22, 2019; Revision of R2-1913260; Agenda Item: 6.2.2.2; Source: MediaTek Inc.; Title: Remaining issues on consistent LBT failures; Document for: Discussion and decision.
3GPP TSG-RAN WG2 Meeting #108; R2-1915765; Reno, NV, USA Nov. 18-22, 2019; Agenda item: 6.2.2.4; Source: Qualcomm Incorporated; Title: Remaining details of UL LBT failure mechanism; Document for: Discussion and Decision.

(56) References Cited

OTHER PUBLICATIONS

3GPP TSG-RAN WG2 Meeting #108; R2-1915885; Reno, USA, Nov. 18-22, 2019; update of R2-1913287; Agenda item: 6.2.2.2; Source: Nokia, Nokia Shanghai Bell, InterDigital, MediaTek, OPPO; Title: UL LBT failure; Detection; WID/SID: NR_unlic-Core—Release 16; Document for: Discussion and Decision.

3GPP TSG-RAN WG2 Meeting #108; R2-1915886; Reno, USA, Nov. 18-22, 2019; Agenda item: 6.2.2.2; Source: Nokia, Nokia Shanghai Bell; Title: UL LBT failure report; WID/SID: LTE_NR_DC_CA_enh-Core—Release 16; Document for: Discussion and Decision.

* cited by examiner

| Channel Access Priority Class ($p$) | $m_p$ | $CW_{min,p}$ | $CW_{max,p}$ | $T_{ulm\,cot,p}$ | allowed $CW_p$ sizes |
|---|---|---|---|---|---|
| 1 | 2 | 3 | 7 | 2 ms | {3,7} |
| 2 | 2 | 7 | 15 | 4 ms | {7,15} |
| 3 | 3 | 15 | 1023 | 6ms or 10 ms | {15,31,63,127,255,511,1023} |
| 4 | 7 | 15 | 1023 | 6ms or 10 ms | {15,31,63,127,255,511,1023} |

For $p = 3, 4$, $T_{ulm\,cot,p}$ =10ms if the higher layer parameter absenceOfAnyOtherTechnology-r14or absenceOfAnyOtherTechnology-r16 may be provided , otherwise, $T_{ulm\,cot,p}$ =6ms.

When $T_{ulm\,cot,p}$=6ms it may be increased to 8 ms by inserting one or more gaps. The minimum duration of a gap may be 100 µs. The maximum duration before including any such gap may be 6 ms.

FIG. 16

RANDOM ACCESS AND CONSISTENT LBT FAILURE RECOVERY

CROSS-REFERENCE TO RELATED APPLICATIONS

This application is a continuation of U.S. patent application Ser. No. 17/113,851, filed Dec. 7, 2020, which claims the benefit of U.S. Provisional Application No. 62/945,154, filed Dec. 7, 2019, which is hereby incorporated by reference in its entirety.

BRIEF DESCRIPTION OF THE DRAWINGS

FIG. 16 shows example channel access parameters for listen before talk in accordance with several of various embodiments of the present disclosure.

DETAILED DESCRIPTION

The exemplary embodiments of the disclosed technology enable operation of a wireless device and/or one or more base stations in unlicensed or shared spectrum and/or using beamforming. The exemplary disclosed embodiments may be implemented in the technical field of wireless communication systems. More particularly, the embodiment of the disclosed technology may relate to beam failure and consistent listen-before-talk (LBT) failure recovery.

The devices and/or nodes of the mobile communications system disclosed herein may be implemented based on various technologies and/or various releases/versions/amendments of a technology. The various technologies include various releases of long-term evolution (LTE) technologies, various releases of 5G new radio (NR) technologies, various wireless local area networks technologies and/or a combination thereof and/or alike. For example, a base station may support a given technology and may communicate with wireless devices with different characteristics. The wireless devices may have different categories that define their capabilities in terms of supporting various features. The wireless device with the same category may have different capabilities. The wireless devices may support various technologies such as various releases of LTE technologies, various releases of 5G NR technologies and/or a combination thereof and/or alike. At least some of the wireless devices in the mobile communications system of the present disclosure may be stationary or almost stationary. In this disclosure, the terms "mobile communications system" and "wireless communications system" may be used interchangeably.

Figure 1A:
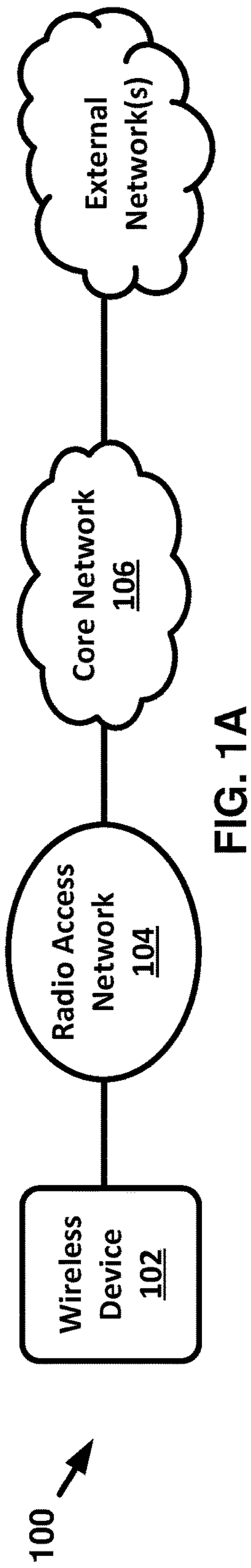
FIG. 1A and FIG. 1B show examples of mobile communications systems in accordance with several of various embodiments of the present disclosure.

FIG. 1A shows an example of a mobile communications system 100 in accordance with several of various embodiments of the present disclosure. The mobile communications system 100 may be, for example, run by a mobile network operator (MNO) or a mobile virtual network operator (MVNO). The mobile communications system 100 may be a public land mobile network (PLMN) run by a network operator providing a variety of service including voice, data, short messaging service (SMS), multimedia messaging service (MMS), emergency calls, etc. The mobile communications system 100 includes a core network (CN) 106, a radio access network (RAN) 104 and at least one wireless device 102.

The CN 106 connects the RAN 104 to one or more external networks (e.g., one or more data networks such as the Internet) and is responsible for functions such as authentication, charging and end-to-end connection establishment. Several radio access technologies (RATs) may be served by the same CN 106.

The RAN 104 may implement a RAT and may operate between the at least one wireless device 102 and the CN 106. The RAN 104 may handle radio related functionalities such as scheduling, radio resource control, modulation and coding, multi-antenna transmissions and retransmission protocols. The wireless device and the RAN may share a portion of the radio spectrum by separating transmissions from the wireless device to the RAN and the transmissions from the RAN to the wireless device. The direction of the transmissions from the wireless device to the RAN is known as the uplink and the direction of the transmissions from the RAN to the wireless device is known as the downlink. The separation of uplink and downlink transmissions may be achieved by employing a duplexing technique. Example duplexing techniques include frequency division duplexing (FDD), time division duplexing (TDD) or a combination of FDD and TDD.

In this disclosure, the term wireless device may refer to a device that communicates with a network entity or another device using wireless communication techniques. The wireless device may be a mobile device or a non-mobile (e.g., fixed) device. Examples of the wireless device include cellular phone, smart phone, tablet, laptop computer, wearable device (e.g., smart watch, smart shoe, fitness trackers, smart clothing, etc.), wireless sensor, wireless meter, extended reality (XR) devices including augmented reality (AR) and virtual reality (VR) devices, Internet of Things (IoT) device, vehicle to vehicle communications device, road-side units (RSU), automobile, relay node or any combination thereof. In some examples, the wireless device (e.g., a smart phone, tablet, etc.) may have an interface (e.g., a graphical user interface (GUI)) for configuration by an end user. In some examples, the wireless device (e.g., a wireless sensor device, etc.) may not have an interface for configuration by an end user. The wireless device may be referred to as a user equipment (UE), a mobile station (MS), a subscriber unit, a handset, an access terminal, a user terminal, a wireless transmit and receive unit (WTRU) and/or other terminology.

The at least one wireless device may communicate with at least one base station in the RAN 104. In this disclosure, the term base station may encompass terminologies associated with various RATs. For example, a base station may be referred to as a Node B in a 3G cellular system such as Universal Mobile Telecommunication Systems (UMTS), an evolved Node B (eNB) in a 4G cellular system such as evolved universal terrestrial radio access (E-UTRA), a next generation eNB (ng-eNB), a Next Generation Node B (gNB) in NR and/or a 5G system, an access point (AP) in Wi-Fi and/or other wireless local area networks. A base station may be referred to as a remote radio head (RRH), a baseband unit (BBU) in connection with one or more RRHs, a repeater or relay for coverage extension and/or any combination thereof. In some examples, all protocol layers of a base station may be implemented in one unit. In some example, some of the protocol layers (e.g., upper layers) of the base station may be implemented in a first unit (e.g., a central unit (CU)) and some other protocol layer (e.g., lower layers) may be implemented in one or more second units (e.g., distributed units (DUs)).

A base station in the RAN 104 includes one or more antennas to communicate with the at least one wireless device. The base station may communicate with the at least one wireless device using radio frequency (RF) transmissions and receptions via RF transceivers. The base station antennas may control one or more cells (or sectors). The size and/or radio coverage area of a cell may depend on the range that transmissions by a wireless device can be successfully received by the base station when the wireless device transmits using the RF frequency of the cell. The base station may be associated with cells of various sizes. At a given location, the wireless device may be in coverage area of a first cell of the base station and may not be in coverage area of a second cell of the base station depending on the sizes of the first cell and the second cell.

A base station in the RAN 104 may have various implementations. For example, a base station may be implemented by connecting a BBU (or a BBU pool) coupled to one or more RRHs and/or one or more relay nodes to extend the cell coverage. The BBU pool may be located at a centralized site like a cloud or data center. The BBU pool may be connected to a plurality of RRHs that control a plurality of cells. The combination of BBU with the one or more RRHs may be referred to as a centralized or cloud RAN (C-RAN) architecture. In some implementations, the BBU functions may be implemented on virtual machines (VMs) on servers at a centralized location. This architecture may be referred to as virtual RAN (vRAN). All, most or a portion of the protocol layer functions (e.g., all or portions of physical layer, medium access control (MAC) layer and/or higher layers) may be implemented at the BBU pool and the processed data may be transmitted to the RRHs for further processing and/or RF transmission. The links between the BBU pool and the RRHs may be referred to as fronthaul.

In some deployment scenarios, the RAN 104 may include macrocell base stations with high transmission power levels and large coverage areas. In other deployment scenarios, the RAN 104 may include base stations that employ different transmission power levels and/or have cells with different coverage areas. For example, some base station may be macrocell base stations with high transmission powers and/or large coverage areas and other base station may be small cell base stations with comparatively smaller transmission powers and/or coverage areas. In some deployment scenarios, a small cell base station may have coverage that is within or has overlap with coverage area of a macrocell base station. A wireless device may communicate with the macrocell base station while within the coverage area of the macrocell base station. For additional capacity, the wireless device may communicate with both the macrocell base station and the small cell base station while in the overlapped coverage area of the macrocell base station and the small cell base station. Depending on their coverage areas, a small cell base station may be referred to as a microcell base station, a picocell base station, a femtocell base station or a home base station.

Different standard development organizations (SDOs) have specified, or may specify in future, mobile communications systems that have similar characteristics as the mobile communications system 100 of FIG. 1A. For example, the Third-Generation Partnership Project (3GPP) is a group of SDOs that provides specifications that define 3GPP technologies for mobile communications systems that are akin to the mobile communications system 100. The 3GPP has developed specifications for third generation (3G) mobile networks, fourth generation (4G) mobile networks and fifth generation (5G) mobile networks. The 3G, 4G and 5G networks are also known as Universal Mobile Telecommunications System (UMTS), Long Term Evolution (LTE) and 5G system (5GS), respectively. In this disclosure, embodiments are described with respect to the RAN implemented in a 3GPP 5G mobile network that is also referred to as next generation RAN (NG-RAN). The embodiments may also be implemented in other mobile communications systems such as 3G or 4G mobile networks or mobile networks that may be standardized in future such as sixth generation (6G) mobile networks or mobile networks that are implemented by standards bodies other than 3GPP. The NG-RAN may be based on a new RAT known as new radio (NR) and/or other radio access technologies such as LTE and/or non-3GPP RATs.

Figure 1B:
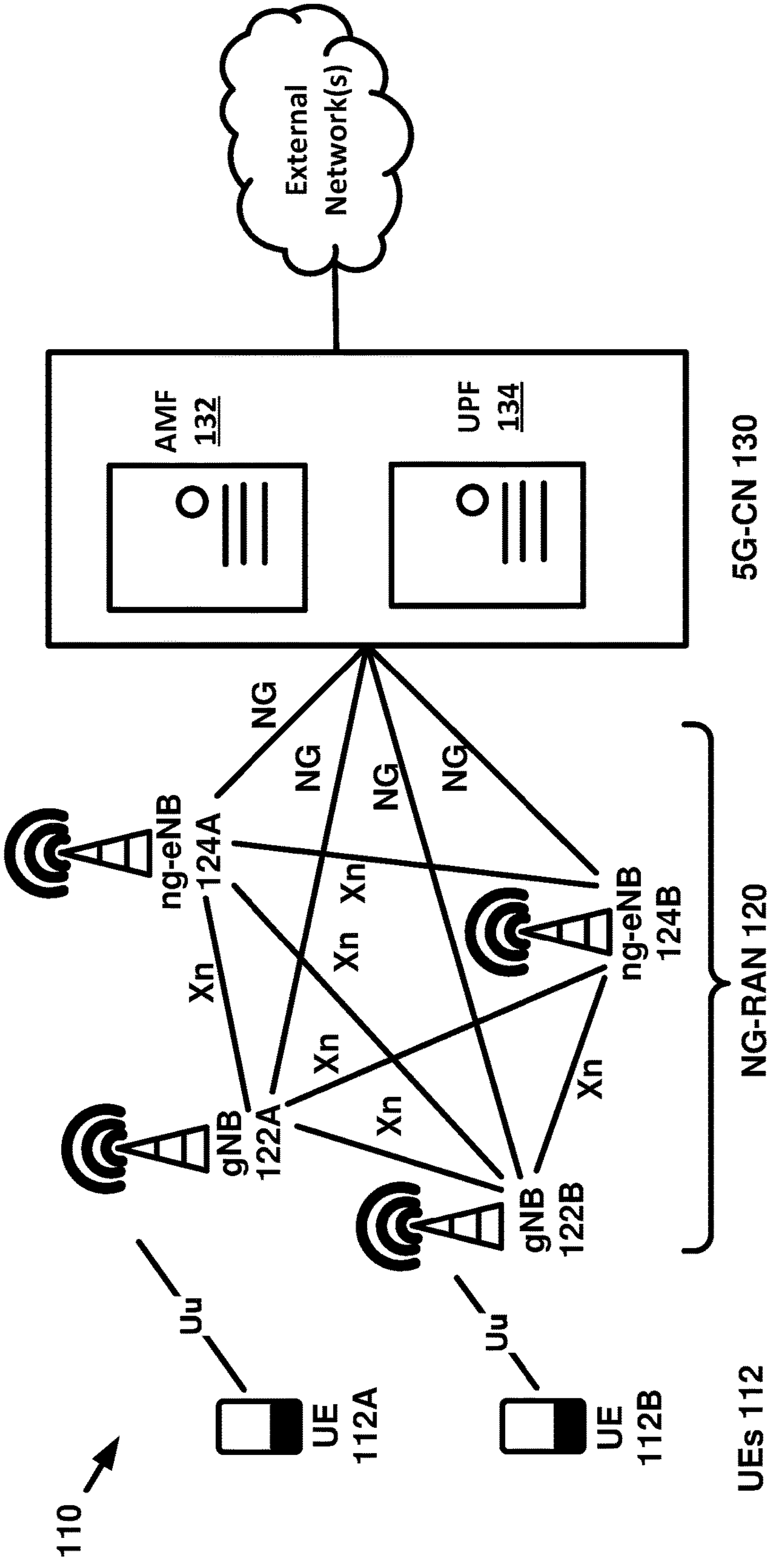

FIG. 1B shows an example of a mobile communications system 110 in accordance with several of various embodiments of the present disclosure. The mobile communications system 110 of FIG. 1B is an example of a 5G mobile network and includes a 5G CN (5G-CN) 130, an NG-RAN 120 and UEs (collectively 112 and individually UE 112A and UE 112B). The 5G-CN 130, the NG-RAN 120 and the UEs 112 of FIG. 1B operate substantially alike the CN 106, the RAN 104 and the at least one wireless device 102, respectively, as described for FIG. 1A.

The 5G-CN 130 of FIG. 1B connects the NG-RAN 120 to one or more external networks (e.g., one or more data networks such as the Internet) and is responsible for functions such as authentication, charging and end-to-end connection establishment. The 5G-CN has new enhancements compared to previous generations of CNs (e.g., evolved packet core (EPC) in the 4G networks) including service-based architecture, support for network slicing and control plane/user plane split. The service-based architecture of the 5G-CN provides a modular framework based on service and functionalities provided by the core network wherein a set of network functions are connected via service-based interfaces. The network slicing enables multiplexing of independent logical networks (e.g., network slices) on the same physical network infrastructure. For example, a network slice may be for mobile broadband applications with full mobility support and a different network slice may be for non-mobile latency-critical applications such as industry automation. The control plane/user plane split enables independent scaling of the control plane and the user plane. For example, the control plane capacity may be increased without affecting the user plane of the network.

The 5G-CN 130 of FIG. 1B includes an access and mobility management function (AMF) 132 and a user plane function (UPF) 134. The AMF 132 may support termination of non-access stratum (NAS) signaling, NAS signaling security such as ciphering and integrity protection, inter-3GPP access network mobility, registration management, connection management, mobility management, access authentication and authorization and security context management. The NAS is a functional layer between a UE and the CN and the access stratum (AS) is a functional layer between the UE and the RAN. The UPF 134 may serve as an interconnect point between the NG-RAN and an external data network. The UPF may support packet routing and forwarding, packet inspection and Quality of Service (QoS) handling and packet filtering. The UPF may further act as a Protocol Data Unit (PDU) session anchor point for mobility within and between RATs.

The 5G-CN 130 may include additional network functions (not shown in FIG. 1B) such as one or more Session Management Functions (SMFs), a Policy Control Function (PCF), a Network Exposure Function (NEF), a Unified Data Management (UDM), an Application Function (AF), and/or an Authentication Server Function (AUSF). These network functions along with the AMF 132 and UPF 134 enable a service-based architecture for the 5G-CN.

The NG-RAN 120 may operate between the UEs 112 and the 5G-CN 130 and may implement one or more RATs. The NG-RAN 120 may include one or more gNBs (e.g., gNB 122A or gNB 122B or collectively gNBs 122) and/or one or more ng-eNBs (e.g., ng-eNB 124A or ng-eNB 124B or collectively ng-eNBs 124). The general terminology for gNBs 122 and/or an ng-eNBs 124 is a base station and may be used interchangeably in this disclosure. The gNBs 122 and the ng-eNBs 124 may include one or more antennas to communicate with the UEs 112. The one or more antennas of the gNBs 122 or ng-eNBs 124 may control one or more cells (or sectors) that provide radio coverage for the UEs 112.

A gNB and/or an ng-eNB of FIG. 1B may be connected to the 5G-CN 130 using an NG interface. A gNB and/or an ng-eNB may be connected with other gNBs and/or ng-eNBs using an Xn interface. The NG or the Xn interfaces are logical connections that may be established using an underlying transport network. The interface between a UE and a gNB or between a UE and an ng-eNBs may be referred to as the Uu interface. An interface (e.g., Uu, NG or Xn) may be established by using a protocol stack that enables data and control signaling exchange between entities in the mobile communications system of FIG. 1B. When a protocol stack is used for transmission of user data, the protocol stack may be referred to as user plane protocol stack. When a protocol stack is used for transmission of control signaling, the protocol stack may be referred to as control plane protocol stack. Some protocol layer may be used in both of the user plane protocol stack and the control plane protocol stack while other protocol layers may be specific to the user plane or control plane.

The NG interface of FIG. 1B may include an NG-User plane (NG-U) interface between a gNB and the UPF 134 (or an ng-eNB and the UPF 134) and an NG-Control plane (NG-C) interface between a gNB and the AMF 132 (or an ng-eNB and the AMF 132). The NG-U interface may provide non-guaranteed delivery of user plane PDUs between a gNB and the UPF or an ng-eNB and the UPF. The NG-C interface may provide services such as NG interface management, UE context management, UE mobility management, transport of NAS messages, paging, PDU session management, configuration transfer and/or warning message transmission.

The UEs 112 and a gNB may be connected using the Uu interface and using the NR user plane and control plane protocol stack. The UEs 112 and an ng-eNB may be connected using the Uu interface using the LTE user plane and control plane protocol stack.

In the example mobile communications system of FIG. 1B, a 5G-CN is connected to a RAN comprised of 4G LTE and/or 5G NR RATs. In other example mobile communications systems, a RAN based on the 5G NR RAT may be connected to a 4G CN (e.g., EPC). For example, earlier releases of 5G standards may support a non-standalone mode of operation where a NR based RAN is connected to the 4G EPC. In an example non-standalone mode, a UE may be connected to both a 5G NR gNB and a 4G LTE eNB (e.g., a ng-eNB) and the control plane functionalities (such as initial access, paging and mobility) may be provided through the 4G LTE eNB. In a standalone of operation, the 5G NR gNB is connected to a 5G-CN and the user plane and the control plane functionalities are provided by the 5G NR gNB.

Figure 2A:
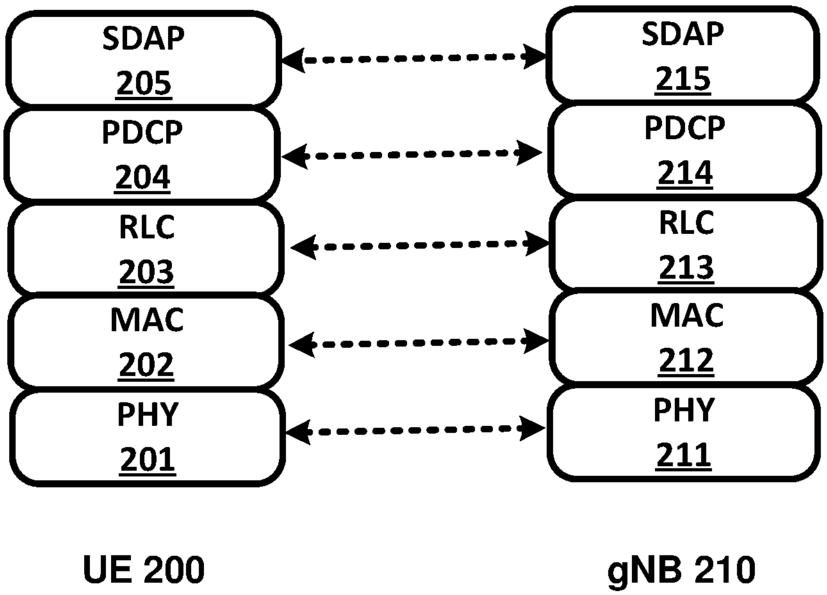
FIG. 2A and FIG. 2B show examples of user plane and control plane protocol layers in accordance with several of various embodiments of the present disclosure.

FIG. 2A shows an example of the protocol stack for the user plan of an NR Uu interface in accordance with several of various embodiments of the present disclosure. The user plane protocol stack comprises five protocol layers that terminate at the UE 200 and the gNB 210. The five protocol layers, as shown in FIG. 2A, include physical (PHY) layer referred to as PHY 201 at the UE 200 and PHY 211 at the gNB 210, medium access control (MAC) layer referred to as MAC 202 at the UE 200 and MAC 212 at the gNB 210, radio link control (RLC) layer referred to as RLC 203 at the UE 200 and RLC 213 at the gNB 210, packet data convergence protocol (PDCP) layer referred to as PDCP 204 at the UE 200 and PDCP 214 at the gNB 210, and service data application protocol (SDAP) layer referred to as SDAP 205 at the UE 200 and SDAP 215 at the gNB 210. The PHY layer, also known as layer 1 (L1), offers transport services to higher layers. The other four layers of the protocol stack (MAC, RLC, PDCP and SDAP) are collectively known as layer 2 (L2).

Figure 2B:
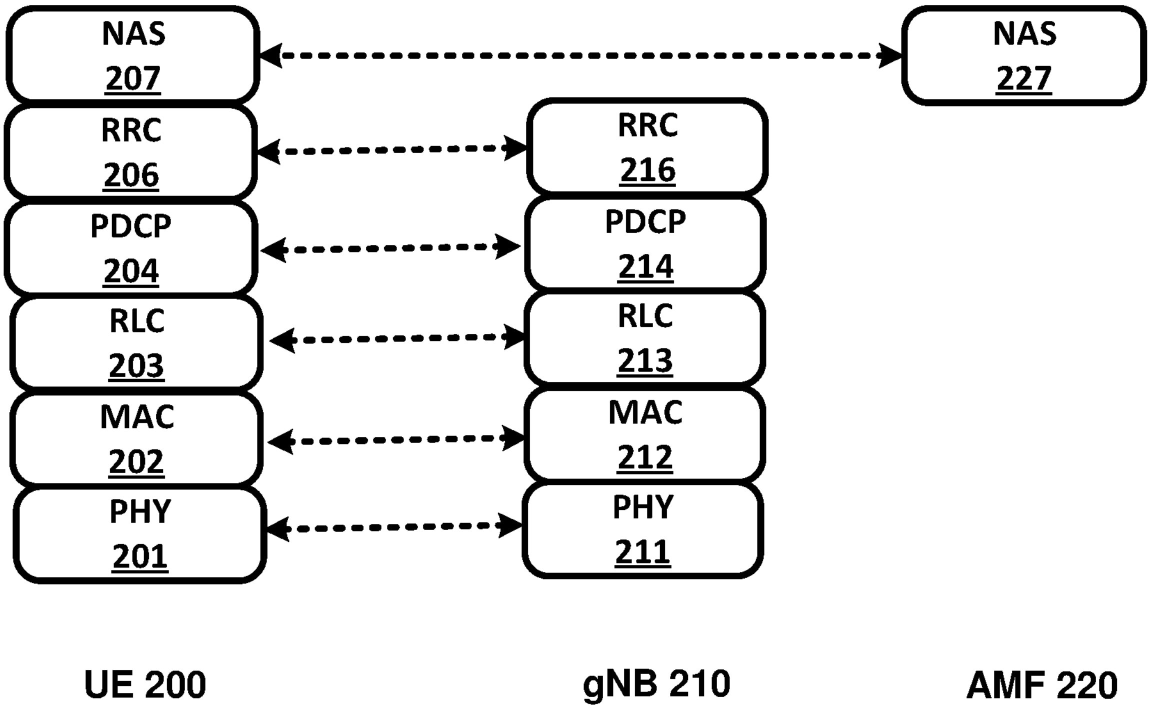

FIG. 2B shows an example of the protocol stack for the control plan of an NR Uu interface in accordance with several of various embodiments of the present disclosure. Some of the protocol layers (PHY, MAC, RLC and PDCP) are common between the user plane protocol stack shown in FIG. 2A and the control plan protocol stack. The control plane protocol stack also includes the RRC layer, referred to RRC 206 at the UE 200 and RRC 216 at the gNB 210, that also terminates at the UE 200 and the gNB 210. In addition, the control plane protocol stack includes the NAS layer that terminates at the UE 200 and the AMF 220. In FIG. 2B, the NAS layer is referred to as NAS 207 at the UE 200 and NAS 227 at the AMF 220.

Figure 3:
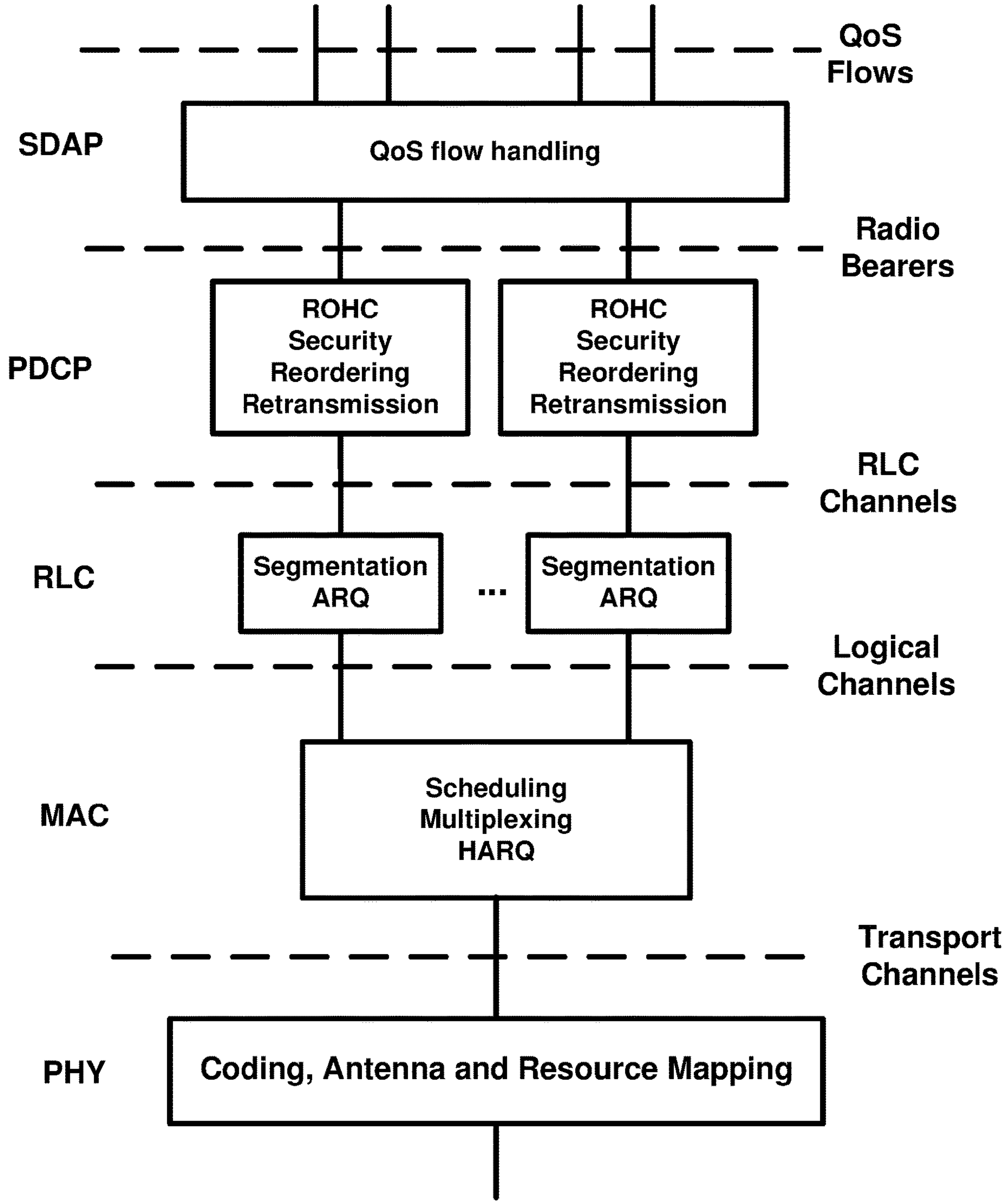
FIG. 3 shows example functions and services offered by protocol layers in a user plane protocol stack in accordance with several of various embodiments of the present disclosure.

FIG. 3 shows example functions and services offered to other layers by a layer in the NR user plane protocol stack of FIG. 2A in accordance with several of various embodiments of the present disclosure. For example, the SDAP layer of FIG. 3 (shown in FIG. 2A as SDAP 205 at the UE side and SDAP 215 at the gNB side) may perform mapping and de-mapping of QoS flows to data radio bearers. The mapping and de-mapping may be based on QoS (e.g., delay, throughput, jitter, error rate, etc.) associated with a QoS flow. A QoS flow may be a QoS differentiation granularity for a PDU session which is a logical connection between a UE 200 and a data network. A PDU session may contain one or more QoS flows. The functions and services of the SDAP layer include mapping and de-mapping between one or more QoS flows and one or more data radio bearers. The SDAP layer may also mark the uplink and/or downlink packets with a QoS flow ID (QFI).

The PDCP layer of FIG. 3 (shown in FIG. 2A as PDCP 204 at the UE side and PDCP 214 at the gNB side) may perform header compression and decompression (e.g., using Robust Header Compression (ROHC) protocol) to reduce the protocol header overhead, ciphering and deciphering and integrity protection and verification to enhance the security over the air interface, reordering and in-order delivery of packets and discarding of duplicate packets. A UE may be configured with one PDCP entity per bearer.

In an example scenario not shown in FIG. 3, a UE may be configured with dual connectivity and may connect to two different cell groups provided by two different base stations. For example, a base station of the two base stations may be referred to as a master base station and a cell group provided by the master base station may be referred to as a master cell group (MCG). The other base station of the two base stations may be referred to as a secondary base station and the cell group provided by the secondary base station may be referred to as a secondary cell group (SCG). A bearer may be configured for the UE as a split bearer that may be handled by the two different cell groups. The PDCP layer may perform routing of packets corresponding to a split bearer to and/or from RLC channels associated with the cell groups.

In an example scenario not shown in FIG. 3, a bearer of the UE may be configured (e.g., with control signaling) with PDCP packet duplication. A bearer configured with PDCP duplication may be mapped to a plurality of RLC channels each corresponding to different one or more cells. The PDCP layer may duplicate packets of the bearer configured with PDCP duplication and the duplicated packets may be mapped to the different RLC channels. With PDCP packet duplication, the likelihood of correct reception of packets increases thereby enabling higher reliability.

The RLC layer of FIG. 3 (shown in FIG. 2A as RLC 203 at the UE side and RLC 213 at the gNB side) provides service to upper layers in the form of RLC channels. The RLC layer may include three transmission modes: transparent mode (TM), Unacknowledged mode (UM) and Acknowledged mode (AM). The RLC layer may perform error correction through automatic repeat request (ARQ) for the AM transmission mode, segmentation of RLC service data units (SDUs) for the AM and UM transmission modes and re-segmentation of RLC SDUs for AM transmission mode, duplicate detection for the AM transmission mode, RLC SDU discard for the AM and UM transmission modes, etc. The UE may be configured with one RLC entity per RLC channel.

The MAC layer of FIG. 3 (shown in FIG. 2A as MAC 202 at the UE side and MAC 212 at the gNB side) provides services to the RLC layer in form of logical channels. The MAC layer may perform mapping between logical channels and transport channels, multiplexing/demultiplexing of MAC SDUs belonging to one or more logical channels into/from transport blocks (TBs) delivered to/from the physical layer on transport channels, reporting of scheduling information, error correction through hybrid automatic repeat request (HARQ), priority handling between UEs by means of dynamic scheduling, priority handling between logical channels of one UE by means of logical channel prioritization and/or padding. In case of carrier aggregation, a MAC entity may comprise one HARQ entity per cell. A MAC entity may support multiple numerologies, transmission timings and cells. The control signaling may configure logical channels with mapping restrictions. The mapping restrictions in logical channel prioritization may control the numerology(ies), cell(s), and/or transmission timing(s)/duration(s) that a logical channel may use.

The PHY layer of FIG. 3 (shown in FIG. 2A as PHY 201 at the UE side and PHY 211 at the gNB side) provides transport services to the MAC layer in form of transport channels. The physical layer may handle coding/decoding, HARQ soft combining, rate matching of a coded transport channel to physical channels, mapping of coded transport channels to physical channels, modulation and demodulation of physical channels, frequency and time synchronization, radio characteristics measurements and indication to higher layers, RF processing, and mapping to antennas and radio resources.

Figure 4:
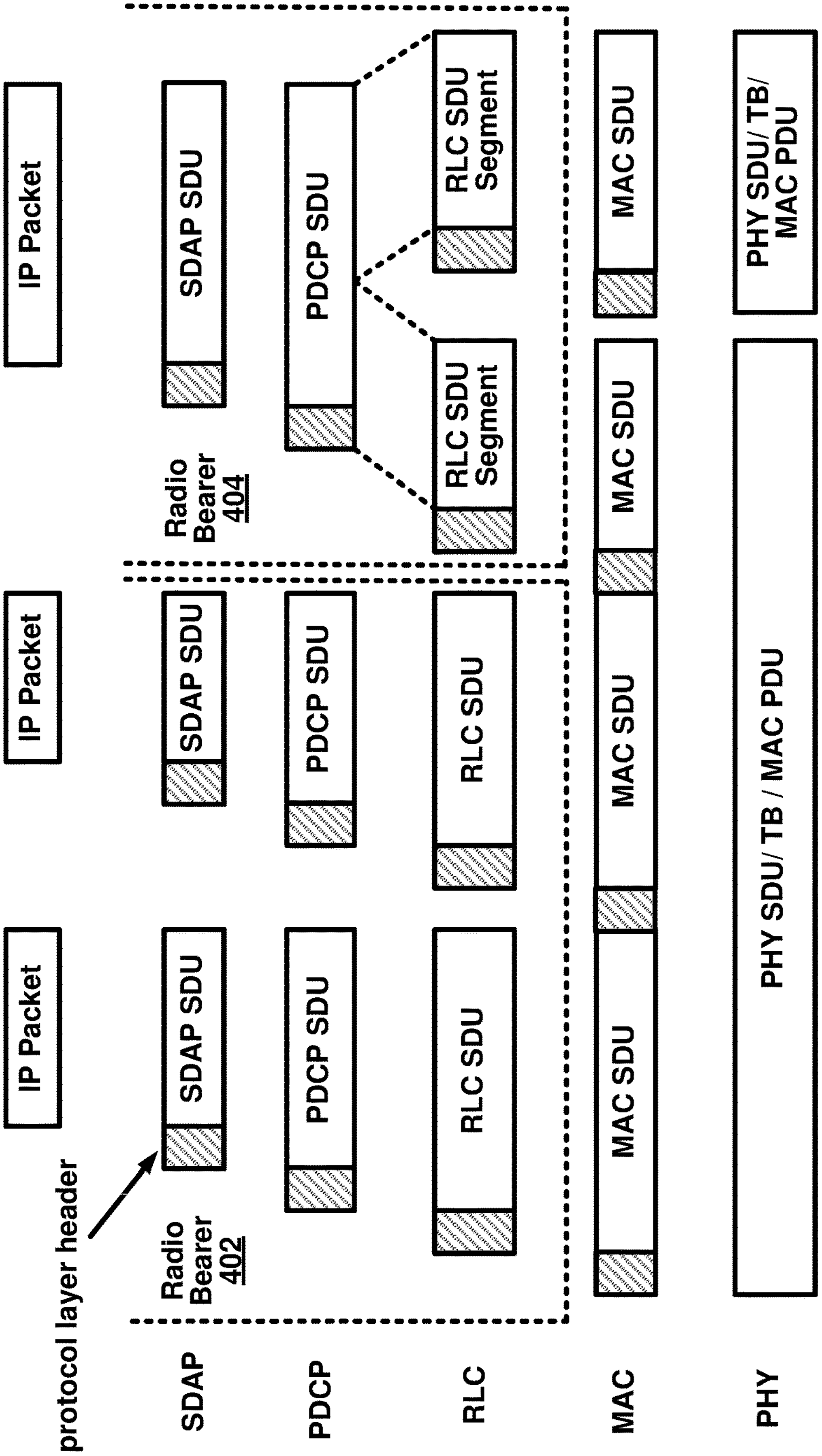
FIG. 4 shows example flow of packets through the protocol layers in accordance with several of various embodiments of the present disclosure.

FIG. 4 shows example processing of packets at different protocol layers in accordance with several of various embodiments of the present disclosure. In this example, three Internet Protocol (IP) packets that are processed by the different layers of the NR protocol stack. The term SDU shown in FIG. 4 is the data unit that is entered from/to a higher layer. In contrast, a protocol data unit (PDU) is the data unit that is entered to/from a lower layer. The flow of packets in FIG. 4 is for downlink. An uplink data flow through layers of the NR protocol stack is similar to FIG. 4. In this example, the two leftmost IP packets are mapped by the SDAP layer (shown as SDAP 205 and SDAP 215 in FIG. 2A) to radio bearer 402 and the rightmost packet is mapped by the SDAP layer to the radio bearer 404. The SDAP layer adds SDAP headers to the IP packets which are entered into the PDCP layer as PDCP SDUs. The PDCP layer is shown as PDCP 204 and PDCP 214 in FIG. 2A. The PDCP layer adds the PDCP headers to the PDCP SDUs which are entered into the RLC layer as RLC SDUs. The RLC layer is shown as RLC 203 and RLC 213 in FIG. 2A. An RLC SDU may be segmented at the RLC layer. The RLC layer adds RLC headers to the RLC SDUs after segmentation (if segmented) which are entered into the MAC layer as MAC SDUs. The MAC layer adds the MAC headers to the MAC SDUs and multiplexes one or more MAC SDUs to form a PHY SDU (also referred to as a transport block (TB) or a MAC PDU).

In FIG. 4, the MAC SDUs are multiplexed to form a transport block. The MAC layer may multiplex one or more MAC control elements (MAC CEs) with zero or more MAC SDUs to form a transport block. The MAC CEs may also be referred to as MAC commands or MAC layer control signaling and may be used for in-band control signaling. The MAC CEs may be transmitted by a base station to a UE (e.g., downlink MAC CEs) or by a UE to a base station (e.g., uplink MAC CEs). The MAC CEs may be used for transmission of information useful by a gNB for scheduling (e.g., buffer status report (BSR) or power headroom report (PHR)), activation/deactivation of one or more cells, activation/deactivation of configured radio resources for or one or more processes, activation/deactivation of one or more processes, indication of parameters used in one or more processes, etc.

Figure 5A:
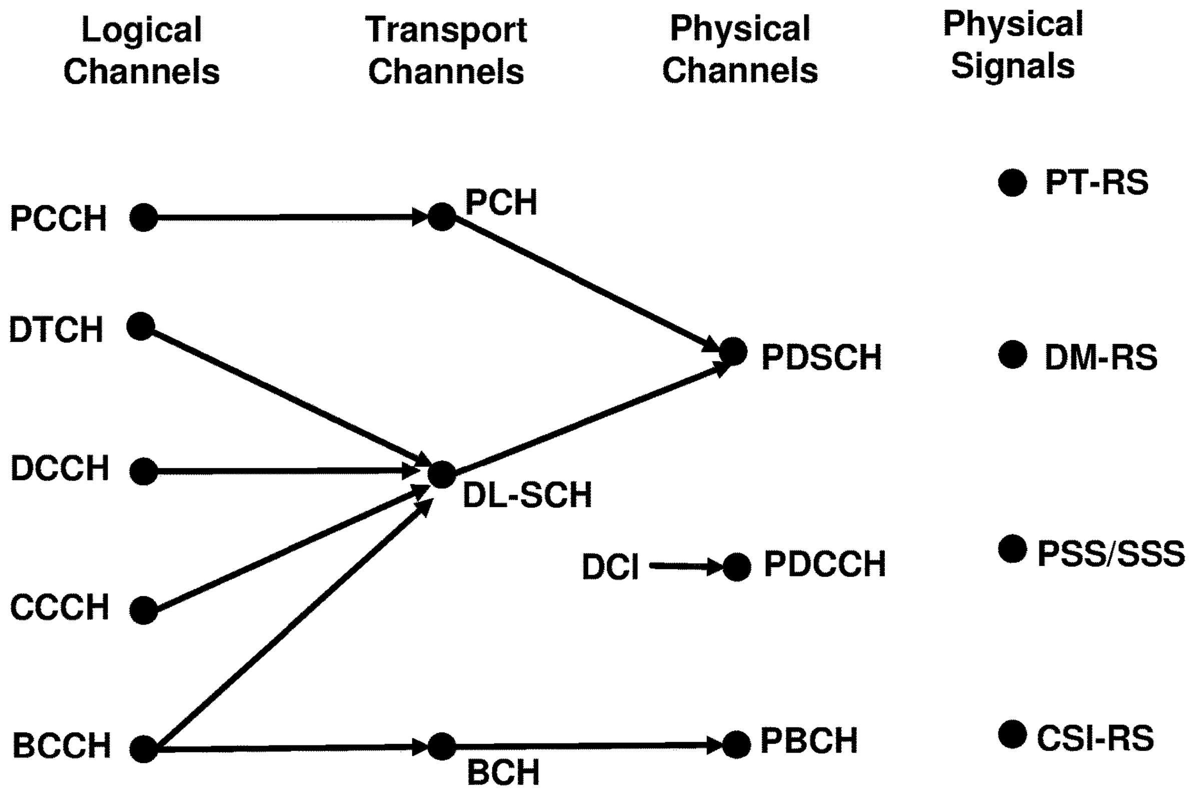
FIG. 5A shows example mapping of channels between layers of the protocol stack and different physical signals in downlink in accordance with several of various embodiments of the present disclosure.
Figure 5B:
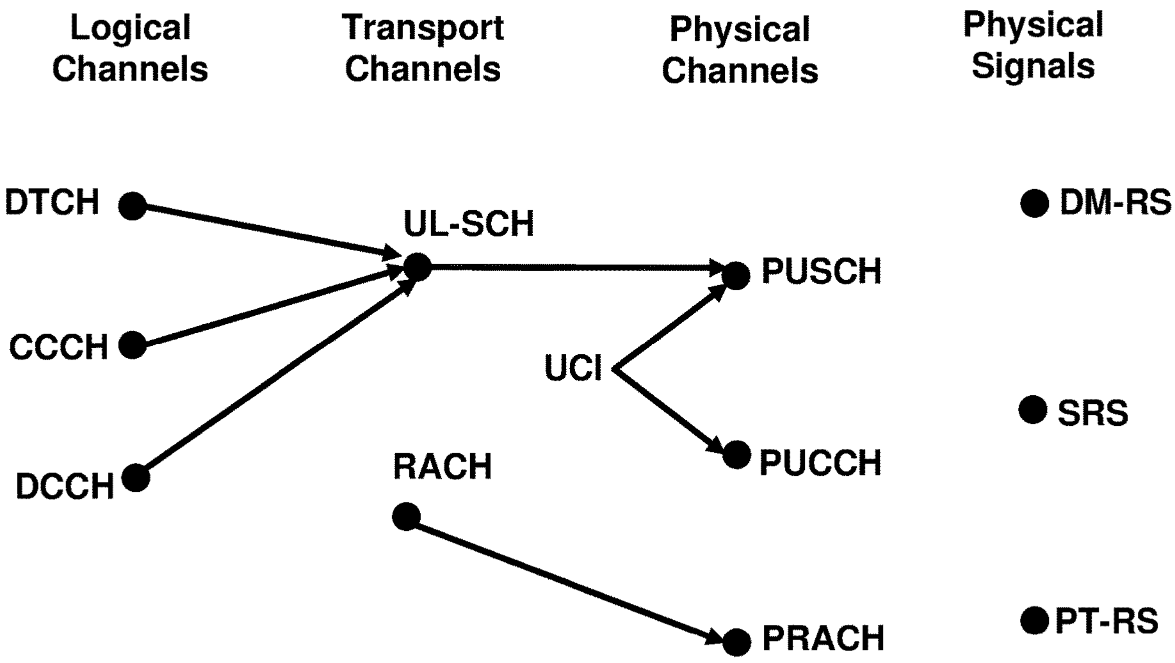
FIG. 5B shows example mapping of channels between layers of the protocol stack and different physical signals in uplink in accordance with several of various embodiments of the present disclosure.

FIG. 5A and FIG. 5B show example mapping between logical channels, transport channels and physical channels for downlink and uplink, respectively in accordance with several of various embodiments of the present disclosure. As discussed before, the MAC layer provides services to higher layer in the form of logical channels. A logical channel may be classified as a control channel, if used for transmission of control and/or configuration information, or a traffic channel if used for transmission of user data. Example logical channels in NR include Broadcast Control Channel (BCCH) used for transmission of broadcast system control information, Paging Control Channel (PCCH) used for carrying paging messages for wireless devices with unknown locations, Common Control Channel (CCCH) used for transmission of control information between UEs and network and for UEs that have no RRC connection with the network, Dedicated Control Channel (DCCH) which is a point-to-point bi-directional channel for transmission of dedicated control information between a UE that has an RRC connection and the network and Dedicated Traffic Channel (DTCH) which is point-to-point channel, dedicated to one UE, for the transfer of user information and may exist in both uplink and downlink.

As discussed before, the PHY layer provides services to the MAC layer and higher layers in the form of transport channels. Example transport channels in NR include Broadcast Channel (BCH) used for transmission of part of the BCCH referred to as master information block (MIB), Downlink Shared Channel (DL-SCH) used for transmission of data (e.g., from DTCH in downlink) and various control information (e.g., from DCCH and CCCH in downlink and part of the BCCH that is not mapped to the BCH), Uplink Shared Channel (UL-SCH) used for transmission of uplink data (e.g., from DTCH in uplink) and control information (e.g., from CCCH and DCCH in uplink) and Paging Channel (PCH) used for transmission of paging information from the PCCH. In addition, Random Access Channel (RACH) is a transport channel used for transmission of random access preambles. The RACH does not carry a transport block. Data on a transport channel (except RACH) may be organized in transport blocks, wherein One or more transport blocks may be transmitted in a transmission time interval (TTI).

The PHY layer may map the transport channels to physical channels. A physical channel may correspond to time-frequency resources that are used for transmission of information from one or more transport channels. In addition to mapping transport channels to physical channels, the physical layer may generate control information (e.g., downlink control information (DCI) or uplink control information (UCI)) that may be carried by the physical channels. Example DCI include scheduling information (e.g., downlink assignments and uplink grants), request for channel state information report, power control command, etc. Example UCI include HARQ feedback indicating correct or incorrect reception of downlink transport blocks, channel state information report, scheduling request, etc. Example physical channels in NR include a Physical Broadcast Channel (PBCH) for carrying information from the BCH, a Physical Downlink Shared Channel (PDSCH) for carrying information form the PCH and the DL-SCH, a Physical Downlink Control Channel (PDCCH) for carrying DCI, a Physical Uplink Shared Channel (PUSCH) for carrying information from the UL-SCH and/or UCI, a Physical Uplink Control Channel (PUCCH) for carrying UCI and Physical Random Access Channel (PRACH) for transmission of RACH (e.g., random access preamble).

The PHY layer may also generate physical signals that are not originated from higher layers. As shown in FIG. 5A, example downlink physical signals include Demodulation Reference Signal (DM-RS), Phase Tracking Reference Signal (PT-RS), Channel State Information Reference Signal (CSI-RS), Primary Synchronization Signal (PSS) and Secondary Synchronization Signal (SSS). As shown in FIG. 5B, example uplink physical signals include DM-RS, PT-RS and sounding reference signal (SRS).

As indicated earlier, some of the protocol layers (PHY, MAC, RLC and PDCP) of the control plane of an NR Uu interface, are common between the user plane protocol stack (as shown in FIG. 2A) and the control plane protocol stack (as shown in FIG. 2B). In addition to PHY, MAC, RLC and PDCP, the control plane protocol stack includes the RRC protocol layer and the NAS protocol layer.

The NAS layer, as shown in FIG. 2B, terminates at the UE 200 and the AMF 220 entity of the 5G-C 130. The NAS layer is used for core network related functions and signaling including registration, authentication, location update and session management. The NAS layer uses services from the AS of the Uu interface to transmit the NAS messages.

The RRC layer, as shown in FIG. 2B, operates between the UE 200 and the gNB 210 (more generally NG-RAN 120) and may provide services and functions such as broadcast of system information (SI) related to AS and NAS as well as paging initiated by the 5G-C 130 or NG-RAN 120. In addition, the RRC layer is responsible for establishment, maintenance and release of an RRC connection between the UE 200 and the NG-RAN 120, carrier aggregation configuration (e.g., addition, modification and release), dual connectivity configuration (e.g., addition, modification and release), security related functions, radio bearer configuration/maintenance and release, mobility management (e.g., maintenance and context transfer), UE cell selection and reselection, inter-RAT mobility, QoS management functions, UE measurement reporting and control, radio link failure (RLF) detection and NAS message transfer. The RRC layer uses services from PHY, MAC, RLC and PDCP layers to transmit RRC messages using signaling radio bearers (SRBs). The SRBs are mapped to CCCH logical channel during connection establishment and to DCCH logical channel after connection establishment.

Figure 6:
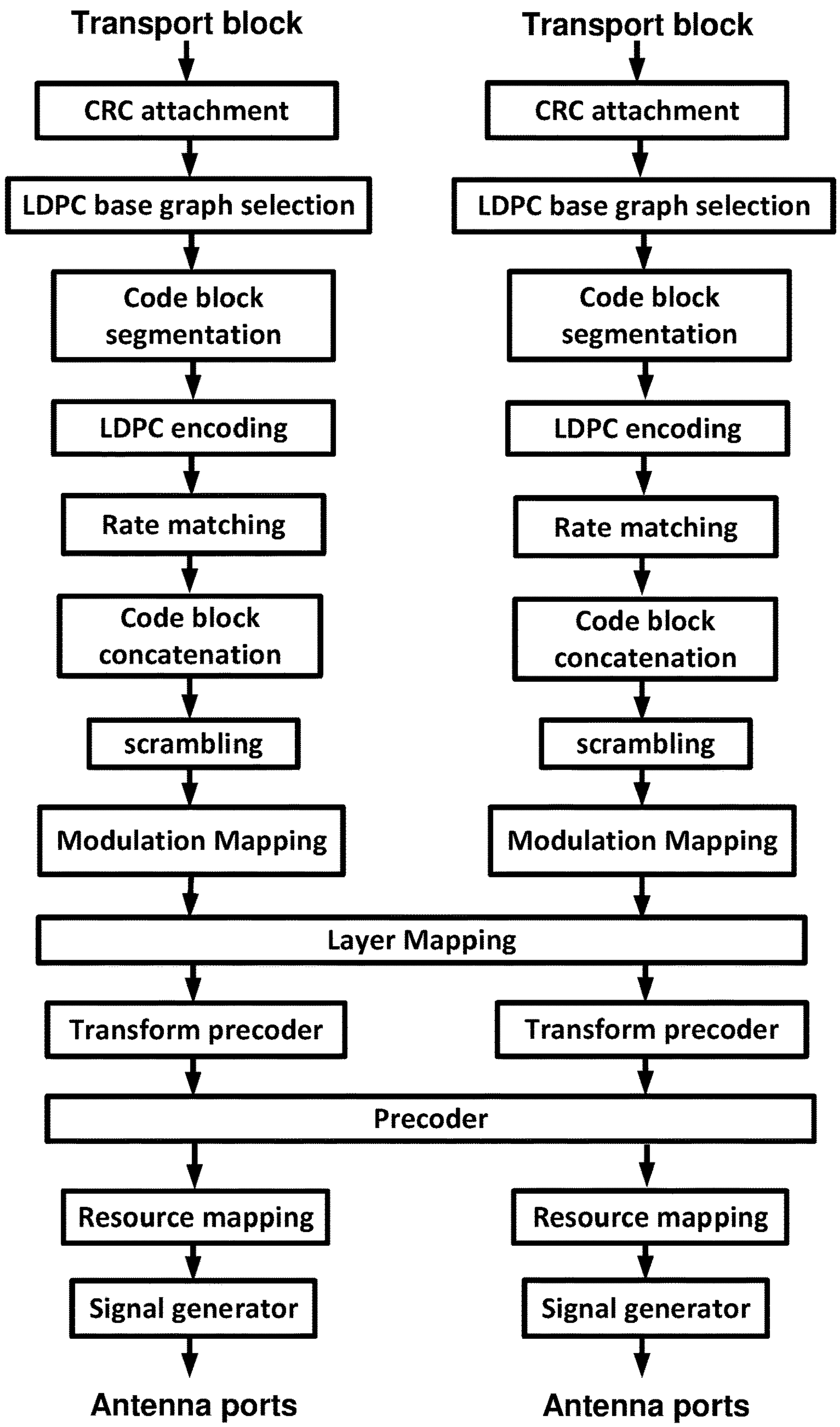
FIG. 6 shows example physical layer processes for signal transmission in accordance with several of various embodiments of the present disclosure.

FIG. 6 shows example physical layer processes for signal transmission in accordance with several of various embodiments of the present disclosure. Data and/or control streams from MAC layer may be encoded/decoded to offer transport and control services over the radio transmission link. For example, one or more (e.g., two as shown in FIG. 6) transport blocks may be received from the MAC layer for transmission via a physical channel (e.g., a physical downlink shared channel or a physical uplink shared channel). A cyclic redundancy check (CRC) may be calculated and attached to a transport block in the physical layer. The CRC calculation may be based on one or more cyclic generator polynomials. The CRC may be used by the receiver for error detection. Following the transport block CRC attachment, a low-density parity check (LDPC) base graph selection may be performed. In example embodiments, two LDPC base graphs may be used wherein a first LDPC base graph may be optimized for small transport blocks and a second LDPC base graph may be optimized for comparatively larger transport blocks.

The transport block may be segmented into code blocks and code block CRC may be calculated and attached to a code block. A code block may be LDPC coded and the LDPC coded blocks may be individually rate matched. The code blocks may be concatenated to create one or more codewords. The contents of a codeword may be scrambled and modulated to generate a block of complex-valued modulation symbols. The modulation symbols may be mapped to a plurality of transmission layers (e.g., multiple-input multiple-output (MIMO) layers) and the transmission layers may be subject to transform precoding and/or precoding. The precoded complex-valued symbols may be mapped to radio resources (e.g., resource elements). The signal generator block may create a baseband signal and up-convert the baseband signal to a carrier frequency for transmission via antenna ports. The signal generator block may employ mixers, filters and/or other radio frequency (RF) components prior to transmission via the antennas. The functions and blocks in FIG. 6 are illustrated as examples and other mechanisms may be implemented in various embodiments.

Figure 7:
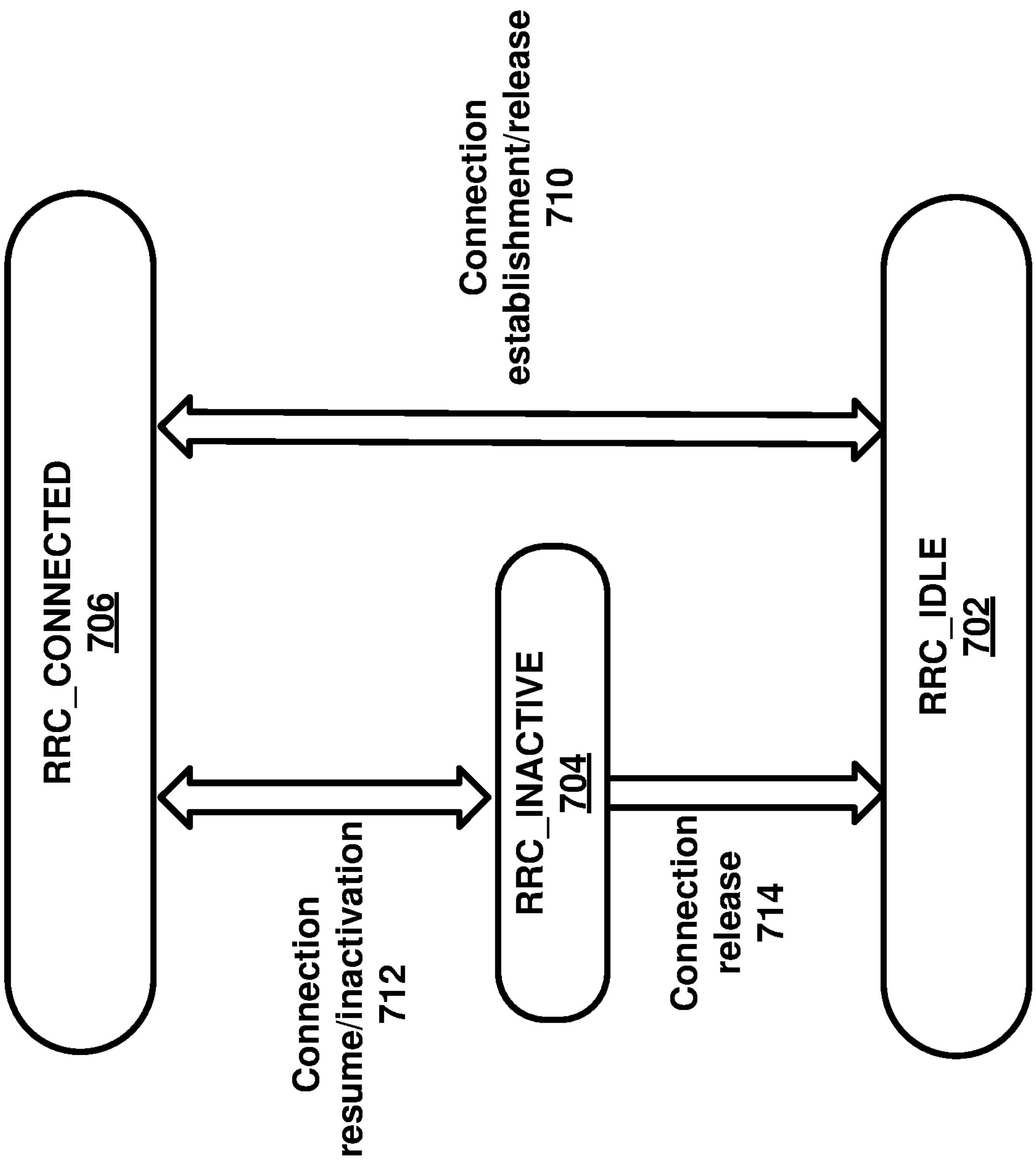
FIG. 7 shows examples of RRC states and RRC state transitions in accordance with several of various embodiments of the present disclosure.

FIG. 7 shows examples of RRC states and RRC state transitions at a UE in accordance with several of various embodiments of the present disclosure. A UE may be in one of three RRC states: RRC_IDLE 702, RRC INACTIVE 704 and RRC_CONNECTED 706. In RRC_IDLE 702 state, no RRC context (e.g., parameters needed for communications between the UE and the network) may be established for the UE in the RAN. In RRC_IDLE 702 state, no data transfer between the UE and the network may take place and uplink synchronization is not maintained. The wireless device may sleep most of the time and may wake up periodically to receive paging messages. The uplink transmission of the UE may be based on a random access process and to enable transition to the RRC_CONNECTED 706 state. The mobility in RRC_IDLE 702 state is through a cell reselection procedure where the UE camps on a cell based on one or more criteria including signal strength that is determined based on the UE measurements.

In RRC_CONNECTED 706 state, the RRC context is established and both the UE and the RAN have necessary parameters to enable communications between the UE and the network. In the RRC_CONNECTED 706 state, the UE is configured with an identity known as a Cell Radio Network Temporary Identifier (C-RNTI) that is used for signaling purposes (e.g., uplink and downlink scheduling, etc.) between the UE and the RAN. The wireless device mobility in the RRC_CONNECTED 706 state is managed by the RAN. The wireless device provides neighboring cells and/or current serving cell measurements to the network and the network may make hand over decisions. Based on the wireless device measurements, the current serving base station may send a handover request message to a neighboring base station and may send a handover command to the wireless device to handover to a cell of the neighboring base station. The transition of the wireless device from the RRC_IDLE 702 state to the RRC_CONNECTED 706 state or from the RRC_CONNECTED 706 state to the RRC_IDLE 702 state may be based on connection establishment and connection release procedures (shown collectively as connection establishment/release 710 in FIG. 7).

To enable a faster transition to the RRC_CONNECTED 706 state (e.g., compared to transition from RRC_IDLE 702 state to RRC_CONNECTED 706 state), an RRC_INACTIVE 704 state is used for an NR UE wherein, the RRC context is kept at the UE and the RAN. The transition from the RRC_INACTIVE 704 state to the RRC_CONNECTED 706 state is handled by RAN without CN signaling. Similar to the RRC_IDLE 702 state, the mobility in RRC_INACTIVE 704 state is based on a cell reselection procedure without involvement from the network. The transition of the wireless device from the RRC_INACTIVE 704 state to the RRC_CONNECTED 706 state or from the RRC_CONNECTED 706 state to the RRC_INACTIVE 704 state may be based on connection resume and connection inactivation procedures (shown collectively as connection resume/inactivation 712 in FIG. 7). The transition of the wireless device from the RRC_INACTIVE 704 state to the RRC_IDLE 702 state may be based on a connection release 714 procedure as shown in FIG. 7.

In NR, Orthogonal Frequency Division Multiplexing (OFDM), also called cyclic prefix OFDM (CP-OFDM), is the baseline transmission scheme in both downlink and uplink of NR and the Discrete Fourier Transform (DFT) spread OFDM (DFT-s-OFDM) is a complementary uplink transmission in addition to the baseline OFDM scheme. OFDM is multi-carrier transmission scheme wherein the transmission bandwidth may be composed of several narrowband sub-carriers. The subcarriers are modulated by the complex valued OFDM modulation symbols resulting in an OFDM signal. The complex valued OFDM modulation symbols are obtained by mapping, by a modulation mapper, the input data (e.g., binary digits) to different points of a modulation constellation diagram. The modulation constellation diagram depends on the modulation scheme. NR may use different types of modulation schemes including Binary Phase Shift Keying (BPSK), π/2-BPSK, Quadrature Phase Shift Keying (QPSK), 16 Quadrature Amplitude Modulation (16QAM), 64QAM and 256QAM. Different and/or higher order modulation schemes (e.g., M-QAM in general) may be used. An OFDM signal with N subcarriers may be generated by processing N subcarriers in parallel for example by using Inverse Fast Fourier Transform (IFFT) processing. The OFDM receiver may use FFT processing to recover the transmitted OFDM modulation symbols. The subcarrier spacing of subcarriers in an OFDM signal is inversely proportional to an OFDM modulation symbol duration. For example, for a 15 KHz subcarrier spacing, duration of an OFDM signal is nearly 66.7 μs. To enhance the robustness of OFDM transmission in time dispersive channels, a cyclic prefix (CP) may be inserted at the beginning of an OFDM symbol. For example, the last part of an OFDM symbol may be copied and inserted at the beginning of an OFDM symbol. The CP insertion enhanced the OFDM transmission scheme by preserving subcarrier orthogonality in time dispersive channels.

In NR, different numerologies may be used for OFDM transmission. A numerology of OFDM transmission may indicate a subcarrier spacing and a CP duration for the OFDM transmission. For example, a subcarrier spacing in NR may generally be a multiple of 15 KHz and expressed as $\Delta f=2^{\mu}\cdot 15$ KHz ($\mu=0, 1, 2, \ldots$). Example subcarrier spacings used in NR include 15 KHz ($\mu=0$), 30 KHz ($\mu=1$), 60 KHz ($\mu=2$), 120 KHz ($\mu=3$) and 240 KHz ($\mu=4$). As discussed before, a duration of OFDM symbol is inversely proportional to the subcarrier spacing and therefor OFDM symbol duration may depend on the numerology (e.g. the μ value).

Figure 8:
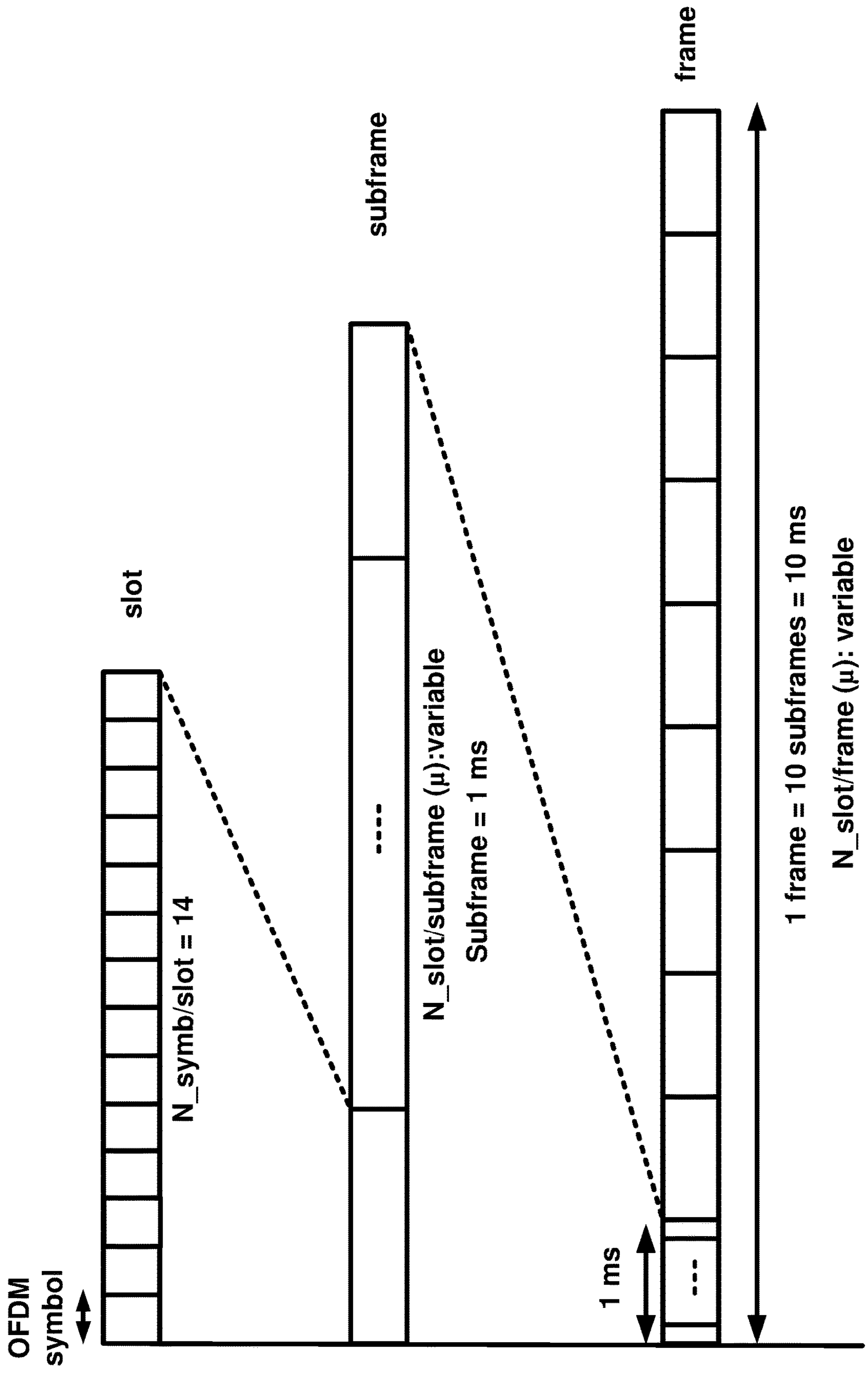
FIG. 8 shows an example time domain transmission structure in NR by grouping OFDM symbols into slots, subframes and frames in accordance with several of various embodiments of the present disclosure.

FIG. 8 shows an example time domain transmission structure in NR wherein OFDM symbols are grouped into slots, subframes and frames in accordance with several of various embodiments of the present disclosure. A slot is a group of $N_{symb}^{slot}$ OFDM symbols, wherein the $N_{symb}^{slot}$ may have a constant value (e.g., 14). Since different numerologies results in different OFDM symbol durations, duration of a slot may also depend on the numerology and may be variable. A subframe may have a duration of 1 ms and may be composed of one or more slots, the number of which may depend on the slot duration. The number of slots per subframe is therefore a function of μ and may generally expressed as $N_{slot}^{subframe,\mu}$ and the number of symbols per subframe may be expressed as $N_{symb}^{subrame,\mu} = {}_{symb}^{slot}N_{slot}^{subframe,\mu}$. A frame may have a duration of 10 ms and may consist of 10 subframes. The number of slots per frame may depend on the numerology and therefore may be variable. The number of slots per frame may generally be expressed as $N_{slot}^{frame,\mu}$.

An antenna port may be defined as a logical entity such that channel characteristics over which a symbol on the antenna port is conveyed may be inferred from the channel characteristics over which another symbol on the same antenna port is conveyed. For example, for DM-RS associated with a PDSCH, the channel over which a PDSCH symbol on an antenna port is conveyed may be inferred from the channel over which a DM-RS symbol on the same antenna port is conveyed, for example, if the two symbols are within the same resource as the scheduled PDSCH and/or in the same slot and/or in the same precoding resource block group (PRG). For example, for DM-RS associated with a PDCCH, the channel over which a PDCCH symbol on an antenna port is conveyed may be inferred from the channel over which a DM-RS symbol on the same antenna port is conveyed if, for example, the two symbols are within resources for which the UE may assume the same precoding being used. For example, for DM-RS associated with a PBCH, the channel over which a PBCH symbol on one antenna port is conveyed may be inferred from the channel over which a DM-RS symbol on the same antenna port is conveyed if, for example, the two symbols are within a SS/PBCH block transmitted within the same slot, and with the same block index. The antenna port may be different from a physical antenna. An antenna port may be associated with an antenna port number and different physical channels may correspond to different ranges of antenna port numbers.

Figure 9:
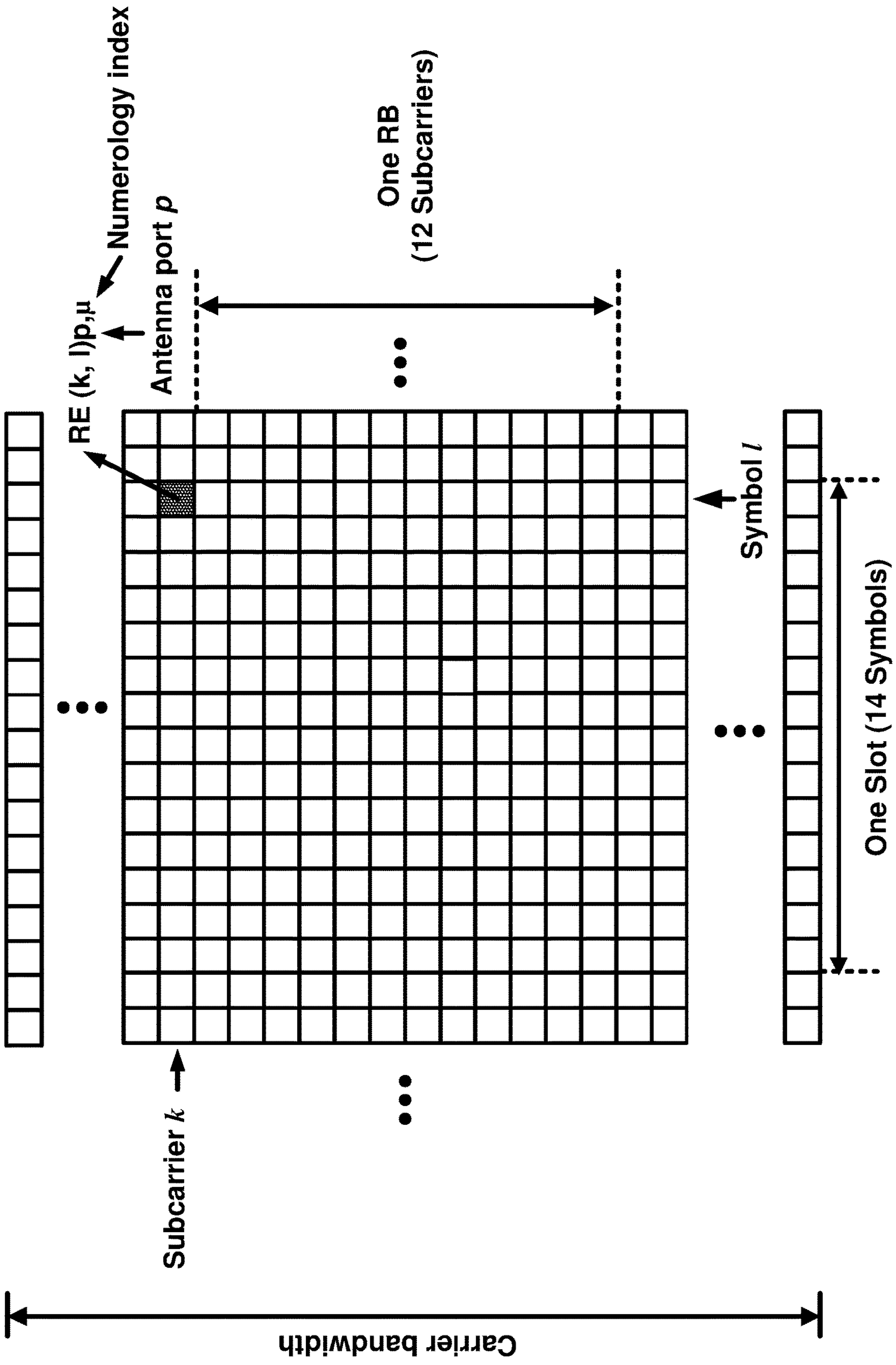
FIG. 9 shows an example of time-frequency resource grid in accordance with several of various embodiments of the present disclosure.

FIG. 9 shows an example of time-frequency resource grid in accordance with several of various embodiments of the present disclosure. The number of subcarriers in a carrier bandwidth may be based on the numerology of OFDM transmissions in the carrier. A resource element, corresponding to one symbol duration and one subcarrier, may be the smallest physical resource in the time-frequency grid. A resource element (RE) for antenna port p and subcarrier spacing configuration μ may be uniquely identified by $(k, l)_{p,\mu}$ where k is the index of a subcarrier in the frequency domain and l may refer to the symbol position in the time domain relative to some reference point. A resource block may be defined as $N_{SC}^{RB}=12$ subcarriers. Since subcarrier spacing depends on the numerology of OFDM transmission, the frequency domain span of a resource block may be variable and may depend on the numerology. For example, for a subcarrier spacing of 15 KHz (e.g., μ=0), a resource block may be 180 KHz and for a subcarrier spacing of 30 KHz (e.g., μ=1), a resource block may be 360 KHz.

With large carrier bandwidths defined in NR and due to limited capabilities for some UEs (e.g., due to hardware limitations), a UE may not support an entire carrier bandwidth. Receiving on the full carrier bandwidth may imply high energy consumption. For example, transmitting downlink control channels on the full downlink carrier bandwidth may result in high power consumption for wide carrier bandwidths. NR may use a bandwidth adaptation procedure to dynamically adapt the transmit and receive bandwidths. The transmit and receive bandwidth of a UE on a cell may be smaller than the bandwidth of the cell and may be adjusted. For example, the width of the transmit and/or receive bandwidth may change (e.g. shrink during period of low activity to save power); the location of the transmit and/or receive bandwidth may move in the frequency domain (e.g. to increase scheduling flexibility); and the subcarrier spacing of the transmit or receive bandwidth may change (e.g. to allow different services). A subset of the cell bandwidth may be referred to as a Bandwidth Part (BWP) and bandwidth adaptation may be achieved by configuring the UE with one or more BWPs. The base station may configure a UE with a set of downlink BWPs and a set of uplink BWPs. A BWP may be characterized by a numerology (e.g., subcarrier spacing and cyclic prefix) and a set of consecutive resource blocks in the numerology of the BWP. One or more first BWPs of the one or more BWPs of the cell may be active at a time. An active BWP may be an active downlink BWP or an active uplink BWP.

Figure 10:
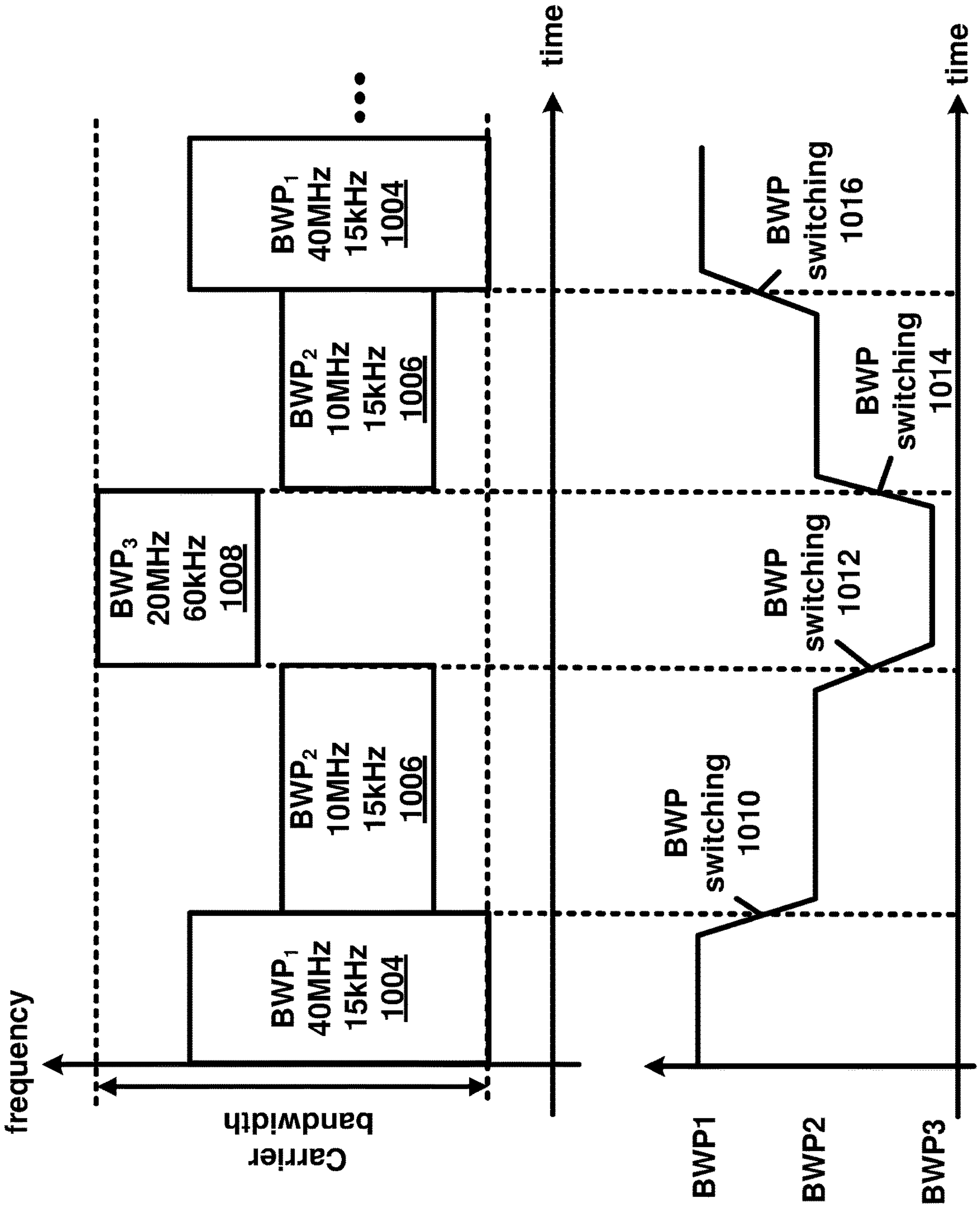
FIG. 10 shows example adaptation and switching of bandwidth parts in accordance with several of various embodiments of the present disclosure.

FIG. 10 shows an example of bandwidth part adaptation and switching. In this example, three BWPs ($BWP_1$ 1004, $BWP_2$ 1006 and $BWP_3$ 1008) are configured for a UE on a carrier bandwidth. The $BWP_1$ is configured with a bandwidth of 40 MHz and a numerology with subcarrier spacing of 15 KHz, the $BWP_2$ is configured with a bandwidth of 10 MHz and a numerology with subcarrier spacing of 15 KHz and the $BWP_3$ is configured with a bandwidth of 20 MHz and a subcarrier spacing of 60 KHz. The wireless device may switch from a first BWP (e.g., $BWP_1$) to a second BWP (e.g., $BWP_2$). An active BWP of the cell may change from the first BWP to the second BWP in response to the BWP switching.

The BWP switching (e.g., BWP switching 1010, BWP switching 1012, BWP switching 1014, or BWP switching 1016 in FIG. 10) may be based on a command from the base station. The command may be a DCI comprising scheduling information for the UE in the second BWP. In case of uplink BWP switching, the first BWP and the second BWP may be uplink BWPs and the scheduling information may be an uplink grant for uplink transmission via the second BWP. In case of downlink BWP switching, the first BWP and the second BWP may be downlink BWPs and the scheduling information may be a downlink assignment for downlink reception via the second BWP.

The BWP switching (e.g., BWP switching 1010, BWP switching 1012, BWP switching 1014, or BWP switching 1016 in FIG. 10) may be based on an expiry of a timer. The base station may configure a wireless device with a BWP inactivity timer and the wireless device may switch to a default BWP (e.g., default downlink BWP) based on the expiry of the BWP inactivity timer. The expiry of the BWP inactivity timer may be an indication of low activity on the current active downlink BWP. The base station may configure the wireless device with the default downlink BWP. If the base station does not configure the wireless device with the default BWP, the default BWP may be an initial downlink BWP. The initial active BWP may be the BWP that the wireless device receives scheduling information for remaining system information upon transition to an RRC_CONNECTED state.

A wireless device may monitor a downlink control channel of a downlink BWP. For example, the UE may monitor a set of PDCCH candidates in configured monitoring occasions in one or more configured COntrol REsource SETs (CORESETs) according to the corresponding search space configurations. A search space configuration may define how/where to search for PDCCH candidates. For example, the search space configuration parameters may comprise a monitoring periodicity and offset parameter indicating the slots for monitoring the PDCCH candidates. The search space configuration parameters may further comprise a parameter indicating a first symbol with a slot within the slots determined for monitoring PDCCH candidates. A search space may be associated with one or more CORESETs and the search space configuration may indicate one or more identifiers of the one or more CORESETs. The search space configuration parameters may further indicate that whether the search space is a common search space or a UE-specific search space. A common search space may be monitored by a plurality of wireless devices and a UE-specific search space may be dedicated to a specific UE.

Figure 11A:
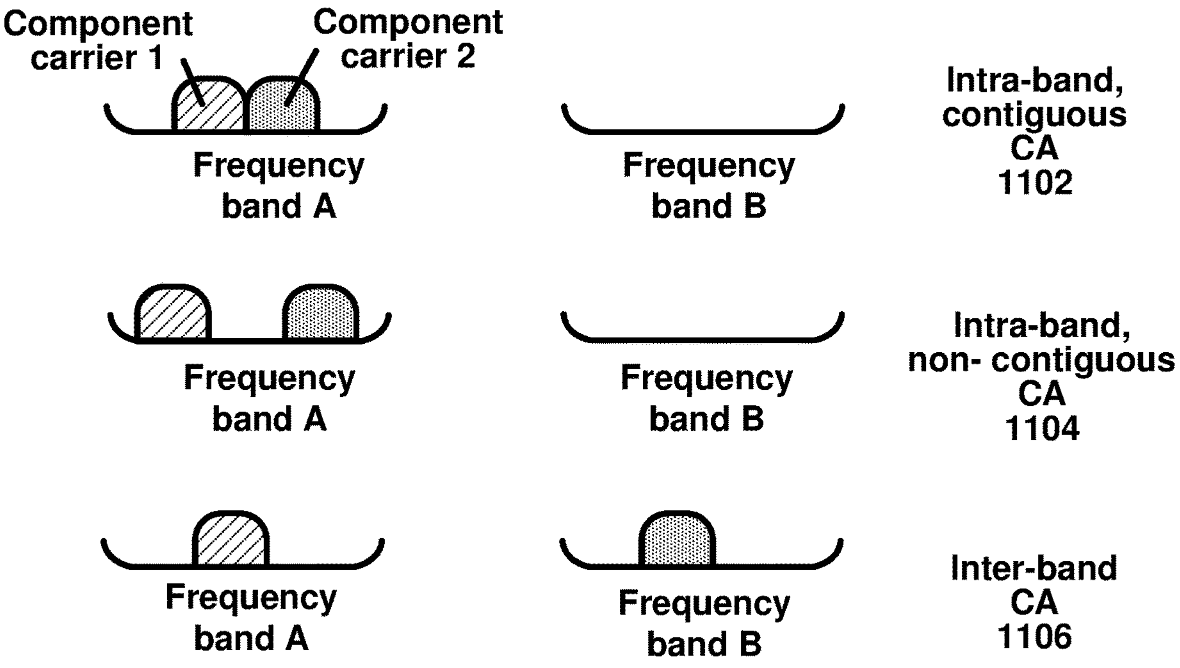
FIG. 11A shows example arrangements of carriers in carrier aggregation in accordance with several of various embodiments of the present disclosure.

FIG. 11A shows example arrangements of carriers in carrier aggregation in accordance with several of various embodiments of the present disclosure. With carrier aggregation, multiple NR component carriers (CCs) may be aggregated. Downlink transmissions to a wireless device may take place simultaneously on the aggregated downlink CCs resulting in higher downlink data rates. Uplink transmissions from a wireless device may take place simultaneously on the aggregated uplink CCs resulting in higher uplink data rates. The component carriers in carrier aggregation may be on the same frequency band (e.g., intra-band carrier aggregation) or on different frequency bands (e.g., inter-band carrier aggregation). The component carriers may also be contiguous or non-contiguous. This results in three possible carrier aggregation scenarios, intra-band contiguous CA 1102, intra-band non-contiguous CA 1104 and inter-band CA 1106 as shown in FIG. 11A. Depending on the UE capability for carrier aggregation, a UE may transmit and/or receive on multiple carriers or for a UE that is not capable of carrier aggregation, the UE may transmit and/or receive on one component carrier at a time. In this disclosure, the carrier aggregation is described using the term cell and a carrier aggregation capable UE may transmit and/or receive via multiple cells.

In carrier aggregation, a UE may be configured with multiple cells. A cell of the multiple cells configured for the UE may be referred to as a Primary Cell (PCell). The PCell may be the first cell that the UE is initially connected to. One or more other cells configured for the UE may be referred to as Secondary Cells (SCells). The base station may configure a UE with multiple SCells. The configured SCells may be deactivated upon configuration and the base station may dynamically activate or deactivate one or more of the configured SCells based on traffic and/or channel conditions. The base station may activate or deactivate configured SCells using a SCell Activation/Deactivation MAC CE. The SCell Activation/Deactivation MAC CE may comprise a bitmap, wherein each bit in the bitmap may correspond to a SCell and the value of the bit indicates an activation status or deactivation status of the SCell.

An SCell may also be deactivated in response to expiry of a SCell deactivation timer of the SCell. The expiry of an SCell deactivation timer of an SCell may be an indication of low activity (e.g., low transmission or reception activity) on the SCell. The base station may configure the SCell with an SCell deactivation timer. The base station may not configure an SCell deactivation timer for an SCell that is configured with PUCCH (also referred to as a PUCCH SCell). The configuration of the SCell deactivation timer may be per configured SCell and different SCells may be configured with different SCell deactivation timer values. The SCell deactivation timer may be restarted based on one or more criteria including reception of downlink control information on the SCell indicating uplink grant or downlink assignment for the SCell or reception of downlink control information on a scheduling cell indicating uplink grant or downlink assignment for the SCell or transmission of a MAC PDU based on a configured uplink grant or reception of a configured downlink assignment.

A PCell for a UE may be an SCell for another UE and a SCell for a UE may be PCell for another UE. The configuration of PCell may be UE-specific. One or more SCells of the multiple SCells configured for a UE may be configured as downlink-only SCells, e.g., may only be used for downlink reception and may not be used for uplink transmission. In case of self-scheduling, the base station may transmit signaling for uplink grants and/or downlink assignments on the same cell that the corresponding uplink or downlink transmission takes place. In case of cross-carrier scheduling, the base station may transmit signaling for uplink grants and/or downlink assignments on a cell different from the cell that the corresponding uplink or downlink transmission takes place.

Figure 11B:
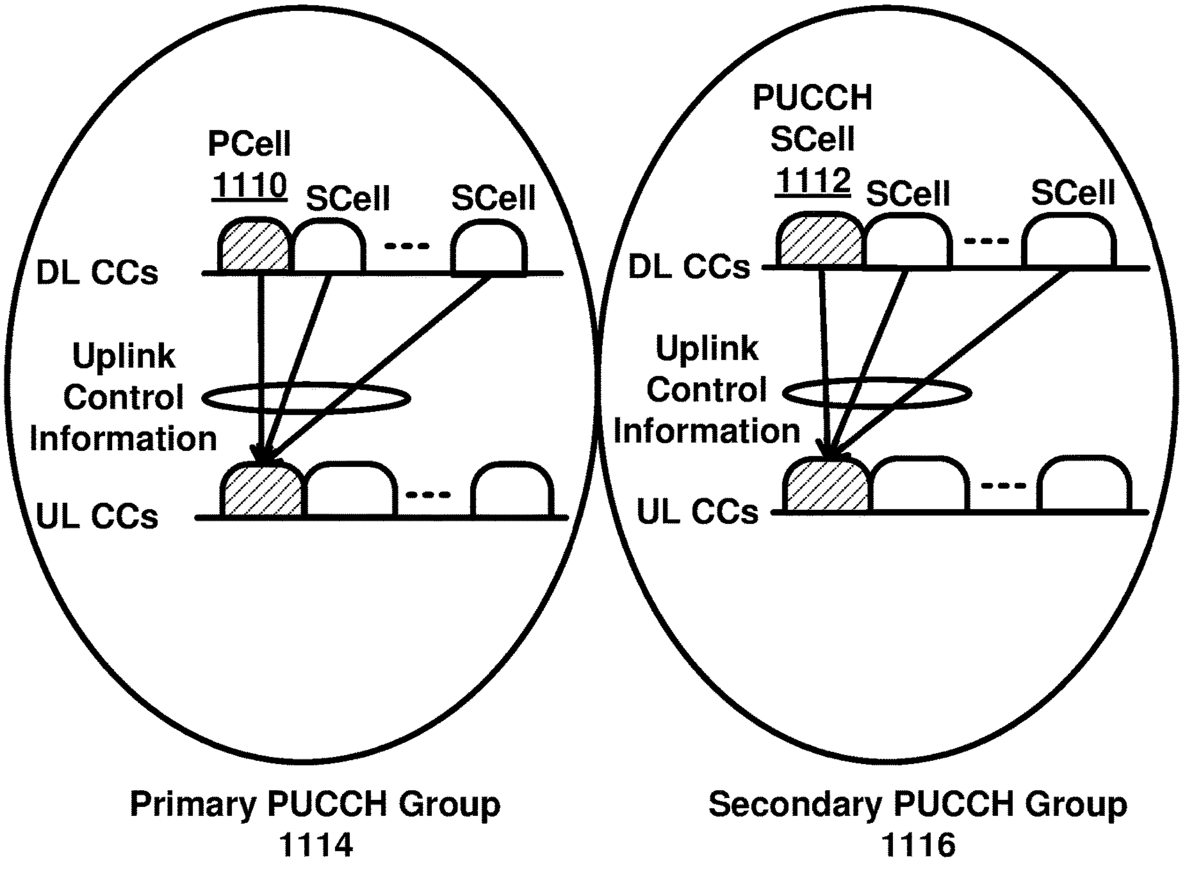
FIG. 11B shows examples of uplink control channel groups in accordance with several of various embodiments of the present disclosure.

FIG. 11B shows examples of uplink control channel groups in accordance with several of various embodiments of the present disclosure. A base station may configure a UE with multiple PUCCH groups wherein a PUCCH group comprises one or more cells. For example, as shown in FIG. 11B, the base station may configure a UE with a primary PUCCH group 1114 and a secondary PUCCH group 1116. The primary PUCCH group may comprise the PCell 1110 and one or more first SCells. First UCI corresponding to the PCell and the one or more first SCells of the primary PUCCH group may be transmitted by the PUCCH of the PCell. The first UCI may be, for example, HARQ feedback for downlink transmissions via downlink CCs of the PCell and the one or more first SCells. The secondary PUCCH group may comprise a PUCCH SCell and one or more second SCells. Second UCI corresponding to the PUCCH SCell and the one or more second SCells of the secondary PUCCH group may be transmitted by the PUCCH of the PUCCH SCell. The second UCI may be, for example, HARQ feedback for downlink transmissions via downlink CCs of the PUCCH SCell and the one or more second SCells.

Figure 12A:
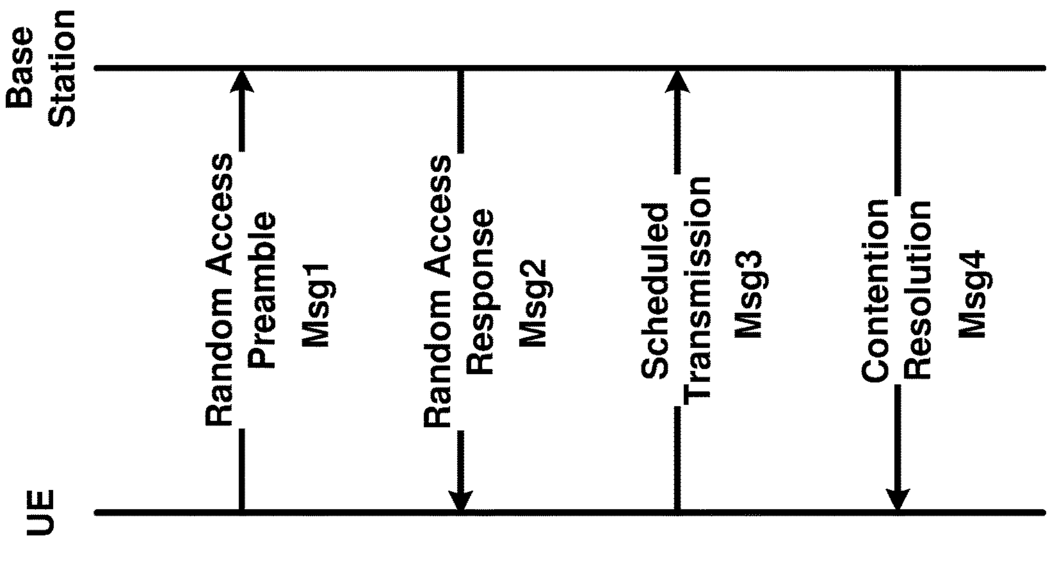
FIG. 12A, FIG. 12B and FIG. 12C show example random access processes in accordance with several of various embodiments of the present disclosure.
Figure 12B:
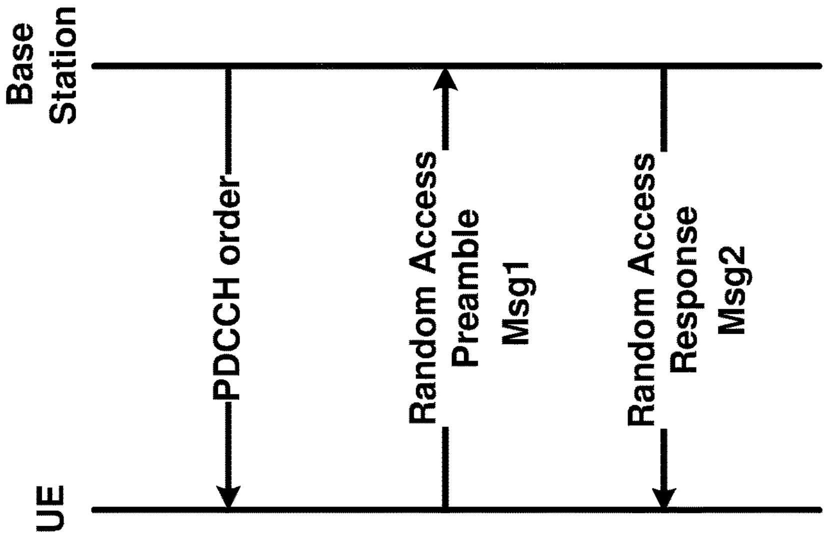
Figure 12C:
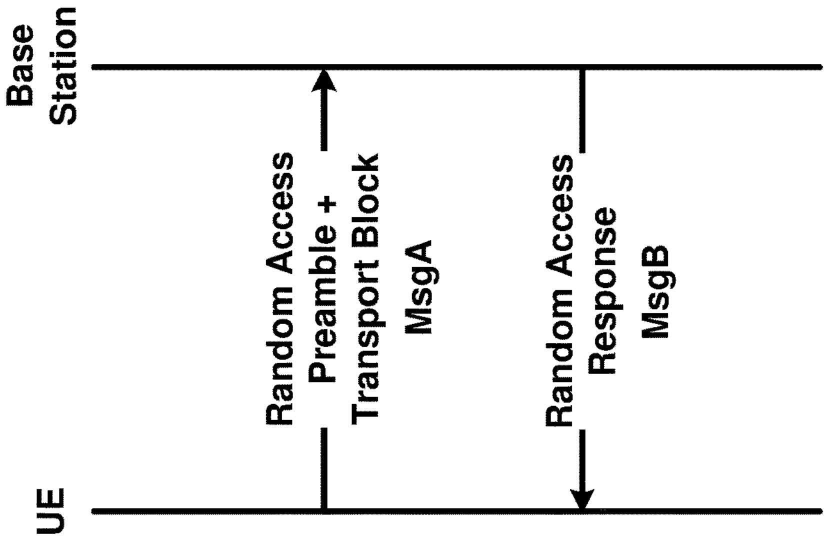

FIG. 12A, FIG. 12B and FIG. 12C show example random access processes in accordance with several of various embodiments of the present disclosure. FIG. 12A shows an example of four step contention-based random access (CBRA) procedure. The four-step CBRA procedure includes exchanging four messages between a UE and a base station. Msg1 may be for transmission (or retransmission) of a random access preamble by the wireless device to the base station. Msg2 may be the random access response (RAR) by the base station to the wireless device. Msg3 is the scheduled transmission based on an uplink grant indicated in Msg2 and Msg4 may be for contention resolution.

The base station may transmit one or more RRC messages comprising configuration parameters of the random access parameters. The random access parameters may indicate radio resources (e.g., time-frequency resources) for transmission of the random access preamble (e.g., Msg1), configuration index, one or more parameters for determining the power of the random access preamble (e.g., a power ramping parameter, a preamble received target power, etc.), a parameter indicating maximum number of preamble transmission, RAR window for monitoring RAR, cell-specific random access parameters and UE specific random access parameters. The UE-specific random access parameters may indicate one or more PRACH occasions for random access preamble (e.g., Msg1) transmissions. The random access parameters may indicate association between the PRACH occasions and one or more reference signals (e.g., SSB or CSI-RS). The random access parameters may further indicate association between the random access preambles and one or more reference signals (e.g., SBB or CSI-RS). The UE may use one or more reference signals (e.g., SSB(s) or CSI-RS(s)) and may determine a random access preamble to use for Msg1 transmission based on the association between the random access preambles and the one or more reference signals. The UE may use one or more reference signals (e.g., SSB(s) or CSI-RS(s)) and may determine the PRACH occasion to use for Msg1 transmission based on the association between the PRACH occasions and the reference signals. The UE may perform a retransmission of the random access preamble if no response is received with the RAR window following the transmission of the preamble. UE may use a higher transmission power for retransmission of the preamble. UE may determine the higher transmission power of the preamble based on the power ramping parameter.

Msg2 is for transmission of RAR by the base station. Msg2 may comprise a plurality of RARs corresponding to a plurality of random access preambles transmitted by a plurality of UEs. Msg2 may be associated with a random access temporary radio identifier (RA-RNTI) and may be received in a common search space of the UE. The RA-RNTI may be based on the PRACH occasion (e.g., time and frequency resources of a PRACH) in which a random access preamble is transmitted. RAR may comprise a timing advance command for uplink timing adjustment at the UE, an uplink grant for transmission of Msg3 and a temporary C-RNTI. In response to the successful reception of Msg2, the UE may transmit the Msg3. Msg3 and Msg4 may enable contention resolution in case of CBRA. In a CBRA, a plurality of UEs may transmit the same random access preamble and may consider the same RAR as being corresponding to them. UE may include a device identifier in Msg3 (e.g., a C-RNTI, temporary C-RNTI or other UE identity). Base station may transmit the Msg4 with a PDSCH and UE may assume that the contention resolution is successful in response to the PDSCH used for transmission of Msg4 being associated with the UE identifier included in Msg3.

FIG. 12B shows an example of a contention-free random access (CFRA) process. Msg 1 (random access preamble) and Msg 2 (random access response) in FIG. 12B for CFRA may be analogous to Msg 1 and Msg 2 in FIG. 12A for CBRA. In an example, the CFRA procedure may be initiated in response to a PDCCH order from a base station. The PDCCH order for initiating the CFRA procedure by the wireless device may be based on a DCI having a first format (e.g., format 1_0). The DCI for the PDCCH order may comprise a random access preamble index, an UL/SUL indicator indicating an uplink carrier of a cell (e.g., normal uplink carrier or supplementary uplink carrier) for transmission of the random access preamble, a SS/PBCH index indicating the SS/PBCH that may be used to determine a RACH occasion for PRACH transmission, a PRACH mask index indicating the RACH occasion associated with the SS/PBCH indicated by the SS/PBCH index for PRACH transmission, etc. In an example, the CFRA process may be started in response to a beam failure recovery process. The wireless device may start the CFRA for the beam failure recovery without a command (e.g., PDCCH order) from the base station and by using the wireless device dedicated resources.

FIG. 12C shows an example of a two-step random access process comprising two messages exchanged between a wireless device and a base station. Msg A may be transmitted by the wireless device to the base station and may comprise one or more transmissions of a preamble and/or one or more transmissions of a transport block. The transport block in Msg A and Msg 3 in FIG. 12A may have similar and/or equivalent contents. The transport block of Msg A may comprise data and control information (e.g., SR, HARQ feedback, etc.). In response to the transmission of Msg A, the wireless device may receive Msg B from the base station. Msg B in FIG. 12C and Msg 2 (e.g., RAR) illustrated in FIGS. 12A and 12B may have similar and/or equivalent content.

The base station may periodically transmit synchronization signals (SSs), e.g., primary SS (PSS) and secondary SS (SSS) along with PBCH on each NR cell. The PSS/SSS together with PBCH is jointly referred to as a SS/PBCH block. The SS/PBCH block enables a wireless device to find a cell when entering to the mobile communications network or find new cells when moving within the network. The SS/PBCH block spans four OFDM symbols in time domain. The PSS is transmitted in the first symbol and occupies 127 subcarriers in frequency domain. The SSS is transmitted in the third OFDM symbol and occupies the same 127 subcarriers as the PSS. The are eight and nine empty subcarriers on each side of the SSS. The PBCH is transmitted on the second OFDM symbol occupying 240 subcarriers, the third OFDM symbol occupying 48 subcarriers on each side of the SSS, and on the fourth OFDM symbol occupying 240 subcarriers. Some of the PBCH resources indicated above may be used for transmission of the demodulation reference signal (DMRS) for coherent demodulation of the PBCH. The SS/PBCH block is transmitted periodically with a period ranging from 5 ms to 160 ms. For initial cell search or for cell search during inactive/idle state, a wireless device may assume that that the SS/PBCH block is repeated at least every 20 ms.

In NR, transmissions using of antenna arrays, with many antenna elements, and beamforming plays an important role specially in higher frequency bands. Beamforming enables higher capacity by increasing the signal strength (e.g., by focusing the signal energy in a specific direction) and by lowering the amount interference received at the wireless devices. The beamforming techniques may generally be divided to analog beamforming and digital beamforming techniques. With digital beamforming, signal processing for beamforming is carried out in the digital domain before digital-to-analog conversion and detailed control of both amplitude and phase of different antenna elements may be possible. With analog beamforming, the signal processing for beamforming is carried out in the analog domain and after the digital to analog conversion. The beamformed transmissions may be in one direction at a time. For example, the wireless devices that are in different directions relative to the base station may receive their downlink transmissions at different times. For analog receiver-side beamforming, the receiver may focus its receiver beam in one direction at a time.

In NR, the base station may use beam sweeping for transmission of SS/PBCH blocks. The SS/PBCH blocks may be transmitted in different beams using time multiplexing. The set of SS/PBCH blocks that are transmitted in one beam sweep may be referred to as a SS/PBCH block set. The period of PBCH/SSB block transmission may be a time duration between a SS/PBCH block transmission in a beam and the next SS/PBCH block transmission in the same beam. The period of SS/PBCH block is, therefore, also the period of the SS/PBCH block set.

Figure 13A:
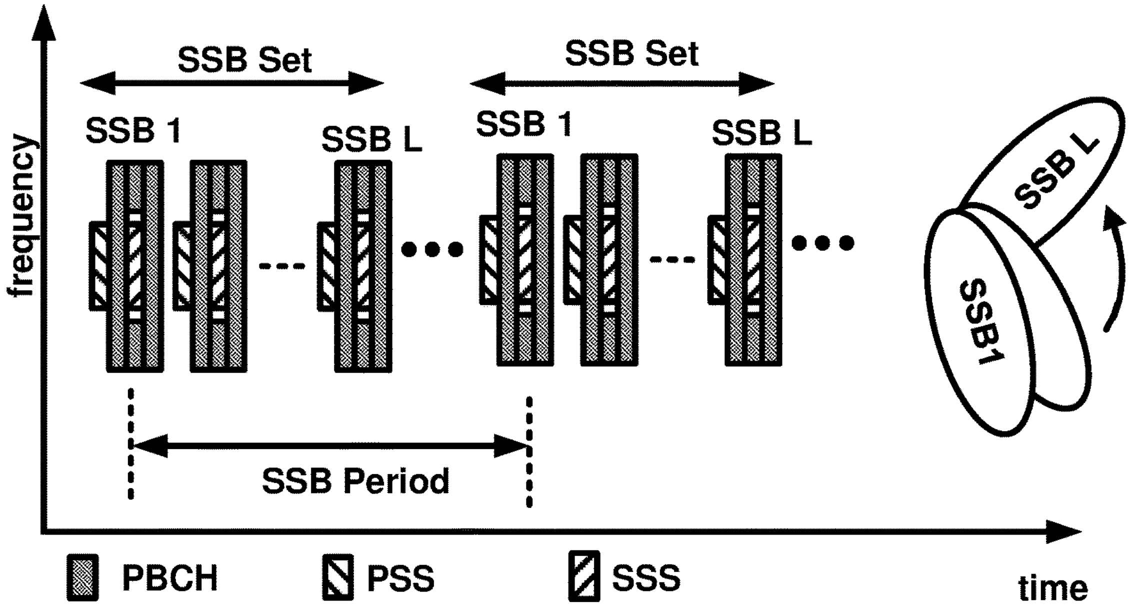
FIG. 13A shows example time and frequency structure of SSBs and their associations with beams in accordance with several of various embodiments of the present disclosure.

FIG. 13A shows example time and frequency structure of SS/PBCH blocks and their associations with beams in accordance with several of various embodiments of the present disclosure. In this example, a SS/PBCH block (also referred to as SSB) set comprise L SSBs wherein an SSB in the SSB set is associated with (e.g., transmitted in) one of L beams of a cell. The transmission of SBBs of an SSB set may be confined within a 5 ms interval, either in a first half-frame or a second half-frame of a 10 ms frame. The number of SSBs in an SSB set may depend on the frequency band of operation. For example, the number of SSBs in a SSB set may be up to four SSBs in frequency bands below 3 GHz enabling beam sweeping of up to four beams, up to eight SSBs in frequency bands between 3 GHz and 6 GHz enabling beam sweeping of up to eight beams, and up to sixty four SSBs in higher frequency bands enabling beam sweeping of up to sixty four beams. The SSs of an SSB may depend on a physical cell identity (PCI) of the cell and may be independent of which beam of the cell is used for transmission of the SSB. The PBCH of an SSB may indicate a time index parameter and the wireless device may determine the relative position of the SSB within the SSB set using the time index parameter. The wireless device may use the relative position of the SSB within an SSB set for determining the frame timing and/or determining RACH occasions for a random access process.

A wireless device entering the mobile communications network may first search for the PSS. After detecting the PSS, the wireless device may determine the synchronization up to the periodicity of the PSS. By detecting the PSS, the wireless device may determine the transmission timing of the SSS. The wireless device may determine the PCI of the cell after detecting the SSS. The PBCH of a SS/PBCH block is a downlink physical channel that carries the MIB. The MIB may be used by the wireless device to obtain remaining system information (RMSI) that is broadcast by the network. The RMSI may include System Information Block 1 (SIB1) that contains information required for the wireless device to access the cell.

As discussed earlier, the wireless device may determine a time index parameter from the SSB. The PBCH comprises a half-frame parameter indicating whether the SSB is in the first 5 ms half or the second 5 ms half of a 10 ms frame. The wireless device may determine the frame boundary using the time index parameter and the half-frame parameter. In addition, the PBCH may comprise a parameter indicating the system frame number (SFN) of the cell.

The base station may transmit CSI-RS and a UE may measure the CSI-RS to obtain channel state information (CSI). The base station may configure the CSI-RS in a UE-specific manner. In some scenarios, same set of CSI-RS resources may be configured for multiple UEs and one or more resource elements of a CSI-RS resource may be shared among multiple UEs. A CSI-RS resource may be configured such that it does not collide with a CORESET configured for the wireless device and/or with a DMRS of a PDSCH scheduled for the wireless device and/or transmitted SSBs. The UE may measure one or more CSI-RSs configured for the UE and may generate a CSI report based on the CSI-RS measurements and may transmit the CSI report to the base station for scheduling, link adaptation and/or other purposes.

NR supports flexible CSI-RS configurations. A CSI-RS resource may be configured with single or multiple antenna ports and with configurable density. Based on the number of configured antenna ports, a CSI-RS resource may span different number of OFDM symbols (e.g., 1, 2, and 4 symbols). The CSI-RS may be configured for a downlink BWP and may use the numerology of the downlink BWP. The CSI-RS may be configured to cover the full bandwidth of the downlink BWP or a portion of the downlink BWP. In some case, the CSI-RS may be repeated in every resource block of the CSI-RS bandwidth, referred to as CSI-RS with density equal to one. In some cases, the CSI-RS may be configured to be repeated in every other resource block of the CSI-RS bandwidth. CSI-RS may be non-zero power (NZP) CSI-RS or zero-power (ZP) CSI-RS.

The base station may configure a wireless device with one or more sets of NZP CSI-RS resources. The base station may configure the wireless device with a NZP CSI-RS resource set using an RRC information element (IE) NZP-CSI-RS-ResourceSet indicating a NZP CSI-RS resource set identifier (ID) and parameters specific to the NZP CSI-RS resource set. An NZP CSI-RS resource set may comprise one or more CSI-RS resources. An NZP CSI-RS resource set may be configured as part of the CSI measurement configuration.

The CSI-RS may be configured for periodic, semi-persistent or aperiodic transmission. In case of the periodic and semi-persistent CSI-RS configurations, the wireless device may be configured with a CSI resource periodicity and offset parameter that indicate a periodicity and corresponding offset in terms of number of slots. The wireless device may determine the slots that the CSI-RSs are transmitted. For semi-persistent CSI-RS, the CSI-RS resources for CSI-RS transmissions may be activated and deactivated by using a semi-persistent (SP) CSI-CSI Resource Set Activation/Deactivation MAC CE. In response to receiving a MAC CE indicating activation of semi-persistent CSI-RS resources, the wireless device may assume that the CSI-RS transmissions will continue until the CSI-RS resources for CSI-RS transmissions are activated.

As discussed before, CSI-RS may be configured for a wireless device as NZP CSI-RS or ZP CSI-RS. The configuration of the ZP CSI-RS may be similar to the NZP CSI-RS with the difference that the wireless device may not carry out measurements for the ZP CSI-RS. By configuring ZP CSI-RS, the wireless device may assume that a scheduled PDSCH that includes resource elements from the ZP CSI-RS is rate matched around those ZP CSI-RS resources. For example, a ZP CSI-RS resource configured for a wireless device may be an NZP CSI-RS resource for another wireless device. For example, by configuring ZP CSI-RS resources for the wireless device, the base station may indicate to the wireless device that the PDSCH scheduled for the wireless device is rate matched around the ZP CSI-RS resources.

A base station may configure a wireless device with channel state information interference measurement (CSI-IM) resources. Similar to the CSI-RS configuration, configuration of locations and density of CSI-IM resources may be flexible. The CSI-IM resources may be periodic (configured with a periodicity), semi-persistent (configured with a periodicity and activated and deactivated by MAC CE) or aperiodic (triggered by a DCI).

Tracking reference signals (TRSs) may be configured for a wireless device as a set of sparse reference signals to assist the wireless in time and frequency tracking and compensating time and frequency variations in its local oscillator. The wireless device may further use the TRSs for estimating channel characteristics such as delay spread or doppler frequency. The base station may use a CSI-RS configuration for configuring TRS for the wireless device. The TRS may be configured as a resource set comprising multiple periodic NZP CSI-RS resources.

A base station may configure a UE and the UE may transmit sounding reference signals (SRSs) to enable uplink channel sounding/estimation at the base station. The SRS may support up to four antenna ports and may be designed with low cubic metric enabling efficient operation of the wireless device amplifier. The SRS may span one or more (e.g., one, two or four) consecutive OFDM symbols in time domain and may be located within the last n (e.g., six) symbols of a slot. In the frequency domain, the SRS may have a structure that is referred to as a comb structure and may be transmitted on every Nth subcarrier. Different SRS transmissions from different wireless devices may have different comb structures and may be multiplexed in frequency domain.

A base station may configure a wireless device with one or more SRS resource sets and an SRS resource set may comprise one or more SRS resources. The SRS resources in an SRS resources set may be configured for periodic, semi-persistent or aperiodic transmission. The periodic SRS and the semi-persistent SRS resources may be configured with periodicity and offset parameters. The Semi-persistent SRS resources of a configured semi-persistent SRS resource set may be activated or deactivated by a semi-persistent (SP) SRS Activation/Deactivation MAC CE. The set of SRS resources included in an aperiodic SRS resource set may be activated by a DCI. A value of a field (e.g., an SRS request field) in the DCI may indicate activation of resources in an aperiodic SRS resource set from a plurality of SRS resource sets configured for the wireless device.

An antenna port may be associated with one or more reference signals. The receiver may assume that the one or more reference signals, associated with the antenna port, may be used for estimating channel corresponding to the antenna port. The reference signals may be used to derive channel state information related to the antenna port. Two antenna ports may be referred to as quasi co-located if characteristics (e.g., large-scale properties) of the channel over which a symbol is conveyed on one antenna port may be inferred from the channel over which a symbol is conveyed from another antenna port. For example, a UE may assume that radio channels corresponding to two different antenna ports have the same large-scale properties if the antenna ports are specified as quasi co-located. In some cases, the UE may assume that two antenna ports are quasi co-located based on signaling received from the base station. Spatial quasi-colocation (QCL) between two signals may be, for example, due to the two signals being transmitted from the same location and in the same beam. If a receive beam is good for a signal in a group of signals that are spatially quasi co-located, it may be assumed also be good for the other signals in the group of signals.

The CSI-RS in the downlink and the SRS in uplink may serve as quasi-location (QCL) reference for other physical downlink channels and physical uplink channels, respectively. For example, a downlink physical channel (e.g., PDSCH or PDCCH) may be spatially quasi co-located with a downlink reference signal (e.g., CSI-RS or SSB). The wireless device may determine a receive beam based on measurement on the downlink reference signal and may assume that the determined received beam is also good for reception of the physical channels (e.g., PDSCH or PDCCH) that are spatially quasi co-located with the downlink reference signal. Similarly, an uplink physical channel (e.g., PUSCH or PUCCH) may be spatially quasi co-located with an uplink reference signal (e.g., SRS). The base station may determine a receive beam based on measurement on the uplink reference signal and may assume that the determined received beam is also good for reception of the physical channels (e.g., PUSCH or PUCCH) that are spatially quasi co-located with the uplink reference signal.

The Demodulation Reference Signals (DM-RSs) enables channel estimation for coherent demodulation of downlink physical channels (e.g., PDSCH, PDCCH and PBH) and uplink physical channels (e.g., PUSCH and PUCCH). The DM-RS may be located early in the transmission (e.g., front-loaded DM-RS) and may enable the receiver to obtain the channel estimate early and reduce the latency. The time-domain structure of the DM-RS (e.g., symbols wherein the DM-RS are located in a slot) may be based on different mapping types.

The Phase Tracking Reference Signals (PT-RSs) enables tracking and compensation of phase variations across the transmission duration. The phase variations may be, for example, due to oscillator phase noise. The oscillator phase noise may become more sever in higher frequencies (e.g., mmWave frequency bands). The base station may configure the PT-RS for uplink and/or downlink. The PT-RS configuration parameters may indicate frequency and time density of PT-RS, maximum number of ports (e.g., uplink ports), resource element offset, configuration of uplink PT-RS without transform precoder (e.g., CP-OFDM) or with transform precoder (e.g., DFT-s-OFDM), etc. The subcarrier number and/or resource blocks used for PT-RS transmission may be based on the C-RNTI of the wireless device to reduce risk of collisions between PT-RSs of wireless devices scheduled on overlapping frequency domain resources.

Figure 13B:
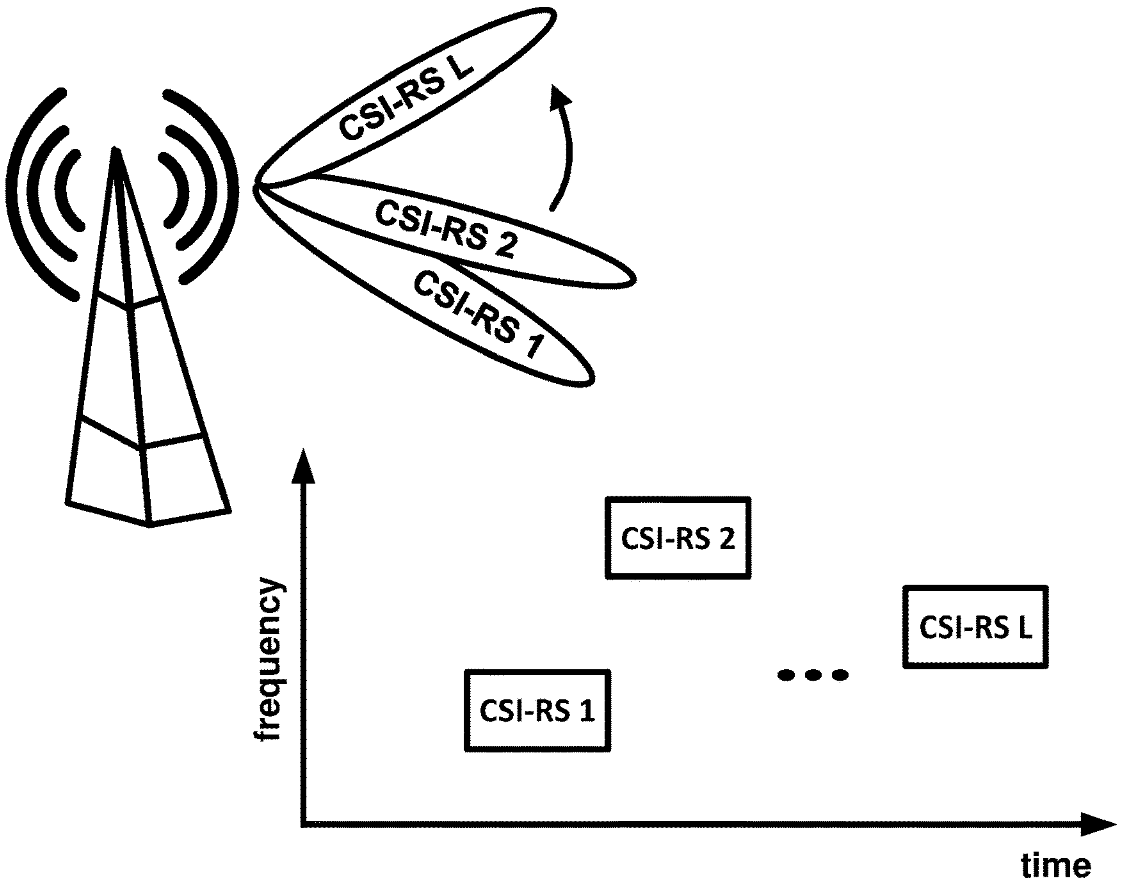
FIG. 13B shows example time and frequency structure of CSI-RSs and their association with beams in accordance with several of various embodiments of the present disclosure.

FIG. 13B shows example time and frequency structure of CSI-RSs and their association with beams in accordance with several of various embodiments of the present disclosure. A beam of the L beams shown in FIG. 13B may be associated with a corresponding CSI-RS resource. The base station may transmit the CSI-RSs using the configured CSI-RS resources and a UE may measure the CSI-RSs (e.g., received signal received power (RSRP) of the CSI-RSs) and report the CSI-RS measurements to the base station based on a reporting configuration. For example, the base station may determine one or more transmission configuration indication (TCI) states and may indicate the one or more TCI states to the UE (e.g., using RRC signaling, a MAC CE and/or a DCI). Based on the one or more TCI states indicated to the UE, the UE may determine a downlink receive beam and receive downlink transmissions using the receive beam. In case of a beam correspondence, the UE may determine a spatial domain filter of a transmit beam based on spatial domain filter of a corresponding receive beam. Otherwise, the UE may perform an uplink beam selection procedure to determine the spatial domain filter of the transmit beam. The UE may transmit one or more SRSs using the SRS resources configured for the UE and the base station may measure the SRSs and determine/select the transmit beam for the UE based the SRS measurements. The base station may indicate the selected beam to the UE. The CSI-RS resources shown in FIG. 13B may be for one UE. The base station may configure different CSI-RS resources associated with a given beam for different UEs by using frequency division multiplexing.

A base station and a wireless device may perform beam management procedures to establish beam pairs (e.g., transmit and receive beams) that jointly provide good connectivity. For example, in the downlink direction, the UE may perform measurements for a beam pair and estimate channel quality for a transmit beam by the base station (or a transmission reception point (TRP) more generally) and the receive beam by the UE. The UE may transmit a report indicating beam pair quality parameters. The report may comprise one or more parameters indicating one or more beams (e.g., a beam index, an identifier of reference signal associated with a beam, etc.), one or more measurement parameters (e.g., RSRP), a precoding matrix indicator (PMI), a channel quality indicator (CQI), and/or a rank indicator (RI).

Figure 14A:
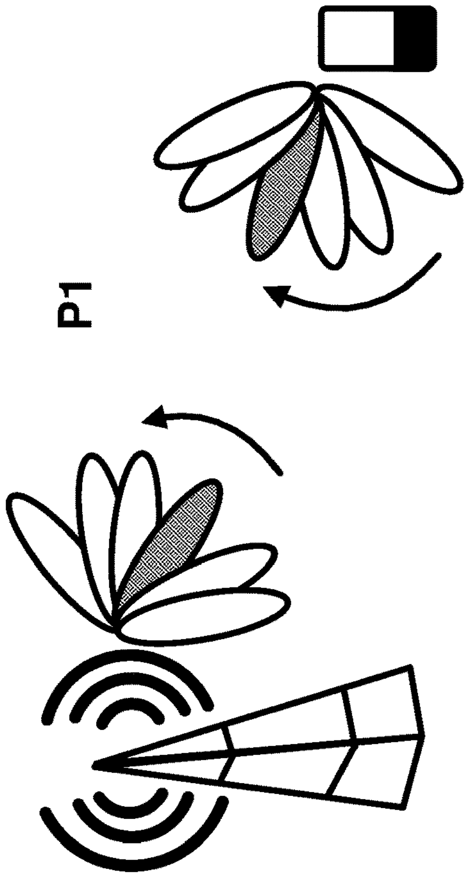
FIG. 14A, FIG. 14B and FIG. 14C show example beam management processes in accordance with several of various embodiments of the present disclosure.
Figure 14B:
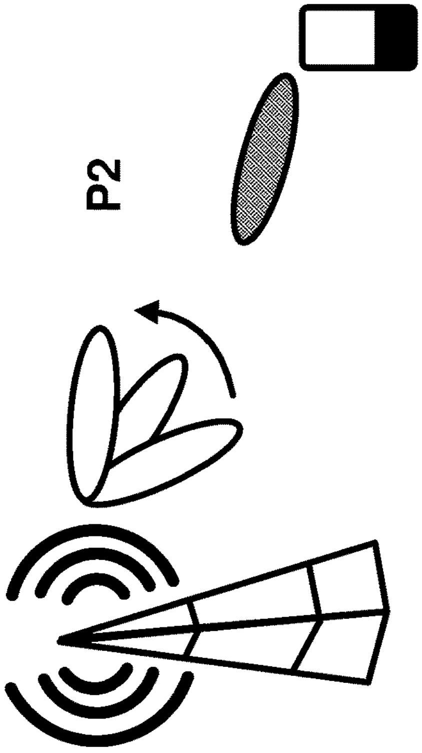
Figure 14C:
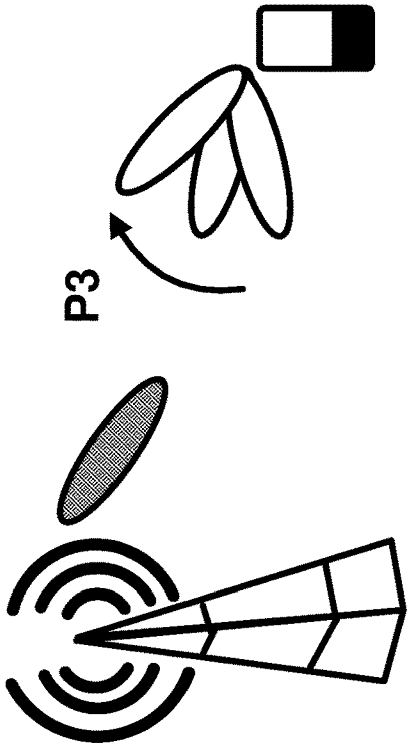

FIG. 14A, FIG. 14B and FIG. 14C show example beam management processes (referred to as P1, P2 and P3, respectively) in accordance with several of various embodiments of the present disclosure. The P1 process shown in FIG. 14A may enable, based on UE measurements, selection of a base station (or TRP more generally) transmit beam and/or a wireless device receive beam. The TRP may perform a beam sweeping procedure where the TRP may sequentially transmit reference signals (e.g., SSB and/or CSI-RS) on a set of beams and the UE may select a beam from the set of beams and may report the selected beam to the TRP. The P2 procedure as shown in FIG. 14B may be a beam refinement procedure. The selection of the TRP transmit beam and the UE receive beam may be regularly reevaluated due to movements and/or rotations of the UE or movement of other objects. In an example, the base station may perform the beam sweeping procedure over a smaller set of beams and the UE may select the best beam over the smaller set. In an example, the beam shape may be narrower compared to beam selected based on the P1 procedure. Using the P3 procedure as shown in FIG. 14C, the TRP may fix its transmit beam and the UE may refine its receive beam.

A wireless device may receive one or more messages from a base station. The one or more messages may comprise one or more RRC messages. The one or more messages may comprise configuration parameters of a plurality of cells for the wireless device. The plurality of cells may comprise a primary cell and one or more secondary cells. For example, the plurality of cells may be provided by a base station and the wireless device may communicate with the base station using the plurality of cells. For example, the plurality of cells may be provided by multiple base station (e.g., in case of dual and/or multi-connectivity). The wireless device may communicate with a first base station, of the multiple base stations, using one or more first cells of the plurality of cells. The wireless device may communicate with a second base station of the multiple base stations using one or more second cells of the plurality of cells.

The one or more messages may comprise configuration parameters used for processes in physical, MAC, RLC, PCDP, SDAP, and/or RRC layers of the wireless device. For example, the configuration parameters may include values of timers used in physical, MAC, RLC, PCDP, SDAP, and/or RRC layers. For example, the configuration parameters may include parameters for configurating different channels (e.g., physical layer channel, logical channels, RLC channels, etc.) and/or signals (e.g., CSI-RS, SRS, etc.).

Upon starting a timer, the timer may start running until the timer is stopped or until the timer expires. A timer may be restarted if it is running. A timer may be started if it is not running (e.g., after the timer is stopped or after the timer expires). A timer may be configured with or may be associated with a value (e.g., an initial value). The timer may be started or restarted with the value of the timer. The value of the timer may indicate a time duration that the timer may be running upon being started or restarted and until the timer expires. The duration of a timer may not be updated until the timer is stopped or expires (e.g., due to BWP switching). This specification may disclose a process that includes one or more timers. The one or more timers may be implemented in multiple ways. For example, a timer may be used by the wireless device and/or base station to determine a time window [t1, t2], wherein the timer is started at time t1 and expires at time t2 and the wireless device and/or the base station may be interested in and/or monitor the time window [t1, t2], for example to receive a specific signaling. Other examples of implementation of a timer may be provided.

Figure 15:
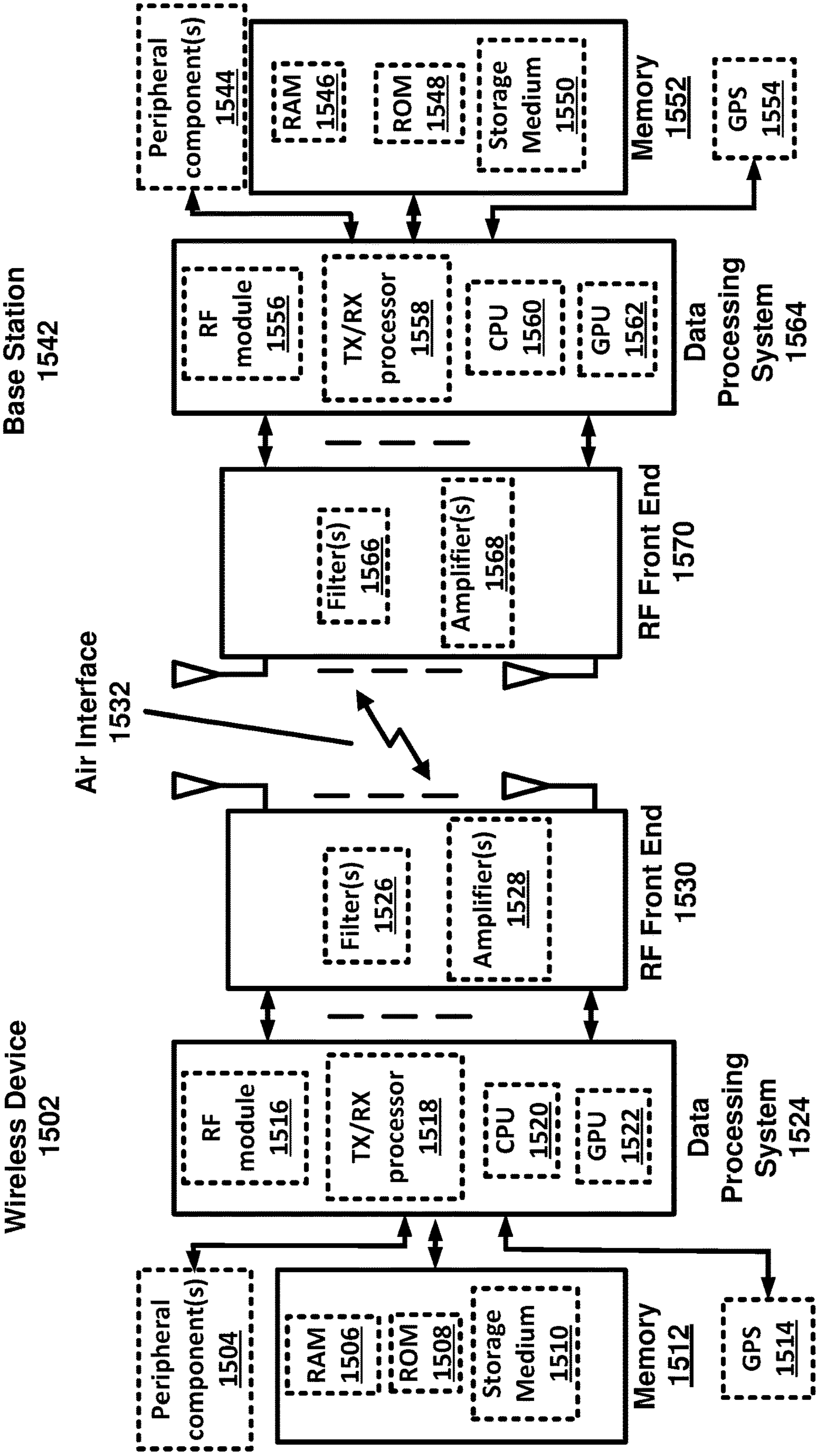
FIG. 15 shows example components of a wireless device and a base station that are in communication via an air interface in accordance with several of various embodiments of the present disclosure.

FIG. 15 shows example components of a wireless device and a base station that are in communication via an air interface in accordance with several of various embodiments of the present disclosure. The wireless device 1502 may communicate with the base station 1542 over the air interface 1532. The wireless device 1502 may include a plurality of antennas. The base station 1542 may include a plurality of antennas. The plurality of antennas at the wireless device 1502 and/or the base station 1542 enables different types of multiple antenna techniques such as beamforming, single-user and/or multi-user MIMO, etc.

The wireless device 1502 and the base station 1542 may have one or more of a plurality of modules/blocks, for example RF front end (e.g., RF front end 1530 at the wireless device 1502 and RF front end 1570 at the base station 1542), Data Processing System (e.g., Data Processing System 1524 at the wireless device 1502 and Data Processing System 1564 at the base station 1542), Memory (e.g., Memory 1512 at the wireless device 1502 and Memory 1542 at the base station1542). Additionally, the wireless device 1502 and the base station 1542 may have other modules/blocks such as GPS (e.g., GPS 1514 at the wireless device 1502 and GPS 1554 at the base station 1542).

An RF front end module/block may include circuitry between antennas and a Data Processing System for proper conversion of signals between these two modules/blocks. An RF front end may include one or more filters (e.g., Filter(s) 1526 at RF front end 1530 or Filter(s) 1566 at the RF front end 1570), one or more amplifiers (e.g., Amplifier(s) 1528 at the RF front end 1530 and Amplifier(s) 1568 at the RF front end 1570). The Amplifier(s) may comprise power amplifier(s) for transmission and low-noise amplifier(s) (LNA(s)) for reception.

The Data Processing System 1524 and the Data Processing System 1564 may process the data to be transmitted or the received signals by implementing functions at different layers of the protocol stack such as PHY, MAC, RLC, etc. Example PHY layer functions that may be implemented by the Data Processing System 1524 and/or 1564 may include forward error correction, interleaving, rate matching, modulation, precoding, resource mapping, MIMO processing, etc. Similarly, one or more functions of the MAC layer, RLC layer and/or other layers may be implemented by the Data Processing System 1524 and/or the Data Processing System 1564. One or more processes described in the present disclosure may be implemented by the Data Processing System 1524 and/or the Data Processing System 1564. A Data Processing System may include an RF module (RF module 1516 at the Data Processing System 1524 and RF module 1556 at the Data Processing System 1564) and/or a TX/RX processor (e.g., TX/RX processor 1518 at the Data Processing System 1524 and TX/RX processor 1558 at the Data Processing System 1566) and/or a central processing unit (CPU) (e.g., CPU 1520 at the Data Processing System 1524 and CPU 1560 at the Data Processing System 1564) and/or a graphical processing unit (GPU) (e.g., GPU 1522 at the Data Processing System 1524 and GPU 1562 at the Data Processing System 1564).

The Memory 1512 may have interfaces with the Data Processing System 1524 and the Memory 1552 may have interfaces with Data Processing System 1564, respectively. The Memory 1512 or the Memory 1552 may include non-transitory computer readable mediums (e.g., Storage Medium 1510 at the Memory 1512 and Storage Medium 1550 at the Memory 1552) that may store software code or instructions that may be executed by the Data Processing System 1524 and Data Processing System 1564, respectively, to implement the processes described in the present disclosure. The Memory 1512 or the Memory 1552 may include random-access memory (RAM) (e.g., RAM 1506 at the Memory 1512 or RAM 1546 at the Memory 1552) or read-only memory (ROM) (e.g., ROM 1508 at the Memory 1512 or ROM 1548 at the Memory 1552) to store data and/or software codes.

The Data Processing System 1524 and/or the Data Processing System 1564 may be connected to other components such as a GPS module 1514 and a GPS module 1554, respectively, wherein the GPS module 1514 and a GPS module 1554 may enable delivery of location information of the wireless device 1502 to the Data Processing System 1524 and location information of the base station 1542 to the Data Processing System 1564. One or more other peripheral components (e.g., Peripheral Component(s) 1504 or Peripheral Component(s) 1544) may be configured and connected to the data Processing System 1524 and data Processing System 1564, respectively.

In example embodiments, a wireless device may be configured with parameters and/or configuration arrangements. For example, the configuration of the wireless device with parameters and/or configuration arrangements may be based on one or more control messages that may be used to configure the wireless device to implement processes and/or actions. The wireless device may be configured with the parameters and/or the configuration arrangements regardless of the wireless device being in operation or not in operation. For example, software, firmware, memory, hardware and/or a combination thereof and/or alike may be configured in a wireless device regardless of the wireless device being in operation or not operation. The configured parameters and/or settings may influence the actions and/or processes performed by the wireless device when in operation.

In example embodiments, a wireless device may receive one or more message comprising configuration parameters. For example, the one or more messages may comprise radio resource control (RRC) messages. A parameter of the configuration parameters may be in at least one of the one or more messages. The one or more messages may comprise information element (IEs). An information element may be a structural element that includes single or multiple fields. The fields in an IE may be individual contents of the IE. The terms configuration parameter, IE and field may be used equally in this disclosure. The IEs may be implemented using a nested structure, wherein an IE may include one or more other IEs and an IE of the one or more other IEs may include one or more additional IEs. With this structure, a parent IE contains all the offspring IEs as well. For example, a first IE containing a second IE, the second IE containing a third IE, and the third IE containing a fourth IE may imply that the first IE contains the third IE and the fourth IE.

The amount of licensed spectrum available for an operator to meet the demands may not be sufficient and obtaining licensed spectrum may be costly. Unlicensed spectrum is freely available subject to a set of rules, for example rules on maximum transmission power. Since the unlicensed spectrum is freely available, the interference situation may be more unpredictable compared to licensed spectrum. Achieving quality-of-service may be more challenging in unlicensed spectrum. WLANs and Bluetooth are examples of communication systems exploiting unlicensed spectrum in the lower-frequency range, e.g., 2.4 GHz or 5 GHz.

Some of the frequency bands used by an NR communications system may be unlicensed (e.g., in lower and/or higher frequency bands). Different deployment scenarios may be used in example embodiments. Example deployment scenarios include: carrier aggregation between licensed band NR (for example for PCell) and unlicensed band NR (NR-U) (for example for SCell), wherein NR-U SCell may have both DL and UL or may be DL-only; dual connectivity between licensed band LTE (e.g., PCell) and NR-U (e.g., PSCell); standalone NR-U, wherein PCell and SCell may be both in unlicensed bands; an NR cell with DL in unlicensed band and UL in licensed band; and dual connectivity between licensed band NR (e.g., PCell) and NR-U (e.g., PSCell).

In an example, the licensed spectrum may be used to provide wide-area coverage and quality-of-service guarantees, with unlicensed spectrum used as a local-area complement to increase user data rates and overall capacity without compromising on overall coverage, availability, and reliability. This may be referred to as License-Assisted Access (LAA).

In an example, to enable fair sharing of unlicensed spectra with other operators and/or systems (e.g., Wi-Fi), several mechanisms may be used in example embodiments. Example mechanisms may include dynamic frequency selection (DFS), where a network node may search and find a part of the unlicensed spectrum with low load. Example embodiments may employ listen-before-talk (LBT) based on example channel access procedures, where the transmitter ensures there are no ongoing transmissions on the carrier frequency prior to transmitting.

In an example, a channel may refer to a carrier or a part of a carrier on which a channel access procedure is performed. A channel access procedure is a procedure based on sensing that evaluates the availability of a channel for performing transmissions on. The basic unit for sensing may be a sensing slot with a duration $T_{sl}$=9 us. The sensing slot duration $T_{sl}$ may be considered to be idle if a base station or a wireless device senses the channel during the sensing slot duration, and determines that the detected power for at least a portion (e.g., 4 us) within the sensing slot duration is less than an energy detection threshold (e.g., $X_{Thresh}$). Otherwise, the sensing slot duration $T_{sl}$ may be considered to be busy.

A Channel Occupancy Time (COT) may refer to the total time for which eNB/gNB/UE and eNB/gNB/UEs sharing the channel occupancy can perform transmission(s) on a channel after an eNB/gNB/UE performs the corresponding channel access procedures. For determining a Channel Occupancy Time, if a transmission gap is less than 25 us, the gap duration may be counted in the channel occupancy time. A channel occupancy time may be shared for transmission between a base station and the corresponding wireless device(s). A DL transmission burst may be defined as a set of transmissions from a base station without gaps greater than 16 us. Transmissions from a base station separated by a gap of more than 16 us may be considered as separate DL transmission bursts. An UL transmission burst may be defined as a set of transmissions from a UE without gaps greater than 16 us. Transmissions from a wireless device separated by a gap of more than 16 us may be considered as separate UL transmission.

In an example, a wireless device may access a channel on which uplink transmission(s) are performed according to an uplink channel access procedure (e.g., one of Type 1 or Type 2 uplink channel access procedures). If an uplink grant scheduling a PUSCH transmission indicates Type 1 channel access procedure, the wireless device may use Type 1 channel access procedure for transmitting transmissions including the PUSCH transmission. A wireless device may use Type 1 channel access procedure for transmitting transmissions including autonomous PUSCH transmission on configured uplink resources. If an uplink grant scheduling a PUSCH transmission indicates Type 2 channel access procedure, the wireless device may use Type 2 channel access procedure for transmitting transmissions including the PUSCH transmission. A wireless device may use Type 1 channel access procedure for transmitting SRS transmissions not including a PUSCH transmission. In an example, uplink channel access priority class p=1, as shown in FIG. 16, may be used for SRS transmissions not including a PUSCH.

In an example, if a wireless device is scheduled by a base station to transmit PUSCH and SRS in contiguous transmissions without gaps in between, and if the wireless device cannot access the channel for PUSCH transmission, the wireless device may attempt to make SRS transmission according to uplink channel access procedures for SRS transmission.

In an example, a wireless device may use Type 1 channel access procedure for PUCCH only transmissions or PUSCH only transmissions without UL-SCH with UL channel access priority class p=1 in FIG. 16.

In an example, a wireless device may use Type 1 channel access procedure for transmissions related to random access procedure with uplink channel access priority class p=1 in FIG. 16.

In an example, the total duration of autonomous uplink transmission(s) obtained by the channel access procedure, including the following DL transmission if the UE sets 'COT sharing indication' in AUL-UCI to '1' in a subframe within the autonomous uplink transmission(s), may not exceed $T_{ulmcot,p}$, where $T_{ulmcot,p}$ is given in FIG. 16.

In an example, a wireless device may detect 'UL duration and offset' field in a DCI. If the UL duration and offset' field indicates an 'UL offset' l and an 'UL duration' d for subframe n, then the scheduled UE may use channel access Type 2 for transmissions in subframes n+l+i where i=0, 1, . . . d−1, irrespective of the channel access Type signalled in the UL grant for those subframes, if the end of wireless device transmission occurs in or before subframe n+l+d−1.

In an example, if the 'UL duration and offset' field indicates an 'UL offset' l and an 'UL duration' d for subframe n and the 'COT sharing indication for AUL' field is set to '1', a UE configured with autonomous UL may use channel access Type 2 for autonomous UL transmissions corresponding to any priority class in subframes n+l+i where i=0, 1, . . . d−1, if the end of wireless device autonomous UL transmission occurs in or before subframe n+l+d−1 and the autonomous UL transmission between n+l and n+l+d−1 may be contiguous.

In an example, if the 'UL duration and offset' field indicates an 'UL offset' l and an 'UL duration' d for subframe n and the 'COT sharing indication for AUL' field is set to '0', then a UE configured with autonomous UL may not transmit autonomous UL in subframes n+l+i where i=0, 1, . . . d−1.

In an example, for contiguous UL transmission(s), if a wireless device is scheduled to transmit a set of w UL transmissions including PUSCH using a PDCCH DCI format, and if the wireless device cannot access the channel for a transmission in the set prior to the last transmission, the wireless device may attempt to transmit the next transmission according to the channel access type indicated in the DCI.

In an example, for contiguous uplink transmission(s), if a wireless device is scheduled to transmit a set of w consecutive uplink transmissions without gaps including PUSCH using one or more PDCCH DCI formats and the wireless device transmits one of the scheduled uplink transmissions in the set after accessing the channel according to one of uplink channel access procedures (e.g., Type 1 or Type 2), the wireless device may continue transmission the remaining uplink transmissions in the set, if any.

In an example, for contiguous UL transmission(s), a wireless device may not be expected to be indicated with different channel access types for any consecutive UL transmissions without gaps in between the transmissions.

In an example, for uplink transmission(s) with multiple starting positions scheduled by a base station, if a wireless device is scheduled by an base station to transmit transmissions including PUSCH Mode 1 using the Type 1 channel access procedure indicated in DCI, and if the wireless device cannot access the channel for a transmission according to the PUSCH starting position indicated in the DCI, the wireless device may attempt to make a transmission at symbol 7 in the same subframe according to Type 1 channel access procedure. In an example, there may be no limit on the number of attempts the UE can make using Type 1 channel access procedure.

In an example, for uplink transmission(s) with multiple starting positions scheduled by a base station, if a wireless device is scheduled by a base station to transmit transmissions including PUSCH Mode 1 using the Type 2 channel access procedure indicated in DCI, and if the wireless device cannot access the channel for a transmission according to the PUSCH starting position indicated in the DCI, the wireless device may attempt to make a transmission at symbol 7 in the same subframe and according to Type 2 channel access procedure. The number of attempts the wireless device may make within the consecutively scheduled subframes including the transmission may be limited to w+1, where w may be the number of consecutively scheduled subframes using Type 2 channel access procedure.

In an example, for contiguous uplink transmissions(s) including a transmission pause, if the wireless is scheduled to transmit a set of w consecutive uplink transmissions without gaps using one or more PDCCH DCI formats, and if the wireless device has stopped transmitting during or before of one of these uplink transmissions in the set and prior to the last uplink transmission in the set, and if the channel is sensed by the wireless device to be continuously idle after the wireless device has stopped transmitting, the wireless device may transmit a later uplink transmission in the set using Type 2 channel access procedure. If the channel sensed by the wireless device is not continuously idle after the wireless device has stopped transmitting, the wireless device may transmit a later uplink transmission in the set using Type 1 channel access procedure with the uplink channel access priority class indicated in the DCI corresponding to the uplink transmission.

In an example, for uplink transmission(s) following configured uplink transmission(s), if the wireless device is scheduled by a base station to transmit on channel $c_i$ by a uplink grant received on channel $c_j$, i≠j, and if the wireless device is transmitting using autonomous uplink on channel $c_i$, the wireless device may terminate the ongoing PUSCH transmissions using the autonomous uplink at least one subframe before the uplink transmission according to the received uplink grant.

In an example, if the wireless device is scheduled by an uplink grant received from a base station on a channel to transmit a PUSCH transmission(s) starting from subframe n on the same channel using Type 1 channel access procedure and if at least for the first scheduled subframe occupies $N_{RB}^{UL}$ resource blocks and the indicated 'PUSCH starting position is OFDM symbol zero, and if the wireless device starts autonomous uplink transmissions before subframe n using Type 1 channel access procedure on the same channel, the wireless device may transmit uplink transmission(s) according to the received uplink grant from subframe n without a gap, if the priority class value of the performed channel access procedure is larger than or equal to priority class value indicated in the uplink grant, and the autonomous uplink transmission in the subframe preceding subframe n may end at the last OFDM symbol of the subframe regardless of the higher layer parameter endingSymbolAUL. The sum of the lengths of the autonomous uplink transmission(s) and the scheduled uplink transmission(s) may not exceed the maximum channel occupancy time corresponding to the priority class value used to perform the autonomous uplink channel access procedure. Otherwise, the wireless device may terminate the ongoing autonomous uplink transmission at least one subframe before the start of the uplink transmission according to the received uplink grant on the same channel.

In an example, if a wireless device receives an uplink grant and a DCI indicating a PUSCH transmission using Type 1 channel access procedure, and if the wireless device has an ongoing Type 1 channel access procedure before the PUSCH transmission starting time, if the uplink channel access priority class value $p_1$ used for the ongoing Type 1 channel access procedure is same or larger than the uplink channel access priority class value $p_2$ indicated in the DCI, the wireless device may transmit the PUSCH transmission in response to the uplink grant by accessing the channel by using the ongoing Type 1 channel access procedure.

In an example, if a wireless device receives an uplink grant and a DCI indicating a PUSCH transmission using Type 1 channel access procedure, and if the wireless device has an ongoing Type 1 channel access procedure before the PUSCH transmission starting time, if the uplink channel access priority class value $p_1$ used for the ongoing Type 1 channel access procedure is smaller than the uplink channel access priority class value $p_2$ indicated in the DCI, the wireless device may terminate the ongoing channel access procedure.

In an example, a base station may indicate Type 2 channel access procedure in the DCI of an uplink grant scheduling transmission(s) including PUSCH on a channel when: the base station has transmitted on the channel according to a channel access procedure; or base station may indicate using the 'UL duration and offset' field that the wireless device may perform a Type 2 channel access procedure for transmissions(s) including PUSCH on a channel in subframe n when the base station has transmitted on the channel according to a channel access procedure described; or a base station may indicate using the 'UL duration and offset' field and 'COT sharing indication for AUL' field that a wireless device configured with autonomous uplink may perform a Type 2 channel access procedure for autonomous uplink transmissions(s) including PUSCH on a channel in subframe n when the base station has transmitted on the channel according to a channel access procedure and acquired the channel using the largest priority class value and the base station transmission includes PDSCH, or a base station may schedule uplink transmissions on a channel, that follows a transmission by the base station on that channel with a duration of $T_{short\_ul}$=25 us, if the uplink transmissions occurs within the time interval starting at $t_0$ and ending at $t_0+T_{CO}$, where $T_{CO}=T_{mcot,p}+T_g$, where $t_0$ is the time instant when the base station has started transmission, $T_{mcot,p}$ value is determined by the base station, $T_g$ is the total duration of all gaps of duration greater than 25 us that occur between the DL transmission of the base station and uplink transmissions scheduled by the base station, and between any two uplink transmissions scheduled by the base station starting from $t_0$.

In an example, the base station may schedule uplink transmissions between $t_0$ and $t_0+T_{CO}$ without gaps between consecutive uplink transmissions if they can be scheduled contiguously. For an uplink transmission on a channel that follows a transmission by the base station on that channel within a duration of $T_{short\_ul}$=25 us, the wireless device may use Type 2A channel access procedure for the UL transmission.

In an example, if the base station indicates Type 2 channel access procedure for the wireless device in the DCI, the base station may indicate the channel access priority class used to obtain access to the channel in the DCI.

For indicating a Type 2 channel access procedure, if the gap is at least 25 us, or 16 us, or up to 16 us, the base station may indicate Type 2A, or Type 2B, or Type 2C uplink channel procedures, respectively.

In an example, if a wireless device is scheduled to transmit on a set of channels C, and if Type 1 channel access procedure is indicated by the uplink scheduling grants for the uplink transmissions on the set of channels C, and if the uplink transmissions are scheduled to start transmissions at the same time on all channels in the set of channels C; or if the wireless device intends to perform an autonomous uplink transmission on configured resources on the set of channels C with Type 1 channel access procedure, and if UL transmissions are configured to start transmissions on the same time all channels in the set of channels C; and if the channel frequencies of set of channels C is a subset of one of the sets of channel frequencies, the wireless device may transmit on channel $c_i \in C$ using Type 2 channel access procedure, if Type 2 channel access procedure is performed on channel $c_i$ immediately before the wireless device transmission on channel $c_j \in C$, i≠j, and if the wireless device has accessed channel $c_j$ using Type 1 channel access procedure, where channel c is selected by the wireless device uniformly randomly from the set of channels C before performing Type 1 channel access procedure on any channel in the set of channels C and the wireless device may not transmit on channel $c_i \in C$ within the bandwidth of a carrier, if the wireless device fails to access any of the channels, of the carrier bandwidth, on which the wireless device is scheduled or configured by UL resources.

In an example, a wireless device may transmit the transmission using Type 1 channel access procedure after first sensing the channel to be idle during the slot durations of a defer duration $T_d$; and after the counter N is zero in step 4. The counter N may be adjusted by sensing the channel for additional slot duration(s) according to the actions described below:

1) set $N=N_{init}$, where $N_{init}$ is a random number uniformly distributed between 0 and $CW_p$, and go to action 4;

2) if N>0 and the UE chooses to decrement the counter, set N=N−1;

3) sense the channel for an additional slot duration, and if the additional slot duration is idle, go to action 4; else, go to action 5;

4) if N=0, stop; else, go to action 2.

5) sense the channel until either a busy slot is detected within an additional defer duration $T_d$ or all the slots of the additional defer duration $T_d$ are detected to be idle;

6) if the channel is sensed to be idle during all the slot durations of the additional defer duration $T_d$, go to action 4; else, go to action 5;

In an example, if a wireless device has not transmitted an uplink transmission on a channel on which uplink transmission(s) are performed after action 4 in the process above, the wireless device may transmit a transmission on the channel, if the channel is sensed to be idle at least in a sensing slot duration $T_{sl}$ when the UE is ready to transmit the transmission and if the channel has been sensed to be idle during all the slot durations of a defer duration $T_d$ immediately before the transmission. If the channel has not been sensed to be idle in a sensing slot duration $T_{sl}$ when the wireless device first senses the channel after it is ready to transmit, or if the channel has not been sensed to be idle during any of the sensing slot durations of a defer duration $T_d$ immediately before the intended transmission, the wireless device may proceed to action 1 after sensing the channel to be idle during the slot durations of a defer duration $T_d$.

The defer duration $T_d$ may consist of duration $T_f$=16 us immediately followed by $m_p$ consecutive slot durations where each slot duration is $T_{sl}$=9 us, and $T_f$ includes an idle slot duration $T_{sl}$ at start of $T_f$. $CW_{min,p} \le CW_p \le CW_{max,p}$ may be the contention window. $CW_{min,p}$ and $CW_{max,p}$ may be chosen before step 1 of the procedure above. $m_p$, $CW_{min,p}$, and $CW_{max,p}$ may be based on a channel access priority class p as shown in FIG. 16, that is signalled to the wireless device.

In an example, if a wireless device is indicated to perform Type 2A UL channel access procedures, the wireless device may use Type 2A UL channel access procedure for a UL transmission. The UE may transmit the transmission immediately after sensing the channel to be idle for at least a sensing interval $T_{short\_ul}$=25 us. $T_{short\_ul}$ may consist of a duration $T_f$=16 us immediately followed by one slot duration $T_{sl}$=9 us and $T_f$ may include an idle slot duration $T_{sl}$ at start of $T_f$. The channel may be considered to be idle for $T_{short\_ul}$ if it is sensed to be idle during the slot durations of $T_{short\_ul}$.

In an example, if a wireless device is indicated to perform Type 2B UL channel access procedures, the wireless device may use Type 2B UL channel access procedure for a uplink transmission. The wireless device may transmit the transmission immediately after sensing the channel to be idle.

In an example, if a wireless device is indicated to perform Type 2C UL channel access procedures, the wireless device transmits immediately without sensing the channel.

In an example embodiment, a wireless device (e.g., a MAC entity of the wireless device) may employ one or more processes to handle the uplink LBT failures for uplink transmissions, such as uplink transmissions for one or more uplink channels (e.g., PUSCH, PUCCH and/or PRACH) and/or one or more signals (e.g., SRS). In an example, the wireless device may detect/determine consistent uplink LBT failures to detect/determine uplink LBT problems. A MAC entity of the wireless device may receive notifications of uplink LBT failures from the physical layer to detect consistent uplink LBT failures.

In an example, detection/determination of consistent uplink LBT failures may be based on a counter and/or timer. A value of the counter may be incremented based on detecting an uplink LBT failure. In an example, a threshold may be configured and a consistent uplink LBT failure may be determined based on the counter reaching the threshold. A consistent uplink LBT failure event may be triggered based on the uplink LBT failure counter reaching the threshold value. In an example, a timer may be started based on detecting a consistent uplink LBT failure and the value of the counter may be reset (e.g., reset to zero) based on an expiry of the timer. The wireless device may receive configuration parameters indicating the threshold value for the counter (e.g., a Max Count value) and a value of the timer. In an example, the threshold for the counter and/or the timer value may be configured per BWP and/or per cell. In an example, the threshold may be reset (e.g., reset to zero) based on the reconfiguration (e.g., in response to receiving an RRC reconfiguration message) of one or more parameters of the consistent uplink failure detection such as the threshold and/or timer value.

The wireless device may determine consistent LBT failure (e.g., for a cell and/or a BWP of the cell and/or an LBT sub-band of the BWP of the cell). The wireless device may indicate the consistent LBT failure (e.g., for a cell and/or a BWP of the cell and/or an LBT sub-band of the BWP of the cell) to the base station. The cell for which the wireless device may indicate consistent LBT failure may be a secondary cell or a primary cell (e.g., PCell or PSCell). In an example, the wireless device may autonomously take a recovery action. In an example, the wireless device may receive a command from the base station in response to indication of the consistent LBT failure to the base station. The recovery action may include switching the BWP and/or performing a random access process (e.g., in the new BWP after switching). In an example, the wireless device may stop one or more timers (e.g., BWP inactivity timer) based on the detecting/determining the consistent LBT failure.

In an example, the determining/detecting of the consistent uplink LBT failure on a cell/BWP may be based on a plurality of uplink transmissions (e.g., via one or more uplink channels and/or one or more uplink signals) on the cell/BWP. In an example, the determining/detecting of the consistent uplink LBT failure may be independent of uplink transmission type. The LBT failures for different uplink transmissions may be used to determine the consistent uplink LBT failure regardless of the uplink transmission types (e.g., PUSCH, PUCCH, etc.). The consistent uplink LBT failure mechanism may have the same recovery mechanism for all uplink LBT failures regardless of the uplink transmission type.

In an example, based on detecting/determining/declaring consistent uplink LBT failures on PCell or PSCell, the wireless device may switch a current active BWP (of PCell or PSCell) to a second BWP (of PCell or PSCell). The wireless device may initiate a random access process in the second BWP based on the second BWP being configured with random access resources. The wireless device may perform radio link failure (RLF) recovery based on the consistent uplink LBT failure being detected on the PCell and consistent uplink LBT failure being detected on N possible BWPs of the PCell. In an example, based on detecting/determining consistent uplink LBT failures on a PSCell and after detecting a consistent uplink LBT failure on N BWPs of the PSCell, the wireless device may indicate a failure to a master base station via a secondary cell group (SCG) failure information procedure. In an example, N may be the number of configured BWPs with configured random access resources. In an example, after detecting consistent uplink LBT failure on PCell or PSCell, the wireless device may determine which BWP to switch if N is larger than one. The value of N may be configurable (e.g., via RRC) or may be pre-determined/pre-configured.

In an example, based on detecting/determining consistent uplink LBT failures on a cell (e.g., a SCell or PCell), the wireless device may indicate the consistent LBT failure on the cell to the base station based on an LBT failure indication MAC CE. The MAC CE may report consistent uplink LBT failure on one or more Cells. The MAC CE format may support multiple entries to indicate the Cells which have already declared consistent uplink LBT failures. In an example, the LBT failure indication MAC CE may indicate/include cell index(s) where uplink LBT failure occurs. In an example, the format of the LBT failure indication MAC CE may be a bitmap to indicate whether corresponding serving cell has declared consistent uplink LBT failure or not.

The LBT failure indication MAC CE may be transmitted on a different serving cell than a SCell which has consistent UL LBT problem. In an example, the LBT failure indication MAC CE may indicate consistent uplink LBT failures on one or more cells and the wireless device may transmit the LBT failure indication MAC CE based on an uplink grant on a cell other than the one or more cells. The MAC CE for uplink LBT failure indication may have higher priority than data but lower priority than a beam failure recovery (BFR) MAC CE.

The wireless device may trigger scheduling request if there is no available uplink resource for transmitting the MAC CE for a SCell uplink LBT failure indication. The wireless device may receive configuration parameters of a SR configuration associated with uplink LBT failure indication. The configuration parameters may comprise an identifier indicating that the SR is associated with uplink LBT failure indication. In an example, when a SR configuration associated with uplink LBT failure indication is not configured for the wireless device and no resource is available for transmitting the MAC CE for indicating SCell uplink LBT failure, the wireless device may start a random access process.

In an example, when a SR for uplink LBT failure indication is triggered and the wireless device has an overlapping SR PUCCH resource with the SCell LBT failure SR PUCCH resource, the wireless device may select the SCell LBT failure SR PUCCH resource for transmission.

In an example, the wireless device may cancel the consistent LTB failure for a serving cell (or BWP(s)) (e.g., may not consider the cell as having consistent LBT failure) based on the wireless device successfully transmitting an LBT failure MAC CE indicating the serving cell.

In an example, when consistent UL LBT failure is declared on SpCell, the wireless device may trigger MAC CE to indicate where failure happened. The MAC CE may be sent on the BWP that the wireless device switched to during the random access process.

In an example, different LBT failures, irrespective of channel, channel access priority class, and LBT type, may be considered equivalent for the consistent UL LBT failure detection procedure at a MAC entity of a wireless device.

In an example, upon switching to a new BWP after detecting consistent LBT failures on a BWP of the PCell/PSCell, the wireless device may increment a counter (e.g., a BWP switching counter). The BWP switching counter may be used by the wireless device to initiate a radio link failure process based on the BWP switching counter reaching a value (e.g., N). The wireless device may reset the BWP switching counter when the random access process on a BWP of the PCell/PSCell being successfully completed.

In an example, in response to the BWP switching due to consistent uplink LBT failure on PCell/PSCell, the wireless device may indicate the consistent uplink LBT failure via dedicated uplink resource (e.g. PRACH). For example, the PRACH resources used for indication of consistent uplink LBT failure may be dedicated to consistent uplink LBT failure indication In an example, the uplink LBT failure information reported by the UE may include one or more BWP indexes of BWPs with consistent uplink LBT failures, one or more cell indexes of one or more cells with consistent uplink LBT failures and/or one or more measurement results (e.g., RSRP/RSRQ/RSSI/CO) of the serving/neighbor cells In an example, the wireless device may perform an LBT for an uplink transmission comprising the uplink failure indication MAC CE based on a highest priority channel access priority class (e.g., lowest number channel access priority).

In an example, the wireless device may reset the uplink LBT counter for a cell/BWP based on expiry of an uplink LBT timer and/or based on receiving one or more messages indicating reconfiguration of uplink LBT configuration parameters for detecting consistent LBT failures and/or based on transmitting an uplink channel or uplink signal on the cell/BWP in response to successful uplink LBT. In an example, successful uplink LBT for the cell/BWP may indicate that the cell/BWP no longer has consistent LBT failures.

In an example, in response to BWP switching caused by detection of consistent uplink LBT failures on SpCell, a MAC entity may stop an ongoing random access procedure and may initiate a new random access procedure.

In an example, based on switching BWP due to detecting/declaring consistent LBT failure on a BWP of PCell or PSCell, the wireless device may initiate a random access process and may not perform other transmissions (e.g., may not resume suspended configured grants transmissions).

In an example, a wireless device may autonomously deactivate a configured grant for Sell(s) experiencing a consistent UL LBT failure.

In an example, based on detecting/declaring consistent uplink LBT failure for a cell/BWP, ongoing transmissions (e.g., PUSCH transmission, SRS transmission, PUCCH transmission, RACH transmission, etc.) on active BWP of a SCell with consistent uplink LBT failure may be suspended.

In an example, based on detecting/declaring consistent uplink LBT failure for a cell/BWP, type 2 configured grants on the cell/BWP may be cleared. In an example, based on detecting/declaring consistent uplink LBT failure for a cell/BWP, type 1 configured grants on the cell/BWP may be suspended. In an example, based on detecting/declaring consistent uplink LBT failure for a BWP, BWP inactivity for a downlink BWP associated with the BWP may be stopped.

In an example, based on switching BWP due to detecting/declaring consistent LBT failure on a BWP of PCell or PSCell, a counter for detection of consistent uplink LBT failure of the BWP may be reset and/or a timer for consistent uplink LBT failure detection of the BWP may be stopped.

In an example, based on an uplink transmission failure due to LBT, a physical layer of a wireless device may send LBT failure indication to a MAC entity of the wireless device. The MAC entity of the wireless device may, based on receiving an LBT failure indication, start an lbt-FailureDetectionTimer and increment an LBT_COUNTER. Based on the lbt-FailureDetectionTimer expiring, the LBT_COUNTER may be reset. Based on LBT_COUNTER reaching a configured threshold value before the lbt-FailureDetectionTimer expiring, the wireless device may trigger a consistent uplink LBT failure event. In an example, a "failureType" in SCG failure information may indicate consistent uplink LBT failures.

In an example, the Scheduling Request (SR) may be used for requesting UL-SCH resources for new transmission. A MAC entity of a wireless device may be configured with zero, one, or more SR configurations. An SR configuration may comprise of a set of PUCCH resources for SR across different BWPs and cells. In an example, for a logical channel, a PUCCH resource for SR may be configured per BWP.

In an example, a SR configuration may correspond to one or more logical channels. A logical channel may be mapped to zero or one SR configuration, which may be configured by RRC. The SR configuration of the logical channel that triggered the buffer status report (BSR) (if such a configuration exists) may be considered as corresponding SR configuration for the triggered SR.

In an example, RRC may configure the following parameters for the scheduling request procedure: sr-ProhibitTimer (e.g., per SR configuration); and sr-TransMax (e.g., per SR configuration). In an example, the following variables may be used for the scheduling request procedure: SR_COUNTER (e.g., per SR configuration).

In an example, if an SR is triggered and there are no other SRs pending corresponding to the same SR configuration, the MAC entity may set the SR_COUNTER of the corresponding SR configuration to 0.

In an example, when an SR is triggered, it may be considered as pending until it is cancelled. One or more pending SR(s) triggered prior to the MAC PDU assembly may be cancelled and respective sr-ProhibitTimer may be stopped when the MAC PDU is transmitted and this PDU includes a Long or Short BSR MAC CE which contains buffer status up to (and including) the last event that triggered a BSR prior to the MAC PDU assembly. One or more pending SR(s) may be cancelled and respective sr-ProhibitTimer may be stopped when the UL grant(s) can accommodate all pending data available for transmission.

In an example, PUCCH resources on a BWP which is active at the time of SR transmission occasion may be considered valid.

In an example, as long as at least one SR is pending, for each pending SR, if the MAC entity has no valid PUCCH resource configured for the pending SR, the MAC entity may initiate a Random Access procedure on the SpCell and cancel the pending SR.

In an example, based on at least one SR is pending, for each pending SR, if the MAC entity has valid PUCCH resource configured for the pending SR, for the SR configuration corresponding to the pending SR: when the MAC entity has an SR transmission occasion on the valid PUCCH resource for SR configured; and if sr-ProhibitTimer is not running at the time of the SR transmission occasion; and if the PUCCH resource for the SR transmission occasion does not overlap with a measurement gap; and if the PUCCH resource for the SR transmission occasion does not overlap with a UL-SCH resource: if SR_COUNTER<sr-TransMax: the wireless device may increment SR_COUNTER by 1; instruct the physical layer to signal the SR on one valid PUCCH resource for SR; and start the sr-ProhibitTimer. If SR_COUNTER=sr-TransMax: the wireless device may notify RRC to release PUCCH for all Serving Cells; notify RRC to release SRS for all Serving Cells; clear any configured downlink assignments and uplink grants; clear any PUSCH resources for semi-persistent CSI reporting; initiate a Random Access procedure on the SpCell and cancel all pending SRs.

In an example, the selection of which valid PUCCH resource for SR to signal SR on when the MAC entity has more than one overlapping valid PUCCH resource for the SR transmission occasion may be based on the wireless device implementation.

In an example, if more than one individual SR triggers an instruction from a MAC entity to a PHY layer to signal the SR on the same valid PUCCH resource, the SR_COUNTER for the relevant SR configuration may be incremented only once.

In an example, the MAC entity may stop, if any, ongoing Random Access procedure due to a pending SR which has no valid PUCCH resources configured, which was initiated by MAC entity prior to the MAC PDU assembly. Such a Random Access procedure may be stopped when the MAC PDU is transmitted using a UL grant other than a UL grant provided by Random Access Response, and this PDU includes a BSR MAC CE which contains buffer status up to (and including) the last event that triggered a BSR prior to the MAC PDU assembly, or when the UL grant(s) can accommodate all pending data available for transmission.

In an example, a wireless device may be configured by a higher layer paremater (e.g., SchedulingRequestResourceConfig) a set of configurations for SR in a PUCCH transmission for example using PUCCH format 0 or PUCCH format 1.

The wireless device may be configured a PUCCH resource by SchedulingRequestResourceId providing a PUCCH format 0 resource or a PUCCH format 1 resource. The wireless device may also be configured a periodicity $SR_{PERIODICITY}$ in symbols or slots and an offset $SR_{OFFSET}$ in slots by periodicityAndOffset for a PUCCH transmission conveying SR. If $SR_{PERIODICITY}$ is larger than one slot, the UE may determine a SR transmission occasion in a PUCCH to be in a slot with number $n_{s,f}^{\mu}$ in a frame with number $n_f$ if $(n_f \cdot N_{slot}^{frame,\mu}+n_{s,f}^{\mu}-SR_{OFFSET}) \bmod SR_{PERODICITY}=0$.

In an example, if $SR_{PERIODICITY}$ is one slot, the UE may expect that $SR_{OFFSET}=0$ and every slot may be a SR transmission occasion in a PUCCH.

In an example, if $SR_{PERIODICITY}$ is smaller than one slot, the UE may determine a SR transmission occasion in a PUCCH to start in a symbol with index l if $(l-l_0 \bmod SR_{PERIODICITY}) \bmod SR_{PERIODICITY}=0$ where $l_0$ may be the value of startingSymbolIndex.

In an example, if the UE determines that, for a SR transmission occasion in a PUCCH, the number of symbols available for the PUCCH transmission in a slot is smaller than the value provided by nrofSymbols, the UE may not transmit the PUCCH in the slot.

In an example, the IE SchedulingRequestConfig may be used to configure the parameters, for the dedicated scheduling request (SR) resources.

In an example, the parameter schedulingRequestToAddModList may indicate a list of Scheduling Request configurations to add or modify. The parameter schedulingRequestToReleaseList may indicate a list of Scheduling Request configurations to release. The parameter schedulingRequestId may be used to modify a SR configuration and to indicate, in LogicalChannelConfig, the SR configuration to which a logical channel is mapped and to indicate, in SchedulingRequestresourceConfig, the SR configuration for which a scheduling request resource is used. The parameter sr-ProhibitTimer may indicate a timer for SR transmission on PUCCH. Value is in ms. Value ms1 may correspond to 1 ms, value ms2 may correspond to 2 ms, and so on. When the field is absent, the UE may apply the value 0. The parameter sr-TransMax may indicate maximum number of SR transmissions. Value n4 may correspond to 4, value n8 may correspond to 8, and so on.

In an example, the IE SchedulingRequestId may be used to identify a Scheduling Request instance in the MAC layer.

In an example, the IE SchedulingRequestResourceConfig may determine physical layer resources on PUCCH where the UE may send the dedicated scheduling request (D-SR). A parameter periodicityAndOffset may indicate SR periodicity and offset in number of symbols or slots. A parameter resource may indicate an ID of the PUCCH resource in which the UE may send the scheduling request. The actual PUCCH-Resource may be configured in PUCCH-Config of the same UL BWP and serving cell as this SchedulingRequestResourceConfig. The network may configure a PUCCH-Resource of PUCCH-format0 or PUCCH-format1 (other formats not supported). The schedulingRequestID may indicate an ID of the SchedulingRequestConfig that uses this scheduling request resource.

In an example, the IE SchedulingRequestResourceId may be used to identify scheduling request resources on PUCCH.

Figure 17:
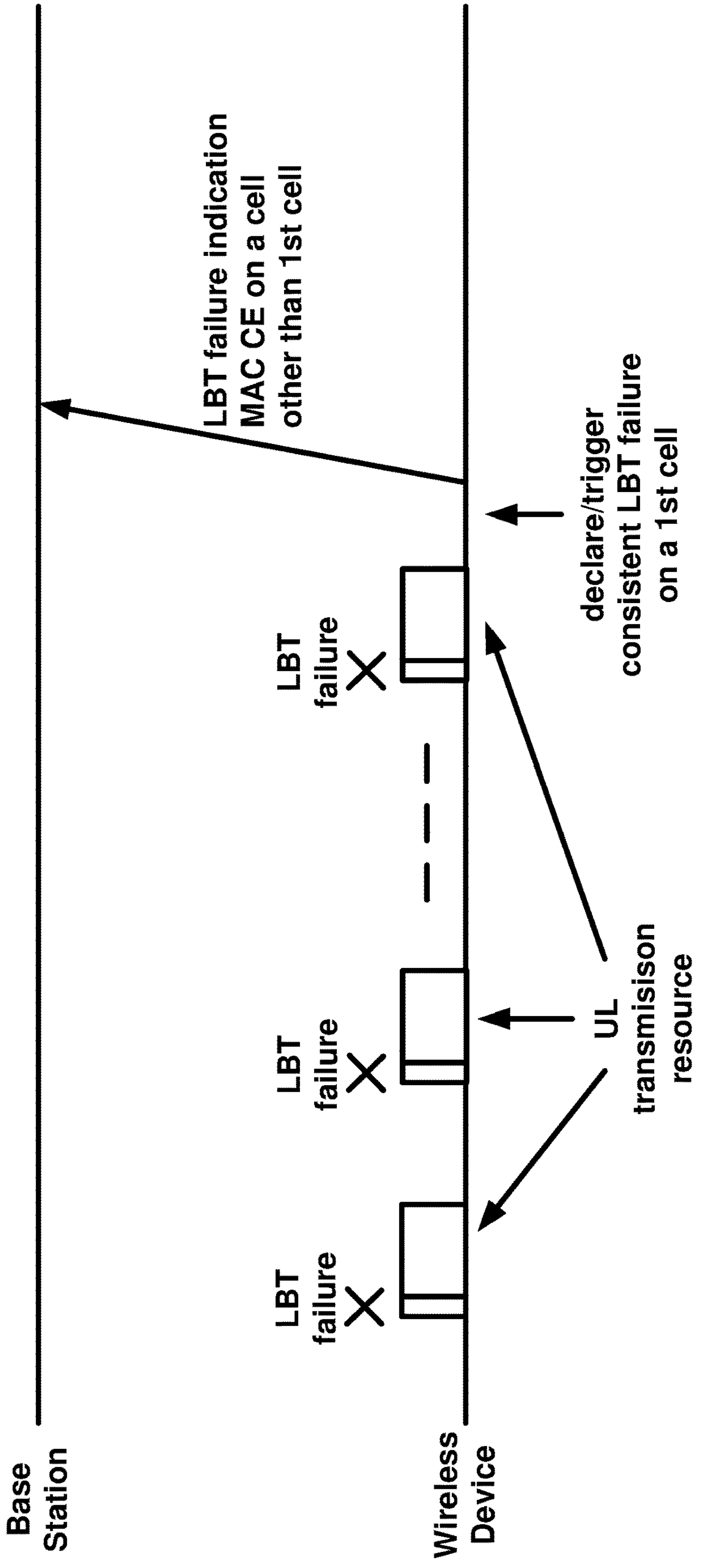
FIG. 17 shows an example LBT failure indication in accordance with several of various embodiments of the present disclosure.

In an example as shown in FIG. 17, a wireless device may determine consistent LBT failures on a cell and/or a BWP of a cell and/or an LBT subband of a BWP of a cell. The determination of consistent LBT failures on the cell/BWP/LBT subband may be based on counting a number of uplink LBT failures for uplink transmissions on the cell/BWP/LBT subband. The uplink transmission may be via an uplink channel (e.g., PUSCH, PUCCH, PRACH) or an uplink signal (e.g., SRS). For example, the wireless device may increment a counter based on determining/detecting an uplink LBT failure for an uplink transmission and may declare/trigger a consistent LBT failure indication based on the counter reaching a first value. The first value for the counter may be configurable (e.g., by RRC). The wireless device may receive configuration parameters comprising a first parameter indicating the first value. For example, a MAC entity of the wireless device may determine an LBT failure based on an indication of the LBT failure for the uplink transmission from the physical layer of the wireless device. The wireless device may start a timer based on receiving an LBT failure indication and may reset the LBT counter (e.g., reset to zero) based on the timer expiring. The wireless device may transmit an LBT failures indication MAC CE based on the triggering/declaring/determining a consistent LBT failure for a first cell/BWP/LBT subband. The LBT failures indication MAC CE may indicate consistent LBT failure on the first cell (and/or first BWP or first LBT subband of the first cell) and one or more other cells/BWPs/LB subbands that have consistent LBT failures.

Figure 18:
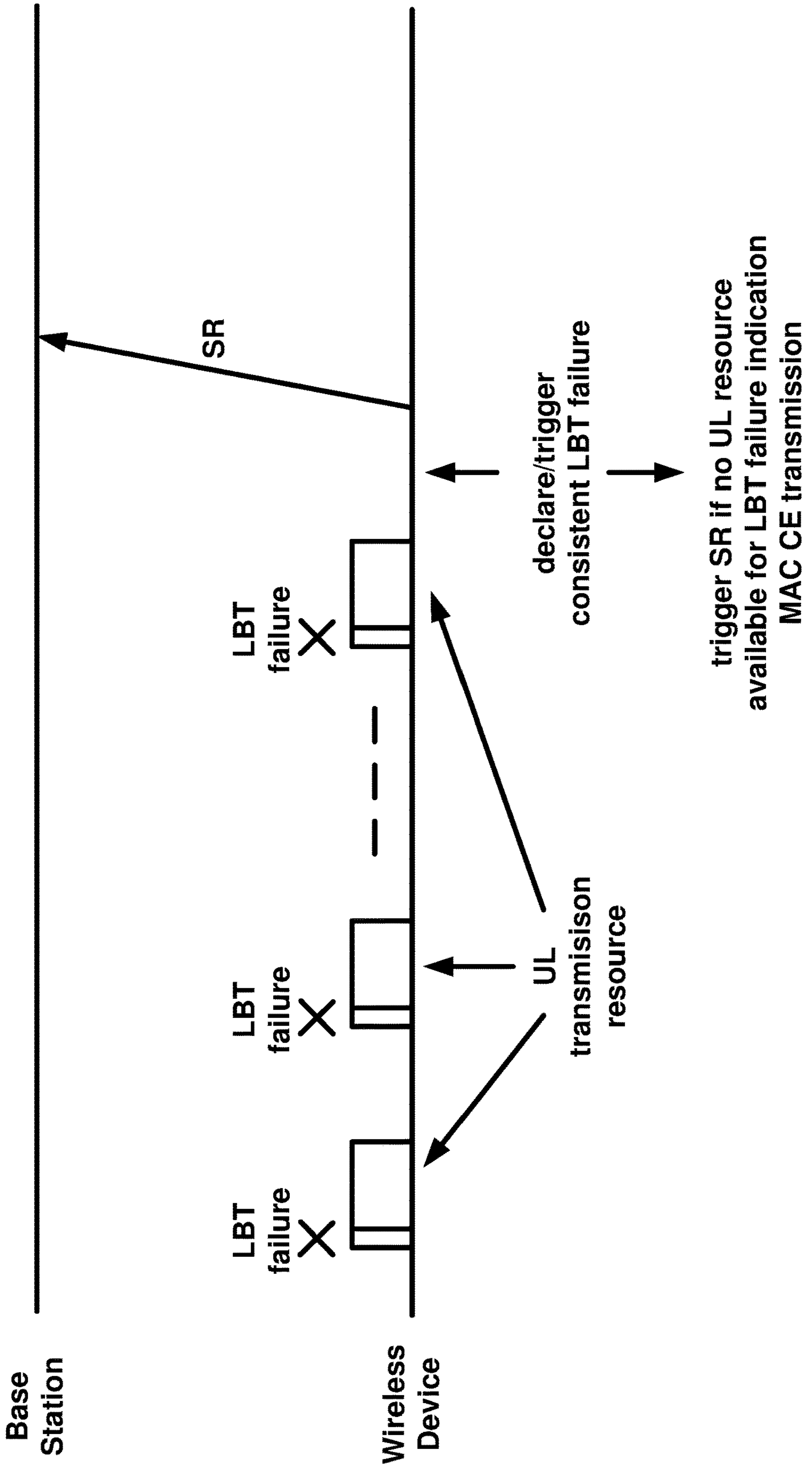
FIG. 18 shows scheduling request transmission for consistent LBT failures recovery in accordance with several of various embodiments of the present disclosure.
Figure 19:
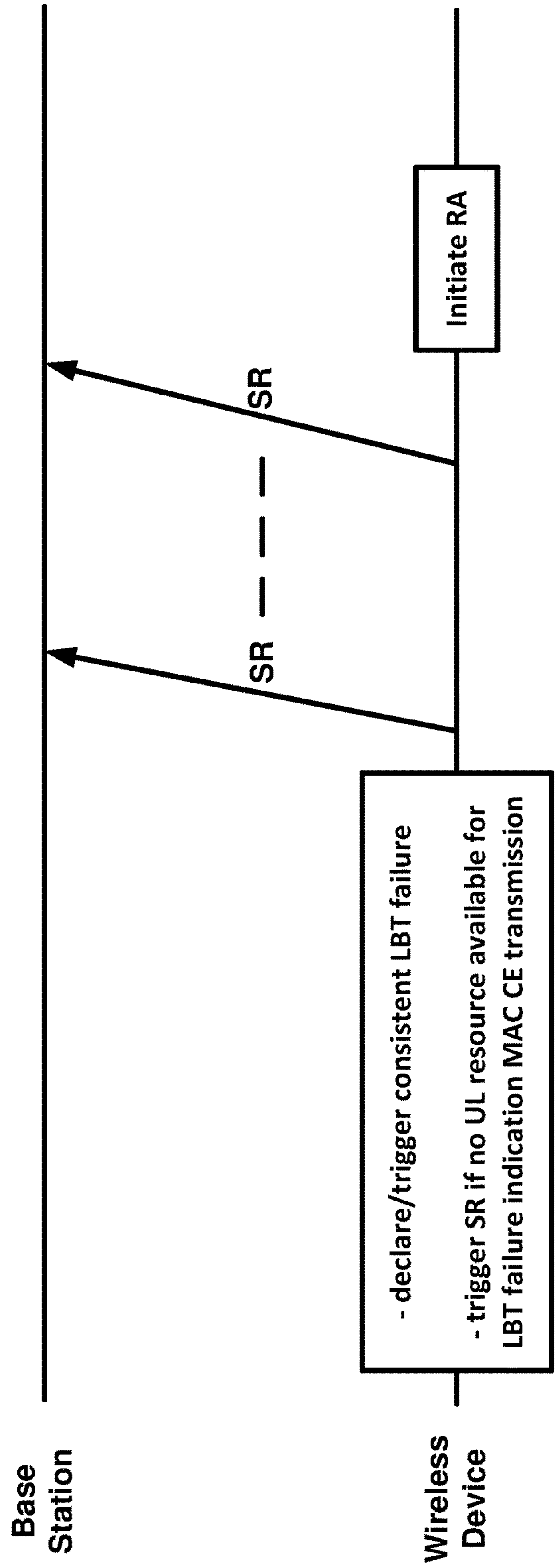
FIG. 19 shows example scheduling request and random access processes for consistent LBT failures recovery in accordance with several of various embodiments of the present disclosure.

In an example as shown in FIG. 18, the wireless device may declare/trigger consistent LBT failures on a cell/BWP/LBT subband based on a consistent LBT failure determination described earlier. The wireless device may determine that no uplink resource is available for transmission of an LBT failure indication MAC CE. Based on no uplink resource being available for transmission of the LBT failure indication MAC CE, the wireless device may trigger a scheduling request. The wireless device may transmit a scheduling request signal based on a scheduling request configuration. The scheduling request configuration may be for transmission of scheduling request signals related to uplink LBT failure recovery. In an example, as shown in FIG. 19, the wireless device may transmit multiple scheduling request signals based on not receiving an uplink grant for transmission of the consistent LBT failure MAC CE. Based on a SR counter reaching a maximum SR count, the wireless device may initiate a random access process.

Figure 20:
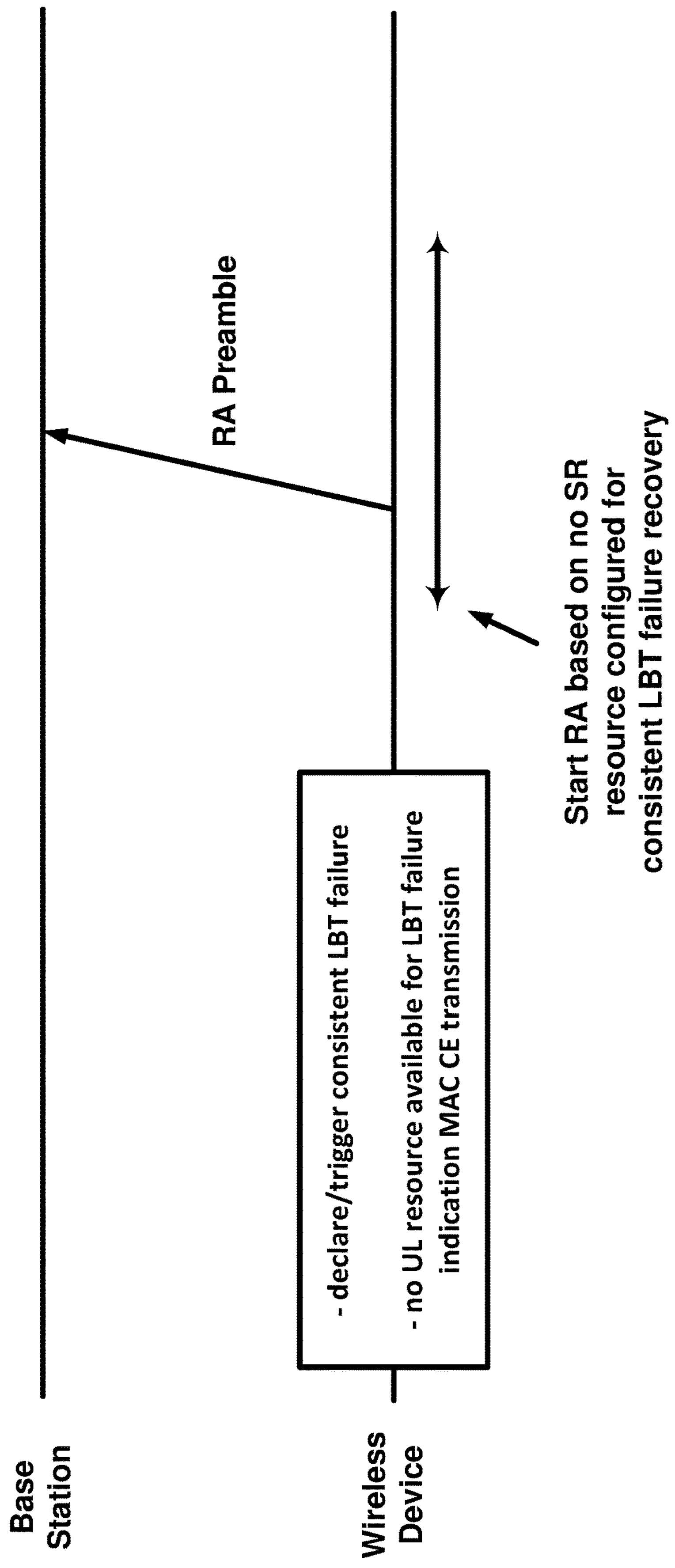
FIG. 20 shows example random access processes for consistent LBT failures recovery in accordance with several of various embodiments of the present disclosure.

In an example, as shown in FIG. 20, the wireless device may declare/trigger consistent LBT failures on a cell/BWP/LBT subband based on a consistent LBT failure determination described earlier. The wireless device may determine that no uplink resource is available for transmission of an LBT failure indication MAC CE. The wireless device may not be configured with a scheduling request configuration and/or scheduling request resources for consistent LBT failures recovery. Based on no uplink resource being available for transmission of the LBT failure indication MAC CE and no scheduling request configuration and/or scheduling request resources for consistent LBT failures recovery, the wireless device may start a random access process.

In an example, the configuration parameters of the scheduling request configuration (e.g., a scheduling request identifier and/or other parameters) may indicate that the scheduling request configuration is for consistent LBT failure recovery. The scheduling request configuration may indicate resources comprising a first resource for transmission of the scheduling request signal.

In an example, a MAC entity of a wireless device may be configured by RRC with a beam failure recovery (BFR) procedure and with parameters for a beam failure recovery procedure. The beam failure recovery procedure may be used for indicating to a serving base station of a new SSB or CSI-RS based on beam failure being detected on the serving SSB(s)/CSI-RS(s). Beam failure may be detected by counting beam failure instance indications from the lower layers to the MAC entity.

In an example, if IE beamFailureRecoveryConfig is reconfigured by upper layers during an ongoing Random Access procedure for beam failure recovery, the MAC entity may stop the ongoing Random Access procedure and may initiate a Random Access procedure using the new configuration.

In an example, the following RRC configuration parameters may be received in one or more IEs such as BeamFailureRecoveryConfig and the RadioLinkMonitoringConfig for the Beam Failure Detection and Recovery procedure: beamFailureInstanceMaxCount for the beam failure detection; beamFailureDetectionTimer for the beam failure detection; beamFailureRecoveryTimer for the beam failure recovery procedure; rsrp-ThresholdSSB: an RSRP threshold for the beam failure recovery; powerRampingStep: powerRampingStep for the beam failure recovery; powerRampingStepHighPriority: powerRampingStepHighPriority for the beam failure recovery; preambleReceivedTargetPower: preambleReceivedTargetPower for the beam failure recovery; preambleTransMax: preambleTransMax for the beam failure recovery; scalingFactorBI: scalingFactorBI for the beam failure recovery; ssb-perRACH-Occasion: ssb-perRACH-Occasion for the beam failure recovery; ra-ResponseWindow: the time window to monitor response(s) for the beam failure recovery using contention-free Random Access Preamble; prach-ConfigurationIndex: prach-ConfigurationIndex for the beam failure recovery; ra-ssb-OccasionMaskIndex: ra-ssb-OccasionMaskIndex for the beam failure recovery; ra-OccasionList: ra-OccasionList for the beam failure recovery. In an example, the UE variable BFI_COUNTER may indicate a counter for beam failure instance indication which may be initially set to 0.

In an example, beam failure instance indication may be received from lower layers. The MAC entity may start or restart the beamFailureDetectionTimer based on the receiving the beam failure instance indication. The MAC entity may increment BFI_COUNTER by 1 based on the receiving the beam failure instance indication. The MAC entity may initiate a Random Access procedure on the SpCell if BFI_COUNTER>=beamFailureInstanceMaxCount.

In an example, if the beamFailureDetectionTimer expires, the MAC entity may set BFI_COUNTER to 0. In an example, if beamFailureDetectionTimer, beamFailureInstanceMaxCount, or the reference signals used for beam failure detection is reconfigured by upper layers, the MAC entity may set BFI_COUNTER to 0.

In an example, if the Random Access procedure for beam failure recovery is successfully completed: the MAC entity may set BFI_COUNTER to 0; the MAC entity may stop the beamFailureRecoveryTimer, if configured; and the MAC entity may consider the Beam Failure Recovery procedure successfully completed.

In an example, an IE BeamFailureRecoveryConfig may be used to configure a wireless device with RACH resources and candidate beams for beam failure recovery in case of beam failure detection. In an example, a beamFailureRecoveryTimer parameter may indicate a timer for beam failure recovery timer. In an example, upon expiration of the timer the wireless may not use CFRA for BFR. The value of beamFailureRecoveryTimer may be in ms. For example, value ms10 may correspond to 10 ms, value ms20 may correspond to 20 ms, and so on. In an example, candidateBeamRSList may indicate a list of reference signals (e.g., CSI-RS and/or SSB) identifying the candidate beams for recovery and the associated RA parameters. In an example, the network may configure these reference signals to be within the linked DL BWP (e.g., within the DL BWP with the same bwp-Id) of the UL BWP in which the BeamFailureRecoveryConfig may be provided. In an example, a msg1-SubcarrierSpacing parameter may indicate subcarrier spacing for contention free beam failure recovery. Example values may include 15 kHz or 30 kHz (e.g., FR1), and 60 kHz or 120 kHz (e.g., FR2).

In an example, a rsrp-ThresholdSSB parameter may indicate L1-RSRP threshold used for determining whether a candidate beam may be used by the wireless device to attempt contention free random access to recover from beam failure. In an example, ra-prioritization may indicate parameters which may apply for prioritized random access procedure for BFR. In an example, a ra-ssb-OccasionMaskIndex parameter may indicate explicitly signalled PRACH Mask Index for RA Resource selection. The mask may be valid for SSB resources. In an example, a rach-ConfigBFR parameter may indicate configuration of contention free random access occasions for BFR. In an example, a recoverySearchSpaceId parameter may indicate search space to use for BFR RAR. The network may configure this search space to be within the linked DL BWP (e.g., within the DL BWP with the same bwp-Id) of the UL BWP in which the BeamFailureRecoveryConfig is provided. In an example, the CORESET associated with the recovery search space may not be associated with another search space. Network may configure the wireless device with a value for this field when contention free random access resources for BFR are configured.

In an example, the IE RadioLinkMonitoringConfig may be used to configure radio link monitoring for detection of beam- and/or cell radio link failure. In an example, a beamFailureDetectionTimer parameter may indicate a timer for beam failure detection. The value of timer may be in number of "$Q_{out,LR}$ reporting periods of Beam Failure Detection" Reference Signal. Value pbfd1 may correspond to 1 $Q_{out,LR}$ reporting period of Beam Failure Detection Reference Signal, value pbfd2 may correspond to 2 $Q_{out,LR}$ reporting periods of Beam Failure Detection Reference Signal and so on. In an example, a beamFailureInstanceMaxCount parameter may determine after how many beam failure events the wireless device may trigger beam failure recovery. Value n1 may correspond to 1 beam failure instance, value n2 may correspond to 2 beam failure instances and so on. In an example, a failureDetectionResourcesToAddModList parameter may indicate a list of reference signals for detecting beam failure and/or cell level radio link failure (RLF). In an example, the network may configure at most two detectionResources per BWP for the purpose beamFailure or both. If no RSs are provided for the purpose of beam failure detection, the wireless device may perform beam monitoring based on the activated TCI-State for PDCCH. If no RSs are provided in this list for the purpose of RLF detection, the wireless device may perform Cell-RLM based on the activated TCI-State of PDCCH. The network may ensure that the wireless device has a suitable set of reference signals for performing cell-RLM.

In an example, SCell beam failure detection may be per cell. In an example, DL BWPs of a SCell may be configured with independent SCell BFR configurations. In an example, a SR ID may be configured for BFR within a same cell group (e.g., a PUCCH group). In an example, a SCell BFRQ MAC CE may trigger a SCell BFRQ SR if there is no valid uplink grant which can accommodate the SCell BFRQ MAC CE. In an example, the transmission of the SCell BFRQ MAC CE may cancel a pending BFRQ SR of the failed SCell(s). In an example, when based on the number of the BFRQ SR transmission reaching the sr-TransMax, the wireless device may trigger a RACH procedure.

In an example, beamFailureDetectionTimer and beamFailureInstanceMaxCount may be configured cell specifically per DL BWP configured. In an example, based on reconfiguration of beamFailureDetectionTimer, beamFailureInstanceMaxCount, or any of the reference signals used for beam failure detection by upper layers, BFI_COUNTER my be set to 0 for the given Serving Cell. In an example, when SCell BFR SR resource is not configured and SCell BFR MAC CE transmission triggers SCell BFR SR, Random Access procedure on SpCell may be triggered to request UL resources to transmit the SCell BFR MAC CE.

In an example, when SCell BFR SR is triggered and the wireless device has an overlapping SR PUCCH resource with the SCell BFR SR PUCCH resource, the wireless device may all select the SCell BFR SR PUCCH resource for transmission. In an example, a pending SR for SCell beam failure recovery triggered prior to the MAC PDU assembly may be cancelled when the MAC PDU is transmitted and this PDU includes a SCell BFR MAC CE. In an example, SCell BFR MAC CE may carry information of multiple failed SCells, e.g., a multiple entry format for SCell BFR MAC CE may be used.

In an example, for a SCell, the SCell BFR MAC CE may indicate the following information: information about the failed SCell index, indication if new candidate beam RS is detected or not, and new candidate beam RS index (if available). In an example, SCell BFR MAC CE may have higher priority than data from logical channels except UL-CCCH and/or LBT failure indication MAC CE.

Figure 21:
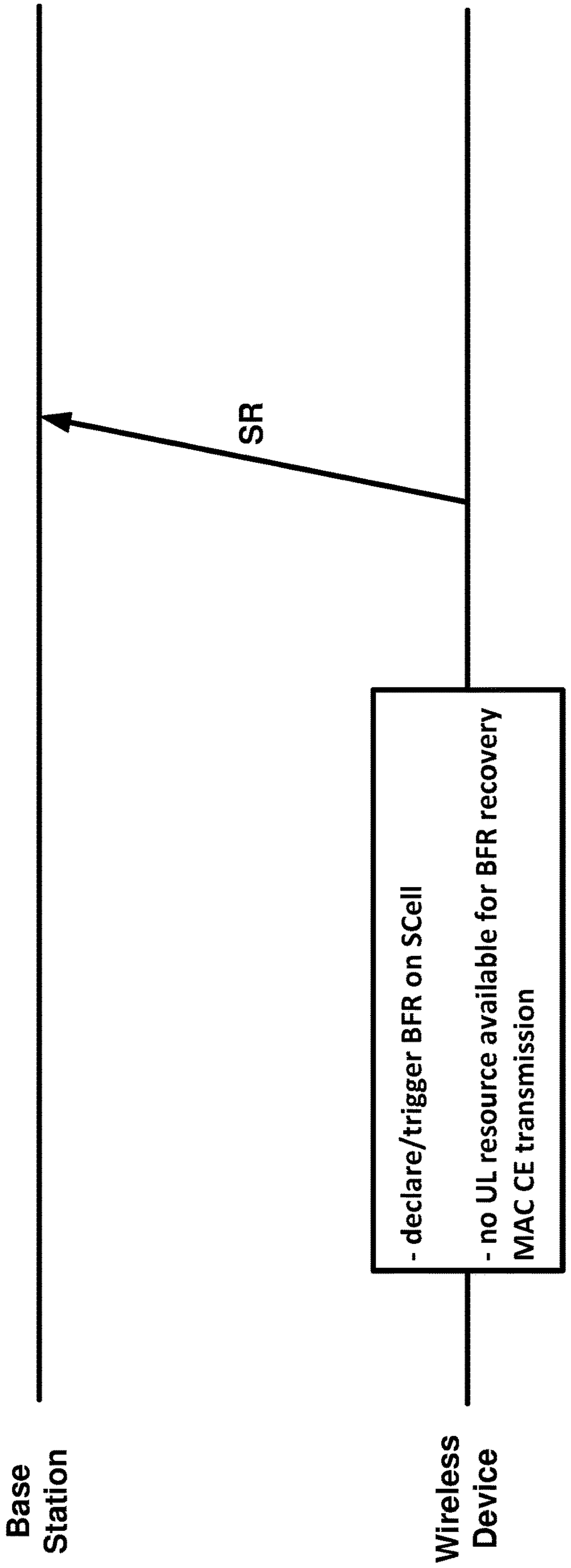
FIG. 21 shows scheduling request transmission for beam failure recovery in accordance with several of various embodiments of the present disclosure.
Figure 22:
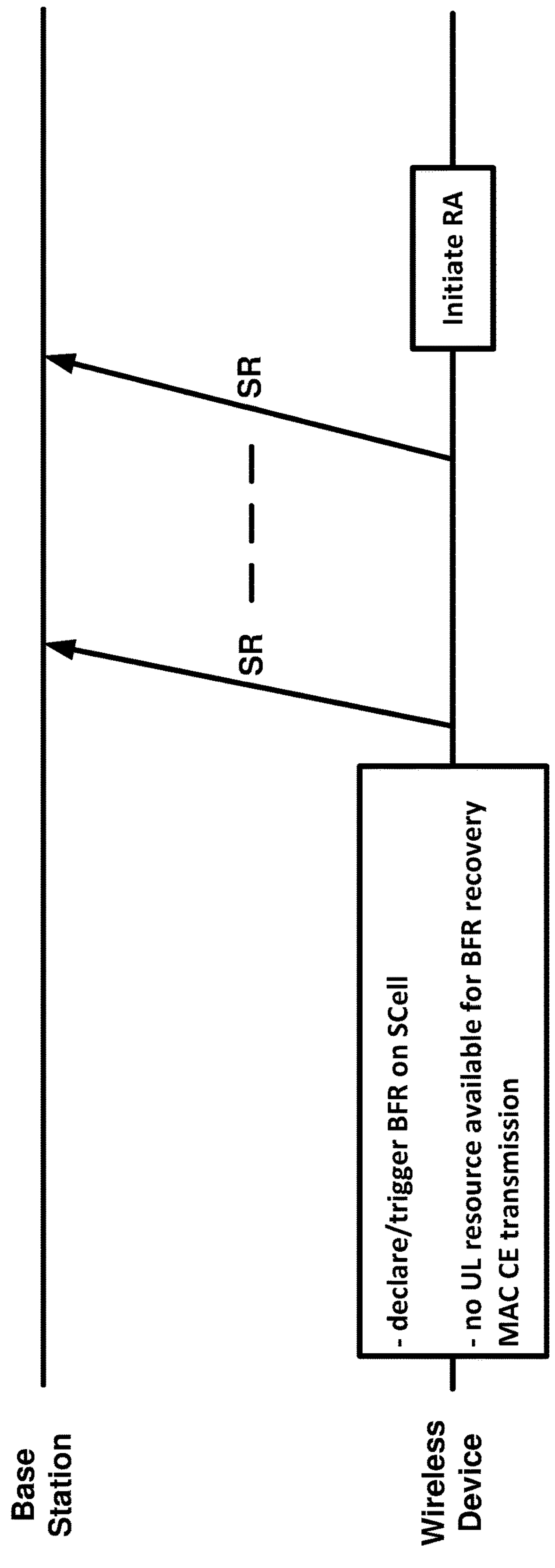
FIG. 22 shows example scheduling request and random access processes for beam failure recovery in accordance with several of various embodiments of the present disclosure.

In an example as shown in FIG. 21, the wireless device may declare/trigger BFR on SCell on a cell based on a beam failure detection process described earlier. The wireless device may determine that no uplink resource is available for transmission of an BFR MAC CE. Based on no uplink resource being available for transmission of the BFR MAC CE, the wireless device may trigger a scheduling request. The wireless device may transmit a scheduling request signal based on a scheduling request configuration. The scheduling request configuration may be for transmission of scheduling request signals related to BFR. In an example, as shown in FIG. 22, the wireless device may transmit multiple scheduling request signals based on not receiving an uplink grant for transmission of the BFR MAC CE. Based on a SR counter reaching a maximum SR count, the wireless device may initiate a random access process.

Figure 23:
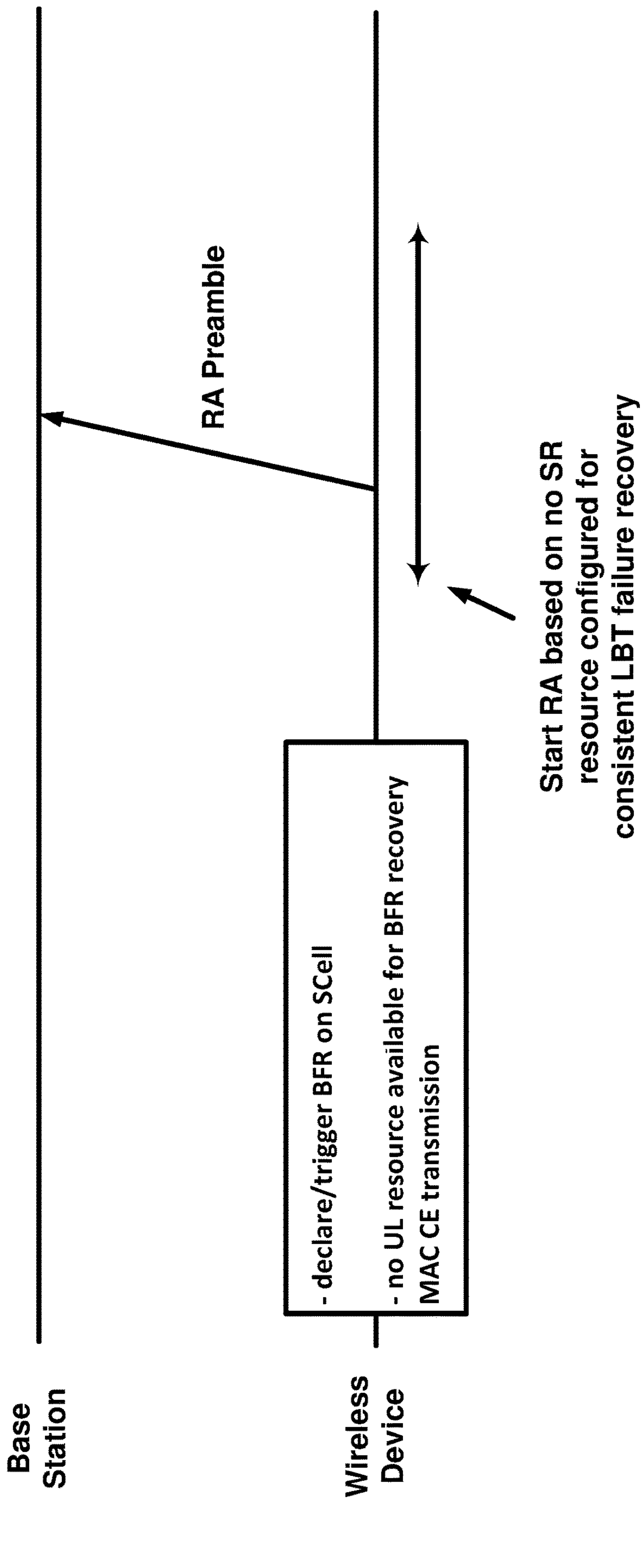
FIG. 23 shows an example process in accordance with several of various embodiments of the present disclosure.

In an example, as shown in FIG. 23, the wireless device may declare/trigger BFR on SCell based on a beam failure detection process described earlier. The wireless device may determine that no uplink resource is available for transmission of a BFR MAC CE. The wireless device may not be configured with a scheduling request configuration and/or scheduling request resources for BFR. Based on no uplink resource being available for transmission of the BFR MAC CE and no scheduling request configuration and/or scheduling request resources for consistent LBT failures recovery, the wireless device may start a random access process.

In an example, the configuration parameters of the scheduling request configuration (e.g., a scheduling request identifier and/or other parameters) may indicate that the scheduling request configuration is for BFR. The scheduling request configuration may indicate resources comprising a first resource for transmission of the scheduling request signal.

In an example, a serving Cell may be configured with one or multiple BWPs. The BWP switching for a Serving Cell may be used to activate an inactive BWP and deactivate an active BWP at a time. The BWP switching may be controlled by the PDCCH indicating a downlink assignment or an uplink grant, by the bwp-InactivityTimer, by RRC signalling, or by the MAC entity itself upon initiation of Random Access procedure.

In an example, upon RRC (re-)configuration of firstActiveDownlinkBWP-Id and/or firstActiveUplinkBWP-Id for SpCell or activation of an SCell, the DL BWP and/or UL BWP indicated by firstActiveDownlinkBWP-Id and/or firstActiveUplinkBWP-Id respectively may be active without receiving PDCCH indicating a downlink assignment or an uplink grant. The active BWP for a Serving Cell may be indicated by RRC or PDCCH. For unpaired spectrum, a DL BWP may be paired with a UL BWP, and BWP switching may be common for both UL and DL.

In an example, for an activated Serving Cell configured with a BWP, if a BWP is activated, the MAC entity may transmit on UL-SCH on the BWP; transmit on RACH on the BWP, if PRACH occasions are configured; monitor the PDCCH on the BWP; transmit PUCCH on the BWP, if configured; report CSI for the BWP; transmit SRS on the BWP, if configured; receive DL-SCH on the BWP; (re-) initialize suspended configured uplink grants of configured grant Type 1 on the active BWP according to the stored configuration, if any, and to start in a symbol.

In an example, for an activated Serving Cell configured with a BWP, if a BWP is deactivated, the MAC entity may not transmit on UL-SCH on the BWP; the MAC entity may not monitor the PDCCH on the BWP; the MAC entity may not transmit PUCCH on the BWP; the MAC entity may not report CSI for the BWP; the MAC entity may not transmit SRS on the BWP; the MAC entity may not receive DL-SCH on the BWP; the MAC entity may clear configured downlink assignment and configured uplink grant of configured grant Type 2 on the BWP; the MAC entity may suspend configured uplink grant of configured grant Type 1 on the inactive BWP.

In an example, upon initiation of the Random Access procedure on a Serving Cell, the wireless device may select a carrier for performing Random Access procedure. The PRACH occasions may not be configured for the active UL BWP. The MAC entity may, for the selected carrier of this Serving Cell, switch the active UL BWP to BWP indicated by initialUplinkBWP. If the Serving Cell is an SpCell, the MAC entity may, for the selected carrier of this Serving Cell, switch the active DL BWP to BWP indicated by initialDownlinkBWP.

In an example, upon initiation of the Random Access procedure on a Serving Cell, the wireless device may select a carrier for performing Random Access procedure. The PRACH occasions may be configured for the active UL BWP. If the Serving Cell is an SpCell, if the active DL BWP does not have the same bwp-Id as the active UL BWP, the MAC entity may, for the selected carrier of this Serving Cell, switch the active DL BWP to the DL BWP with the same bwp-Id as the active UL BWP.

In an example, upon initiation of the Random Access procedure on a Serving Cell, the wireless device may select a carrier for performing Random Access procedure. The MAC entity may for the selected carrier of this Serving Cell, stop the bwp-InactivityTimer associated with the active DL BWP of this Serving Cell, if running. If the Serving Cell is SCell, the MAC entity may, for the selected carrier of this Serving Cell, stop the bwp-InactivityTimer associated with the active DL BWP of SpCell, if running. The MAC entity may, for the selected carrier of this Serving Cell, perform the Random Access procedure on the active DL BWP of SpCell and active UL BWP of this Serving Cell.

In an example, if the MAC entity receives a PDCCH for BWP switching of a Serving Cell, if there is no ongoing Random Access procedure associated with this Serving Cell; or if the ongoing Random Access procedure associated with this Serving Cell is successfully completed upon reception of this PDCCH addressed to C-RNTI, the MAC entity may perform BWP switching to a BWP indicated by the PDCCH.

In an example, if the MAC entity receives a PDCCH for BWP switching for a Serving Cell while a Random Access procedure associated with that Serving Cell is ongoing in the MAC entity, it may be up to wireless device implementation whether to switch BWP or ignore the PDCCH for BWP switching, except for the PDCCH reception for BWP switching addressed to the C-RNTI for successful Random Access procedure completion in which case the wireless device may perform BWP switching to a BWP indicated by the PDCCH. Upon reception of the PDCCH for BWP switching other than successful contention resolution, if the MAC entity decides to perform BWP switching, the MAC entity may stop the ongoing Random Access procedure and initiate a Random Access procedure after performing the BWP switching; if the MAC decides to ignore the PDCCH for BWP switching, the MAC entity may continue with the ongoing Random Access procedure on the Serving Cell.

In an example, upon reception of RRC (re-)configuration for BWP switching for a Serving Cell while a Random Access procedure associated with that Serving Cell is ongoing in the MAC entity, the MAC entity may stop the ongoing Random Access procedure and initiate a Random Access procedure after performing the BWP switching.

In an example, the defaultDownlinkBWP-Id may be configured, and the active DL BWP may not be the BWP indicated by the defaultDownlinkBWP-Id. In an example the defaultDownlinkBWP-Id may not configured, and the active DL BWP may not bethe initialDownlinkBWP. A PDCCH addressed to C-RNTI or CS-RNTI indicating downlink assignment or uplink grant may be received on the active BWP; or a PDCCH addressed to C-RNTI or CS-RNTI indicating downlink assignment or uplink grant may be received for the active BWP; or a MAC PDU may be transmitted in a configured uplink grant or received in a configured downlink assignment. If there is no ongoing Random Access procedure associated with this Serving Cell; or if the ongoing Random Access procedure associated with this Serving Cell is successfully completed upon reception of this PDCCH addressed to C-RNTI: the MAC entity may start or restart the bwp-InactivityTimer associated with the active DL BWP.

In an example, the defaultDownlinkBWP-Id may be configured, and the active DL BWP may not be the BWP indicated by the defaultDownlinkBWP-Id. In an example the defaultDownlinkBWP-Id may not configured, and the active DL BWP may not be the initialDownlinkBWP. The bwp-InactivityTimer associated with the active DL BWP may expire. If the defaultDownlinkBWP-Id is configured, the MAC entity may perform BWP switching to a BWP indicated by the defaultDownlinkBWP-Id. Otherwise, the MAC entity may perform BWP switching to the initialDownlinkBWP.

In an example, if a Random Access procedure is initiated on an SCell, both this SCell and the SpCell may be associated with this Random Access procedure.

In an example, a PDCCH for BWP switching may be received, and the MAC entity may switch the active DL BWP. If the defaultDownlinkBWP-Id is configured, and the MAC entity switches to the DL BWP which is not indicated by the defaultDownlinkBWP-Id; or if the defaultDownlinkBWP-Id is not configured, and the MAC entity switches to the DL BWP which is not the initialDownlinkBWP, the MAC entity may start or restart the bwp-InactivityTimer associated with the active DL BWP.

A wireless device may be configured with a beam failure recovery procedure and may use a beam failure detection process to detect beam failures on the one or more serving SSBs and/or one or more serving CSI-RSs. Beam failure may be detected/determined based on a beam failure detection process comprising counting beam failure instance indications/notifications from the physical layer to a MAC entity. The wireless device may start a beam failure recovery procedure based on the detecting/determining the beam failure on a cell. The beam failure recovery may be based on performing a random access process, for example on a primary cell. The wireless device may detect consistent LBT failures on one or more cells and may perform a random access process to recover from the consistent LBT failures on the one or more cells. When the one or more cells have consistent LBT failures and one or more second cells have beam failure, there may be a conflict between the consistent LBT failures recovery process and the beam failure recovery process. Existing solutions for beam failure and consistent LBT failure recovery processes may lead to degraded wireless device and network performance. There is a need to enhance the existing beam failure and consistent LBT failures recovery processes. Example embodiments enhance the beam failure and consistent LBT failures recovery processes.

In an example, a wireless device may receive one or more messages comprising configuration parameters. The one or more messages may comprise one or more RRC messages. The one or more messages may comprise configuration parameters of a plurality of cells. The plurality of cells may comprise a first plurality of unlicensed cells. The plurality of cells may comprise a primary cell and one or more secondary cells. The plurality of cells may comprise a plurality of cell groups. A first cell group of the plurality of cell groups may be served by a first base station (e.g., a master bae station) and a second cell group of the plurality of cell groups may be served by a second base station (e.g., a secondary base station).

In an example the plurality of cells may comprise a plurality of PUCCH groups. A first PUCCH group (e.g., a primary PUCCH group) in the plurality of PUCCH groups may comprise a first plurality of cells, of the plurality of cells, comprising a primary cell, wherein the primary cell may carry first uplink control information (UCI) associated with the first plurality of cells. A second PUCCH group in the plurality of PUCCH groups may comprise a second plurality of cells, of the plurality of cells, comprising a PUCCH SCell, wherein the PUCCH SCell may carry second UCI associated with the second plurality of cells.

The one or more messages may comprise first configuration parameters for consistent LBT failure detection and recovery. The first configuration parameters may comprise one or more counter values for one or more counters (e.g., one or more LBT counters) and one or more timer values for one or more timers (e.g., one or more consistent uplink LBT failure detection timers). The wireless device may employ the one or more timers and the one or more counters for consistent LBT failures detection on one or more cells. The wireless device may employ the first configuration parameters for consistent LBT failure detection and recovery on one or more cells.

The one or more messages may comprise second configuration parameters for beam failure detection and beam failure recovery (BFR). The second configuration parameters may comprise one or more counter values for one or more counters/variables (e.g., beam failure instance counter/variable) and one or more timer values for one or more timers (e.g., beam failure detection timer). The wireless device may employ the one or more counters/variables and the one or more timers for beam failure detection and beam failure recovery.

In an example, the one or more messages may comprise first scheduling request configuration parameters for consistent LBT failure recovery. The first scheduling request configuration parameters may comprise a first identifier indicating that the first scheduling request configuration is for consistent LBT failure recovery. The first scheduling request configuration may indicate first PUCCH resources for transmission of scheduling requests for recovery from consistent LBT failures on one or more cells. The first scheduling request configuration may comprise first parameters (e.g., first periodicity and offset, first PUCCH resource identifiers, etc.) indicating the first PUCCH resources for transmission of scheduling request signals for consistent LBT failures recovery. In an example, the one or more messages may comprise configuration parameters of a plurality of scheduling request configurations comprising the first scheduling request configuration for consistent LBT failures recovery. In an example, the first scheduling request configuration may indicate the scheduling resources for transmission via a PUCCH of a primary cell and/or via a PUCCH of a SCell configured with PUCCH. In an example, the scheduling requests for consistent LBT failures on a cell in a primary PUUCH group may be transmitted via scheduling request resources on a primary cell. In an example, the scheduling request signals for consistent LBT failures on a cell in a secondary PUCCH group may be transmitted via scheduling request resources on a PUCCH SCell.

In an example, the one or more messages may comprise second scheduling request configuration parameters for beam failure recovery. The second scheduling request configuration parameters may comprise a second identifier indicating that the second scheduling request configuration is for beam failure recovery. The second scheduling request configuration may indicate second PUCCH resources for transmission of scheduling requests for recovery from beam failure on one or more cells. The second scheduling request configuration may comprise second parameters (e.g., second periodicity and offset, second PUCCH resource identifiers, etc.) indicating the second PUCCH resources for transmission of scheduling request signals for BFR. In an example, the one or more messages may comprise configuration parameters of a plurality of scheduling request configurations comprising the second scheduling request configuration for beam failure recovery. In an example, the second scheduling request configuration may indicate the scheduling resources for transmission via a PUCCH of a primary cell and/or via a PUCCH of a SCell configured with PUCCH. In an example, the scheduling requests for beam failure on a cell in a primary PUUCH group may be transmitted via scheduling request resources on a primary cell. In an example, the scheduling request signals for beam failure on a cell in a secondary PUCCH group may be transmitted via scheduling request resources on a PUCCH SCell.

In an example, the one or more messages may comprise random access configuration parameters indicating radio resources and/or RACH occasions for transmission of random access preambles and/or random access messages. The random access configuration parameters may comprise cell-specific and dedicated parameters. In an example, the cell specific and dedicated random access parameters may comprise parameters related to regular random access and/or random access for beam failure recovery. In an example, the cell-specific and/or dedicated random access configuration parameters may comprise first parameters of random access for consistent LBT failures recovery.

Figure 24:
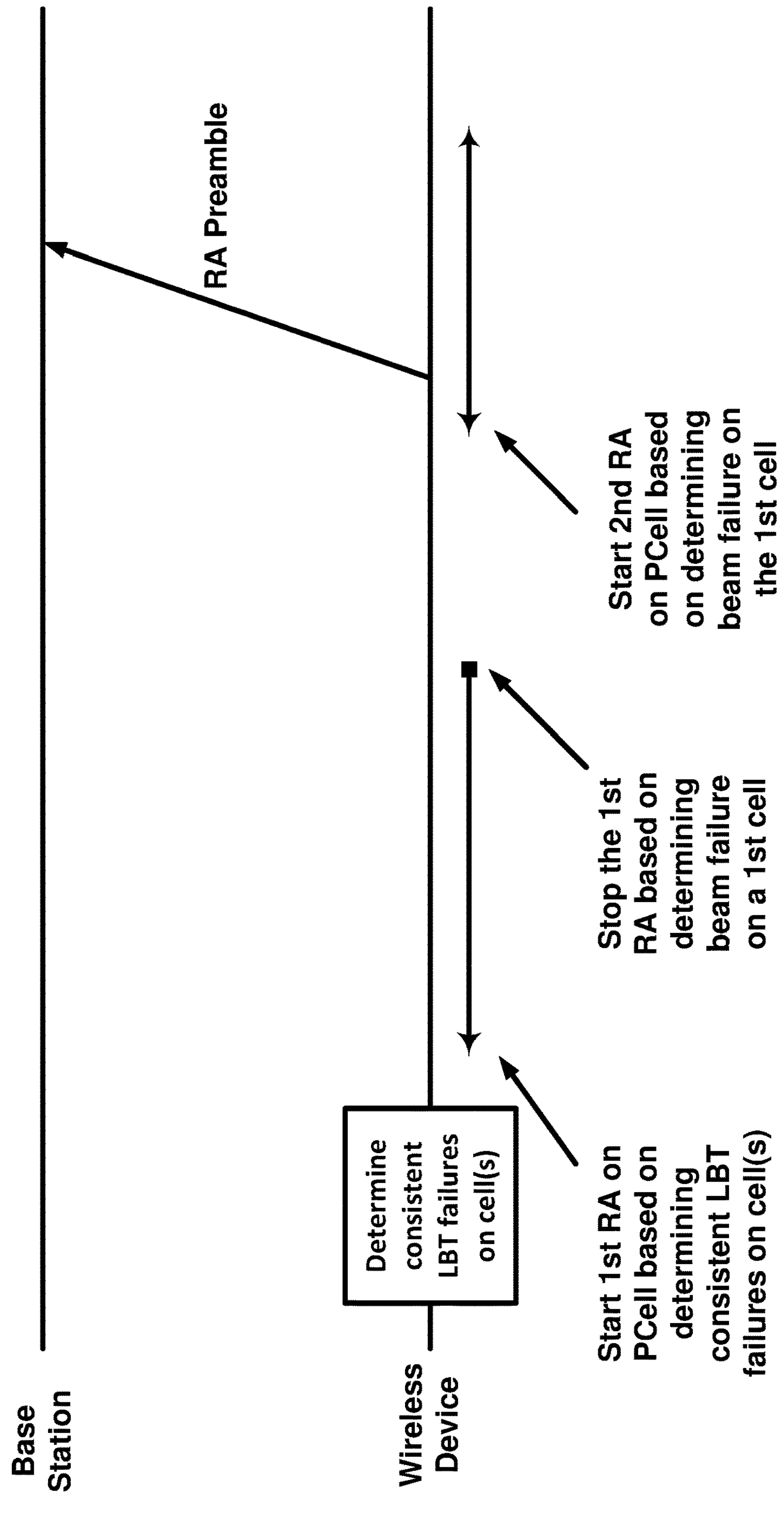
FIG. 24 shows an example process in accordance with several of various embodiments of the present disclosure.
Figure 25:
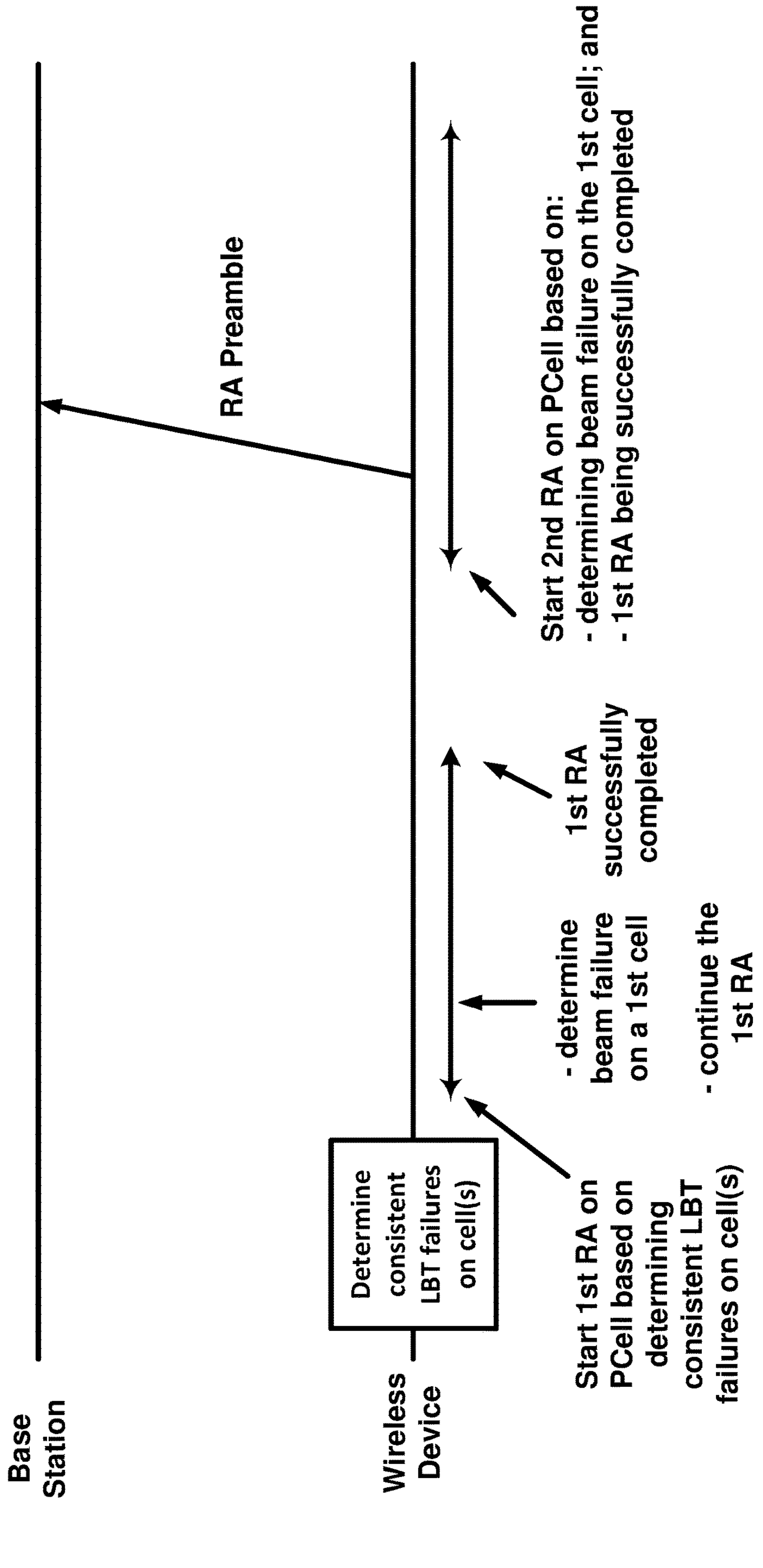
FIG. 25 shows an example process in accordance with several of various embodiments of the present disclosure.
Figure 26:
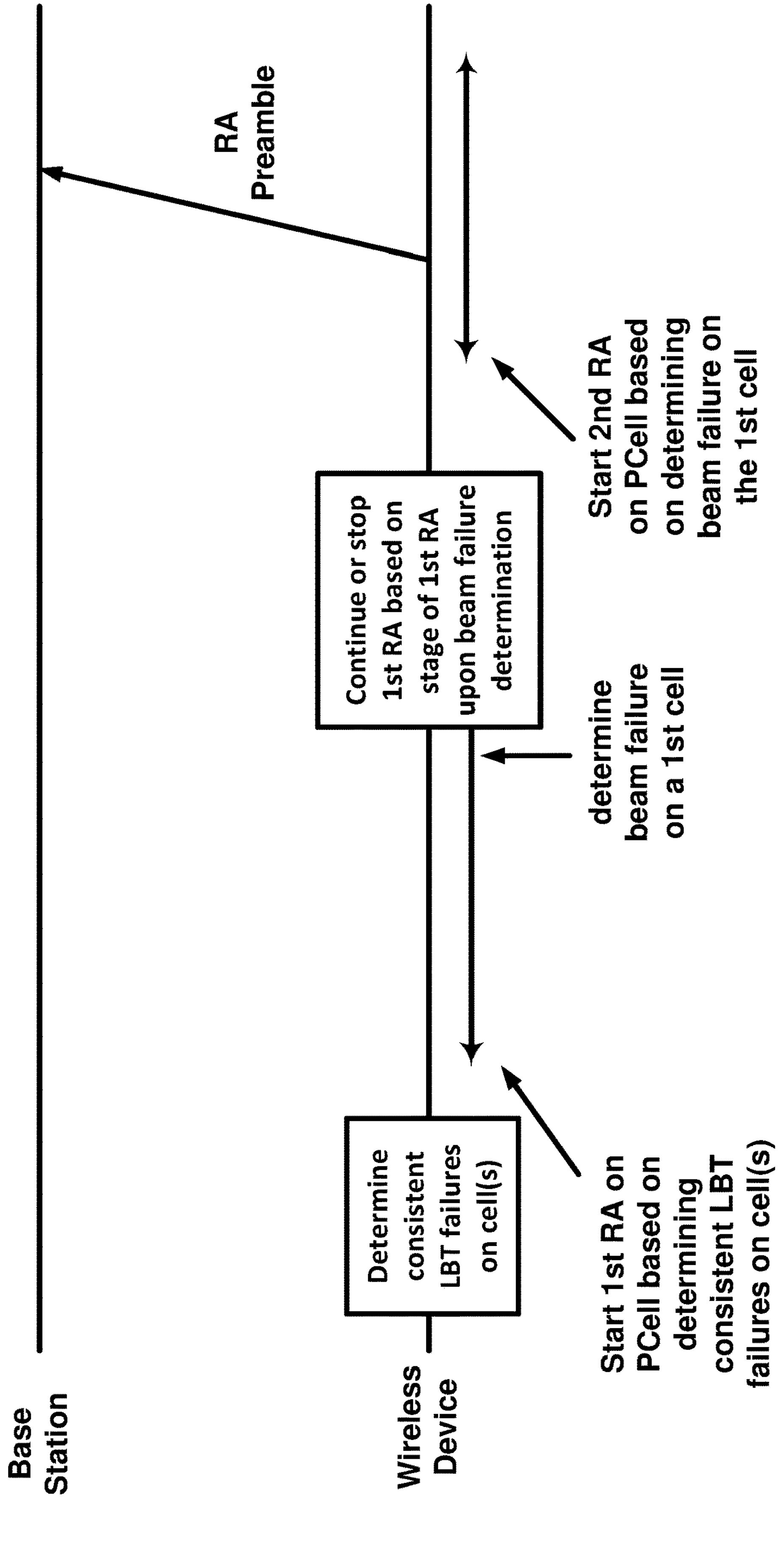
FIG. 26 shows an example process in accordance with several of various embodiments of the present disclosure.

In example embodiments as shown in FIG. 24-FIG. 26, a wireless device may determine consistent uplink LBT failures on one or more cells of a plurality of unlicensed cells configured for the wireless device. The wireless device may determine the consistent LBT failures on the one or more cells based on a consistent LBT failure detection process. The consistent LBT failures detection process may employ indications of LBT failures for uplink transmissions (e.g., one or more uplink channel transmissions, e.g., PUSCH, PUCCH and/or one or more uplink signal transmissions, e.g., SRS) from a physical layer of the wireless device and may employ one or more counters (e.g., LBT counter) and one or more timers (e.g., consistent LBT detection timer) for detection of the consistent LBT failures.

The wireless device may start a first random access process on a primary cell based on the determining the consistent LBT failures on the one or more cells. In an example, the one or more cells with consistent LBT failures may comprise a primary cell. The starting the first random access on the primary cell may be based on the one or more cells with consistent LBT failures comprising the primary cell. In an example, the one or more cells with consistent LBT failures may comprise the primary cell and one or more secondary cells. In an example, based on the one or more cells with consistent LBT failures comprising the primary cell, the wireless device may switch from a first BWP of the primary cell to a second BWP of the primary cell and may start the first random access process on the second BWP of the primary cell. The consistent LBT failure on the primary cell may be determined on the first BWP of the primary cell and the wireless device may switch from the first BWP of the primary cell to the second BWP of the primary cell and may start the first random access process based the consistent LBT failures on the first BWP of the primary cell.

In an example, the wireless device may trigger LBT failure indication based on the determining the consistent LBT failure on the one or more cells. The wireless device may have no uplink resources for transmission of an uplink LBT failure indication MAC CE. The wireless device may not be configured with a scheduling request configuration/resources for consistent LBT failure recovery. The starting the first random access on the primary cell may be based on the triggering the LBT failure indication, no uplink resources being available for transmission of an LBT failures indication MAC CE and no scheduling request resource/configuration for consistent LBT failures being configured for the wireless device.

In an example, the wireless device may trigger LBT failure indication based on the determining the consistent LBT failures on the one or more cells. The wireless device may have no uplink resources for transmission of an LBT failure indication MAC CE. The wireless device may be configured with a scheduling request configuration for consistent LBT failures recovery. The wireless device may trigger scheduling request based on no uplink resources being available for transmission of the LBT failure indication MAC CE. The wireless device may transmit scheduling request signals (e.g., based on the scheduling request configuration for consistent LBT failures recovery) and, in response to the transmitted scheduling request signals, may not receive an uplink grant useful for transmission of the LBT failure indication MAC CE. The starting the first random access process may be based on transmitting scheduling request signals (e.g., for a maximum count of scheduling request transmissions) for consistent LBT failures recovery and not receiving an uplink grant for transmission of a the LBT failure indication MAC CE. The wireless device may receive a configuration parameter that indicates the maximum count of SR transmissions before starting a first random access process.

In an example, the first random access process on the primary cell may be a four-step random access process. The wireless device may transmit a random access preamble based on the starting the first random access process. In an example, the first random access process may be a two-step random access process. The wireless device may transmit a Msg A (e.g., a random access preamble and a packet) based on the starting the first random access and the first random access process being a two-step random access process.

In example embodiments as shown in FIG. 24-FIG. 26, the wireless device may detect beam failure on a first cell. The wireless device may detect beam failure on the first cell based on one or more serving SSBs and/or one or more serving CSI-RSs. In an example, the detecting the beam failure on the first cell may be based on indications/notifications of beam failure instances from physical layer of the wireless device to a MAC entity of the wireless device. The wireless device may detect the beam failure on the first cell based on a beam failure detection process employing one or more counters and/or wireless device variables (e.g., a BFI_COUNTER incremented based on receiving beam failure instance indications/notifications from physical layer) and one or more timers (e.g., beam failure detection timer).

In an example embodiment as shown in FIG. 24, based on the detecting/determining the beam failure on the first cell, the wireless device may stop the first random access process (e.g., for consistent LBT failures recovery) on the primary cell and may start a second process on the primary cell for beam failure recovery. The wireless device may start the second random access for beam failure recovery after stopping the first random access. In an example, the stopping the first random access process may comprise stopping transmission of a random access preamble (or Msg A in case of two-step random access) and/or stopping monitoring control channel for random access response. In an example, the starting the second random access process may comprise transmitting a random access preamble (e.g., for four-step random access process) or transmitting a Msg A (e.g., for two-step random access process) on the primary cell.

In an example, the wireless device may further start a third random access process on the primary cell for consistent LBT failures recovery based on the second random access for beam failure recovery being successfully completed. The wireless device may start the third random access process by transmitting a random access preamble or Msg A (e.g., in case of two-step random access) using a RACH occasion on the primary cell that occurs after the completion of second random access process. The wireless device may transmit the random access preamble or Msg A using a RACH occasion after receiving a random access response or Msg 4/Msg B associated with the second random access process indicating successful completion of the second random access process. In an example, the third random access process may be a two-step random access process and the wireless device may transmit a Msg A based on starting the third random access process. In an example, the third random access process may be a four-step random access process and the wireless device may transmit a random access preamble based on starting the third random access process.

In an example embodiment as shown in FIG. 25, based on the detecting/determining the beam failure on the first cell, the wireless device may continue the first random access process (e.g., for consistent LBT failures recovery) on the primary cell. The wireless device may start a second random access process on the primary cell for beam failure recovery based on the first random access for consistent LBT failure being successfully completed. In an example, the starting the second random access process may comprise transmitting a random access preamble or transmitting a Msg A (e.g., for two-step random access process) on the primary cell. The starting the second random access process may comprise transmitting a random access preamble or Msg A via a RACH resource on the primary cell after receiving a random access response or a Msg 4/Msg B associated with the first random access process indicating successful completion of the first random access process.

In an example embodiment as shown in FIG. 26, based on the detecting/determining the beam failure on the first cell, the wireless device may continue or stop the first random access process (for consistent LBT failures recovery) on the primary cell based on a stage of the first random access process, for example depending on whether a RAR/Msg 4/Msg B has been received from the base station or depending on whether a Msg 1/Msg A/Msg 3 has been transmitted, etc. For example, the wireless device may continue the first random access process (for consistent LBT failures recovery) if the wireless device has received a random access response or a Msg 4 or a Msg B and determines/detects the beam failure on the first cell after receiving the random access response or Msg 4 or Msg B. For example, the wireless device may stop the first random access process (for consistent LBT failures recovery) if the wireless device has not received a random access response or a Msg 4 or a Msg B and determines/detects the beam failure on the first cell before receiving the random access response or Msg 4 or Msg B.

In an example, the first cell wherein the beam failure is determined may be a primary cell. The wireless device may start the second random access process for beam failure recovery based on the first cell being the primary cell. In an example, a beam failure recovery process may comprise starting a random access process based on a cell on which the beam failure is detected being a primary cell.

In an example, the first cell wherein the beam failure is determined may be a secondary cell. The wireless device may trigger a beam failure recovery MAC CE. In an example, the wireless device may trigger the beam failure recovery MAC CE based on the first cell being a secondary cell. The wireless device may have no uplink resources for transmission of the beam failure recovery MAC CE. The starting the second random access process on the primary cell for beam failure recovery may be based on the triggering the beam failure recovery and based on no scheduling request resource/configuration for beam failure recovery being configured for the wireless device.

In an example, the first cell wherein the beam failure is determined may be a secondary cell. The wireless device may trigger a beam failure recovery MAC CE. In an example, the wireless device may trigger the beam failure recovery MAC CE based on the first cell being a secondary cell. The wireless device may have no uplink resources for transmission of the beam failure recovery MAC CE. The wireless device may be configured with a scheduling request configuration for beam failure recovery, wherein the scheduling request configuration may indicate scheduling request resources for beam failure recovery. The wireless device may transmit a plurality of scheduling request signals for beam failure recovery based on the scheduling request configuration for beam failure recovery. The plurality of scheduling request signals may be transmitted via scheduling request resources determined based on one or more scheduling request configuration parameters for beam failure recovery. A number of the plurality of scheduling request signals may be a first number (e.g., a maximum scheduling request count before starting a random access process). The wireless device may not receive an uplink grant for transmission of a beam failure recovery MAC CE based on the transmitting the plurality of scheduling request signals. The starting the second random access process for beam failure recovery on the primary cell may be based the transmitting the plurality of scheduling request signals and not receiving an uplink grant for transmission of the beam failure recovery MAC CE.

In an example embodiment as shown in FIG. 27-FIG. 33, a wireless device may determine beam failure on a first cell. The wireless device may determine the beam failure on the first cell based on a beam failure detection process. A beam failure instance counter/variable may reach a first value (e.g., a beam failure instance count max value) based on receiving indications/notifications of beam failure instances from the physical layer. Based on the determining the beam failure on the first cell, the wireless device may start a first random access process for beam failure recovery. The wireless device may transmit a random access preamble or a Msg A (e.g., in case of a two-step random access process) based on the starting the first random access process on the primary cell.

In an example, the first cell wherein the beam failure is determined may be a primary cell. The wireless device may start the first random access process for beam failure recovery based on the first cell being the primary cell. In an example, a beam failure recovery process may comprise starting a random access process based on a cell on which the beam failure is detected being a primary cell.

In an example, the first cell wherein the beam failure is determined may be a secondary cell. The wireless device may trigger a beam failure recovery MAC CE. In an example, the wireless device may trigger the beam failure recovery MAC CE based on the first cell being a secondary cell. The wireless device may have no uplink resources for transmission of the beam failure recovery MAC CE. The starting the first random access process on the primary cell for beam failure recovery may be based on the triggering the beam failure recovery and based on no scheduling request resource/configuration for beam failure recovery being configured for the wireless device.

In an example, the first cell wherein the beam failure is determined may be a secondary cell. The wireless device may trigger a beam failure recovery MAC CE. In an example, the wireless device may trigger the beam failure recovery MAC CE based on the first cell being a secondary cell. The wireless device may have no uplink resources for transmission of the beam failure recovery MAC CE. The wireless device may be configured with a scheduling request configuration for beam failure recovery, wherein the scheduling request configuration may indicate scheduling request resources for beam failure recovery. The wireless device may transmit a plurality of scheduling request signals for beam failure recovery based on the scheduling request configuration for beam failure recovery. The plurality of scheduling request signals may be transmitted via scheduling request resources determined based on one or more scheduling request configuration parameters for beam failure recovery. A number of the plurality of scheduling request signals may be a first number (e.g., a maximum scheduling request count before starting a random access process). The wireless device may not receive an uplink grant for transmission of a beam failure recovery MAC CE based on the transmitting the plurality of scheduling request signals. The starting the first random access process for beam failure recovery on the primary cell may be based the transmitting the plurality of scheduling request signals and not receiving an uplink grant for transmission of the beam failure recovery MAC CE.

In an example, the wireless device may determine consistent LBT failure on one or more cells of a plurality of unlicensed cells configured for the wireless device, wherein the one or more cells comprise a primary cell. The wireless device may determine the consistent LBT failures on the one or more cells based on a consistent LBT failure detection process. The consistent LBT failures detection process may employ indications of LBT failures for uplink transmissions (e.g., one or more uplink channel transmissions, e.g., PUSCH, PUCCH and/or one or more uplink signal transmissions, e.g., SRS) from a physical layer of the wireless device and may employ one or more counters (e.g., LBT counter) and one or more timers (e.g., consistent LBT detection timer) for detection of the consistent LBT failures.

Figure 27:
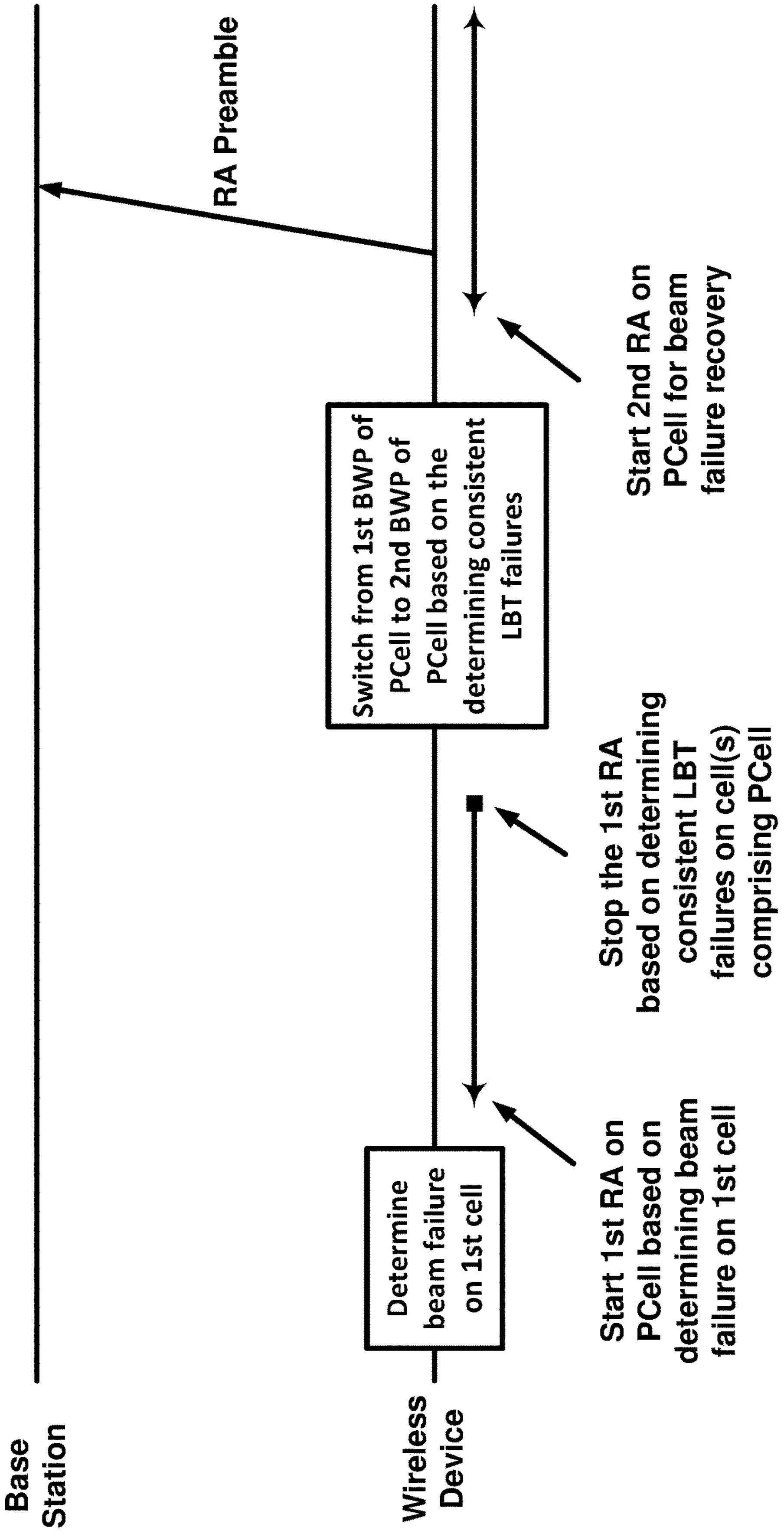
FIG. 27 shows an example process in accordance with several of various embodiments of the present disclosure.
Figure 29:
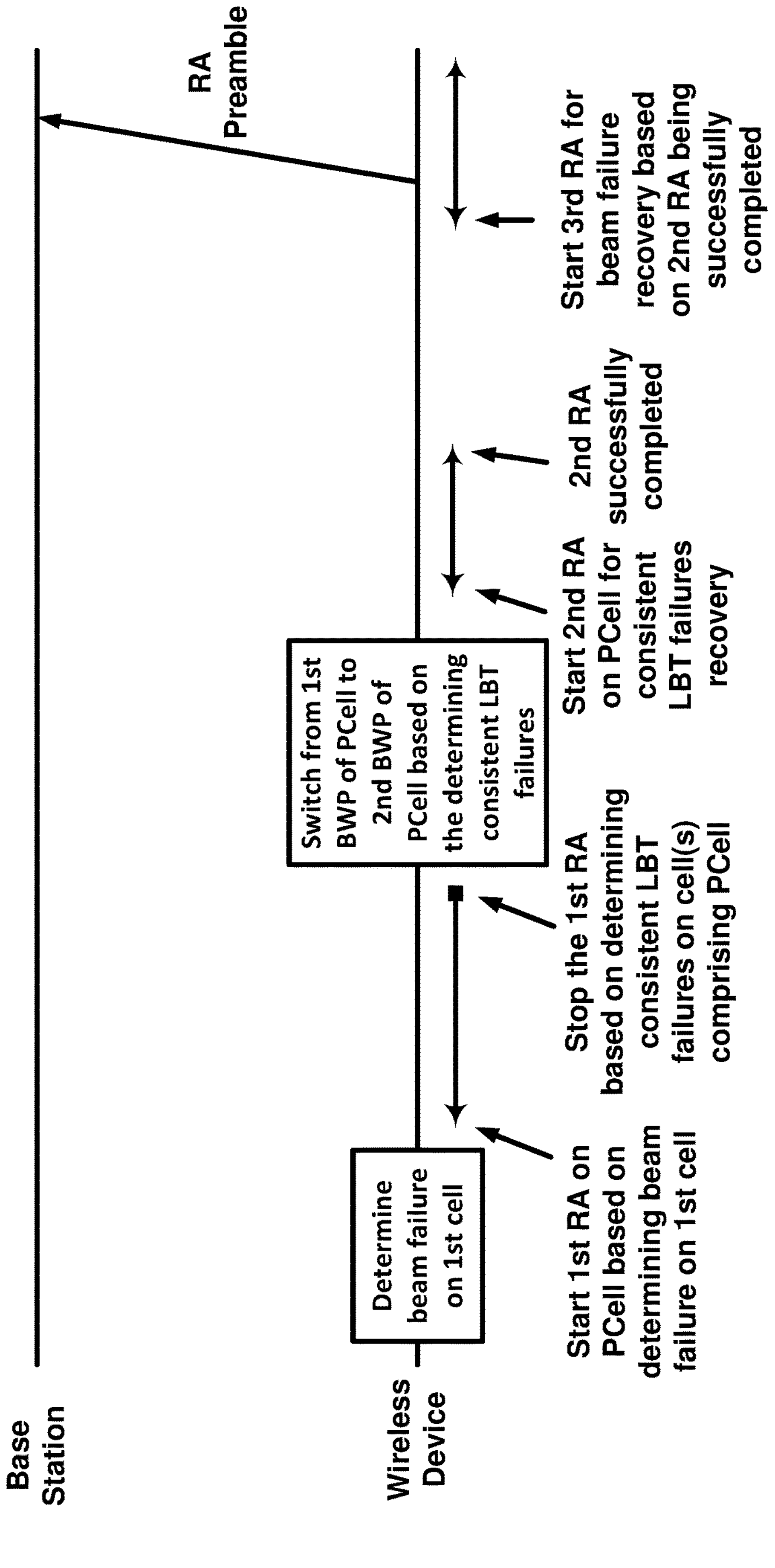
FIG. 29 shows an example process in accordance with several of various embodiments of the present disclosure.

In an example embodiment as shown in FIG. 27, FIG. 29, based on the determining the consistent LBT failures on the one or more cells comprising the primary cell, the wireless device may stop the first random access process. The stopping the first random access process may comprise stopping transmission of a random access preamble (or Msg A in case of two-step random access) and/or stopping monitoring control channel for random access response. Based on the determining the consistent LBT failures on the one or more cells comprising the primary cell, the wireless device may switch from a first bandwidth part of the primary cell to a second bandwidth part of the primary cell. The wireless device may switch from the first BWP of the primary cell to the second BWP of the primary cell based on the one or more cells with consistent LBT failures comprising the primary cell.

In an example embodiment as shown on FIG. 27, the wireless device may start a second random access process for beam failure recovery based on the switching from the first BWP of the primary cell to the second bandwidth part of the primary cell. The wireless device may start the second random access process on the second BWP of the primary cell after switching from the first BWP of the primary cell to the second BWP of the primary cell. The starting the second random access may comprise transmitting a random access preamble or transmitting a Msg A (e.g., in case of a two-step random access) via a RACH occasion of the primary cell (e.g., on the second BWP of the primary cell).

In an example, the wireless device may start a third random access process on the primary cell for consistent LBT failure recovery based on the second random access for beam failure recovery being successfully completed. The wireless device may start the third random access process on the second BWP of the primary cell (e.g., after switching from the first BWP to the second BWP and after successful completion of the second random access process). The wireless device may start the third random access process on the primary cell based on the one or more cells with consistent LBT failures comprising the primary cell. The third random access process on the primary cell may be one of a two-step or four-step random access process. The starting the third random access process may comprise transmitting a random access preamble or a Msg A (e.g., in case of a two-step random access process) via a RACH occasion that occurs after receiving a random access response or a Msg4 indicating successful completion of the second random access process.

In an example embodiment as shown in FIG. 29, the wireless device may start a second random access process for consistent LBT failures recovery on the second bandwidth part of the primary cell. The starting the second random access process may comprise transmitting a random access preamble or a Msg A (e.g., in case of a two-step random access) via a RACH occasion configured for the second BWP of the primary cell. The second random access process may be successfully completed based on receiving a random access response or a Msg 4 indicating successful completion of the second random access process. The wireless device may start a third random access process for beam failure recovery based on the second random access for consistent LBT failures recovery being successfully completed. The wireless device may transmit a random access preamble or a Msg A (e.g., in case of two-step random access process) via a RACH occasion of the second bandwidth part of the second bandwidth after the successful completion of the second random access process. The third random access process may be one of a two-step random access process or four-step random access process.

Figure 31:
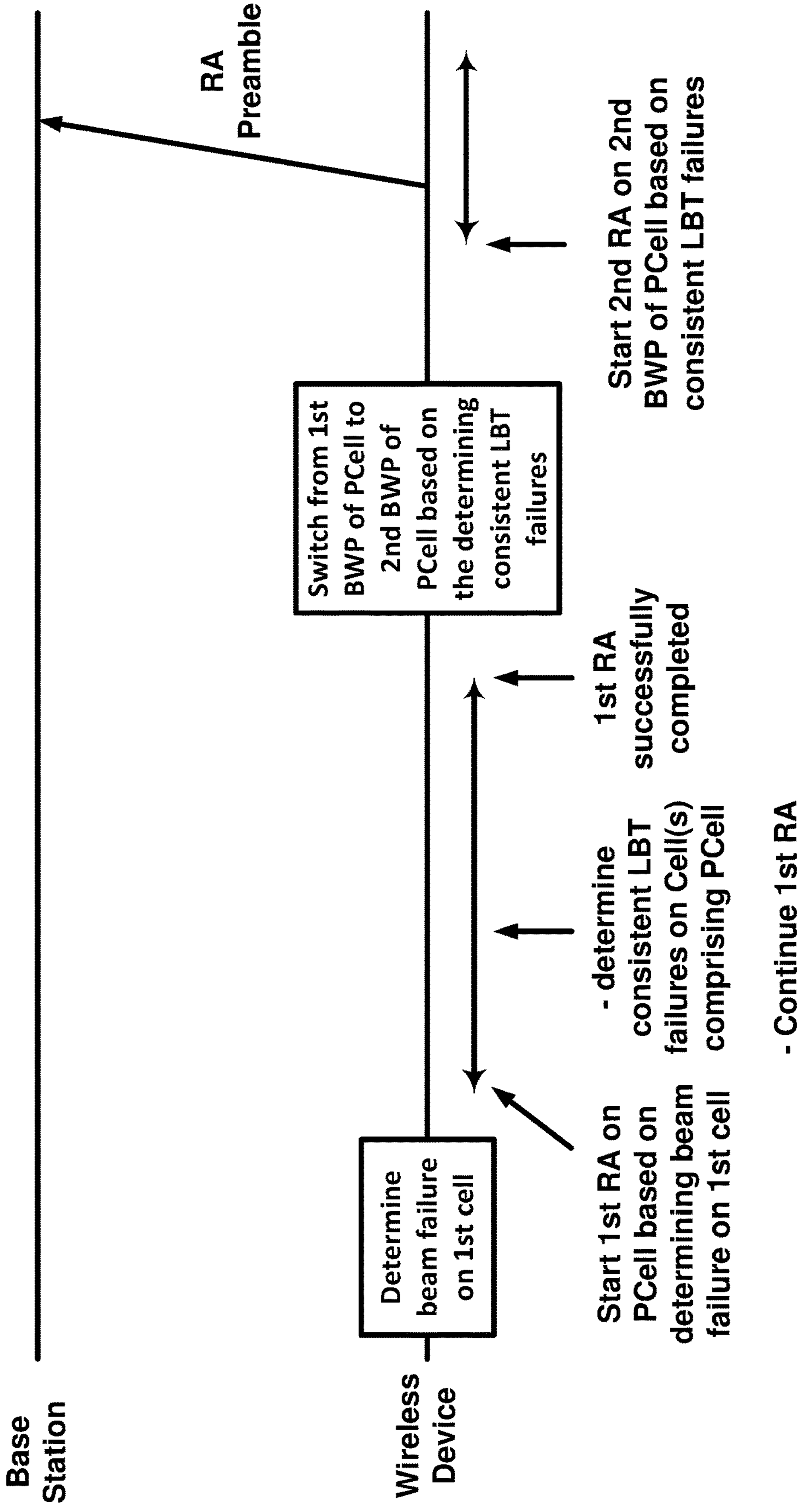
FIG. 31 shows an example process in accordance with several of various embodiments of the present disclosure.

In an example embodiment as shown in FIG. 31, based on determining the consistent LBT failures on the one or more cells comprising the primary cell, the wireless device may continue the first random access process for beam failure recovery. The first random access may be successfully completed. The successful completion of the first random access process may be based on receiving a random access response or a Msg 4 indicating successful completion of the first random access process. The wireless device may switch from the first bandwidth part of the primary cell to the second bandwidth part of the primary cell based on the determining the consistent LBT failures on the one or more cells comprising the primary cell and based on the successful completion of the first random access. The wireless device may switch from the first bandwidth part of the primary cell to the second bandwidth part of the primary cell after the successful completion of the first random access and based on a timing. The wireless device may start a second random access, for consistent LBT failures recovery, on the second BWP of the primary cell. The starting the second random access process may comprise transmitting a random access preamble or a Msg A (e.g., in case of a two-step random access process).

In an example, the wireless device may determine consistent LBT failure on one or more secondary cells of a plurality of unlicensed cells configured for the wireless device. The wireless device may determine the consistent LBT failures on the one or more secondary cells based on a consistent LBT failure detection process. The consistent LBT failures detection process may employ indications of LBT failures for uplink transmissions (e.g., one or more uplink channel transmissions, e.g., PUSCH, PUCCH and/or one or more uplink signal transmissions, e.g., SRS) from a physical layer of the wireless device and may employ one or more counters (e.g., LBT counter) and one or more timers (e.g., consistent LBT detection timer) for detection of the consistent LBT failures.

Figure 28:
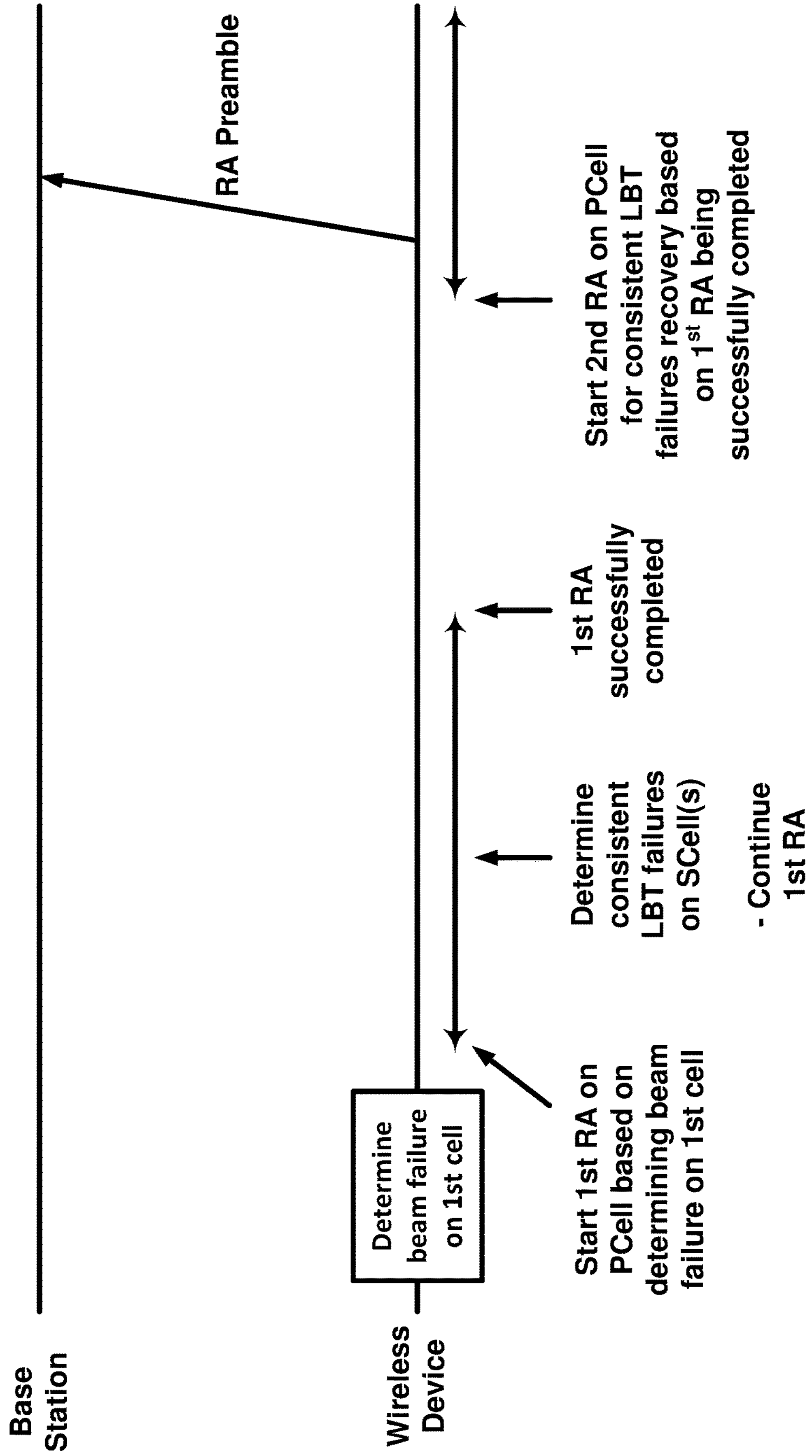
FIG. 28 shows an example process in accordance with several of various embodiments of the present disclosure.

In an example embodiment as shown in FIG. 28, based on the determining the consistent LBT failures on the one or more secondary cells, the wireless device may continue the first random access process for beam failure recovery. The first random access process for beam failure recovery may be successfully completed, for example, based on receiving a random access response or a based on receiving a Msg 4/Msg B indicating successful completion of the first random access process. The wireless device may start a second random access process for consistent LBT failures recovery based on the first random access process being successfully completed. The starting the second random access process may comprise transmitting a random access preamble or transmitting a Msg A (e.g., in case of a two-step random access).

Figure 30:
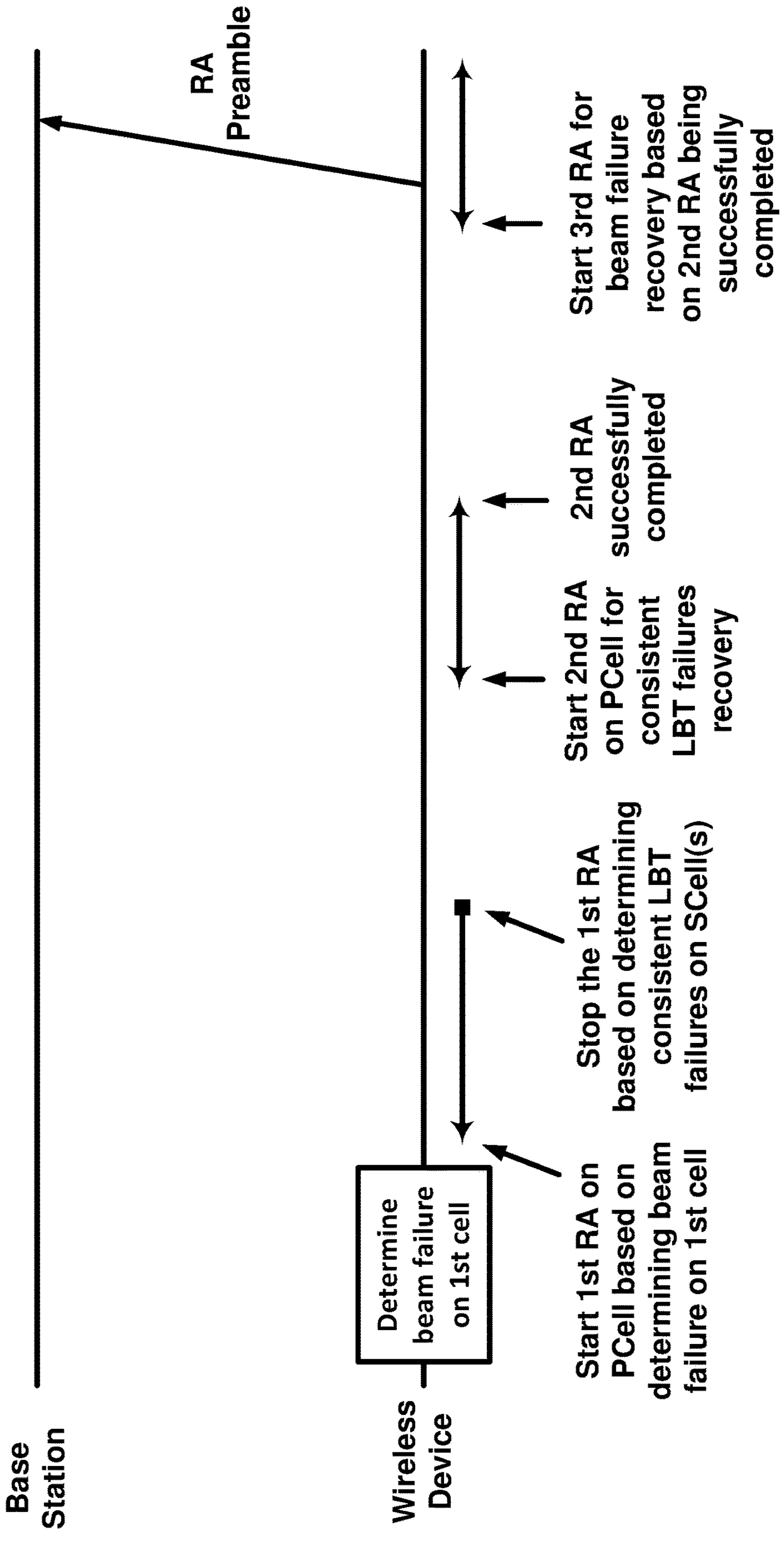
FIG. 30 shows an example process in accordance with several of various embodiments of the present disclosure.

In an example embodiment as shown in FIG. 30, based on the determining the consistent LBT failures on the one or more secondary cells, the wireless device may stop the first random access process for beam failure recovery. The stopping the first random access process may comprise stopping transmission of a random access preamble or Msg A (e.g., in case of two-step random access) and/or stopping monitoring a random access response. The wireless device may start a second random access process for consistent LBT failures recovery based on stopping the first random access process. The wireless device may start the second random access process after the stopping the first random access process. The starting the second random access process may comprise transmission of a random access preamble or a Msg A (e.g., for a two-step random access process). The second random access process may be successfully completed based on reception of a random access response or a Msg 4/Msg B indicating successful completion of the second random access process. The wireless device may start a third random access process for beam failure recovery based on the second random access process for consistent LBT failures being successfully completed.

Figure 32:
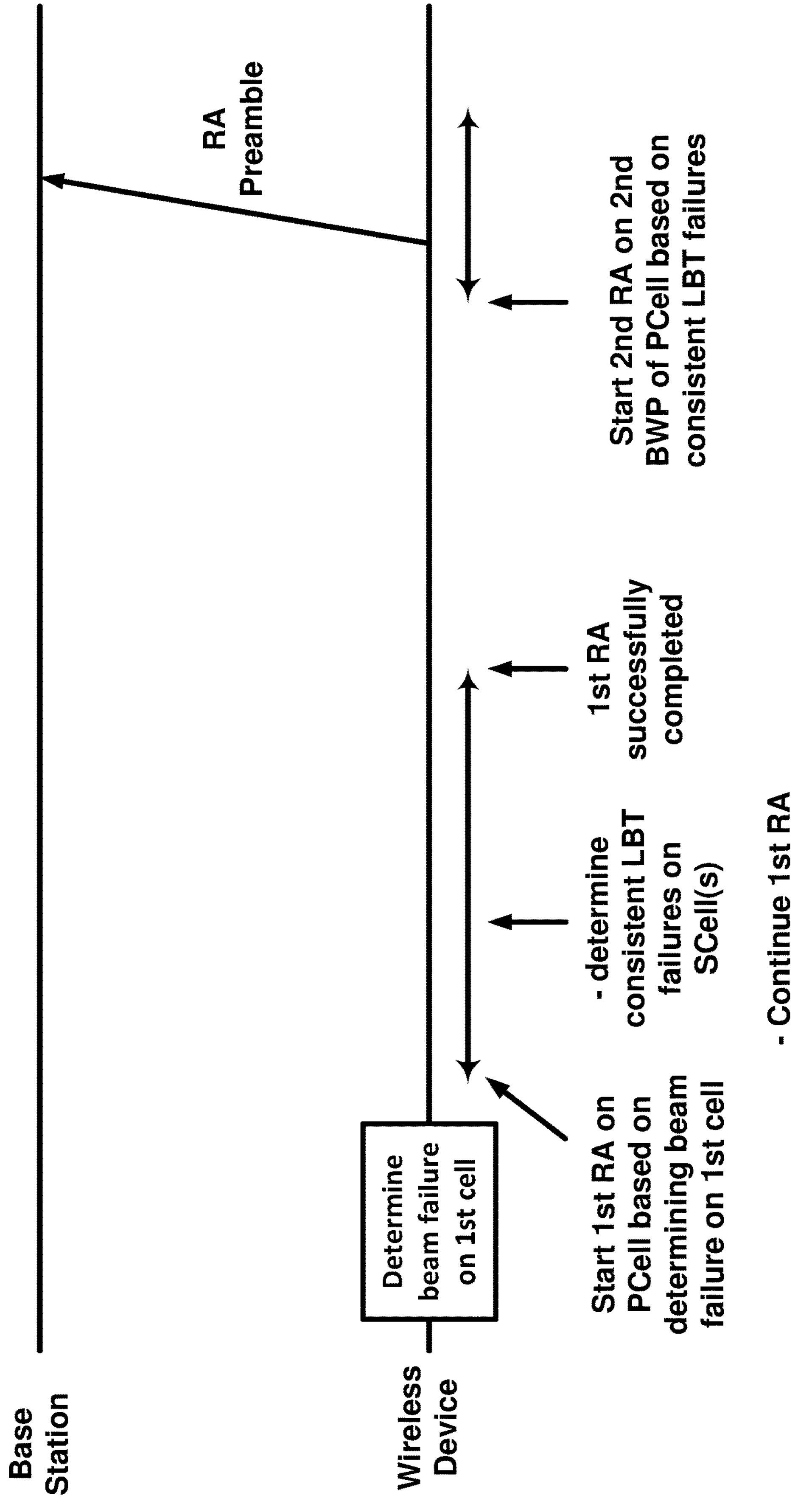
FIG. 32 shows an example process in accordance with several of various embodiments of the present disclosure.

In an example embodiment as show in FIG. 32, based on the determining the consistent LBT failures on the one or more secondary cells, the wireless device may continue the first random access process for beam failure recovery. The first random access may be successfully completed. The successful completion of the first random access may be based on reception of a random access response or a Msg B/Msg 4 indicating successful completion of the first random access process. The wireless device may start a second random access process for consistent LBT failures recovery based on the successful completion of the first random access process. The wireless device may start the second random access process for consistent LBT failures recovery by transmission of a random access preamble or a Msg A (e.g. in case of a two-step random access process) via a RACH occasion of the primary cell after the successful completion of the first random access process, e.g., after reception of the RAR or Msg 4/Msg B associated with the first random access process indicating the successful completion of the first random access process.

In an example, the wireless device may trigger LBT failure indication based on the determining the consistent LBT failures on the one or more secondary cells. The wireless device may have no uplink resources for transmission of an LBT failure indication MAC CE. The wireless device may not be configured with a scheduling request configuration/resources for consistent LBT failure recovery. The starting the second random access process on the primary cell may be based on the triggering the LBT failure indication, no uplink resources being available for transmission of an LBT failures indication MAC CE and no scheduling request resource/configuration for consistent LBT failures being configured for the wireless device.

In an example, the wireless device may trigger LBT failure indication based on the determining the consistent LBT failures on the one or more secondary cells. The wireless device may have no uplink resources for transmission of an LBT failure indication MAC CE. The wireless device may be configured with a scheduling request configuration for consistent LBT failures recovery. The wireless device may trigger scheduling request based on no uplink resources being available for transmission of the LBT failure indication MAC CE. The wireless device may transmit scheduling request signals (e.g., based on the scheduling request configuration for consistent LBT failures recovery) and, in response to the transmitted scheduling request signals, may not receive an uplink grant useful for transmission of the LBT failure indication MAC CE. The starting the second random access process may be based on transmitting scheduling request signals (e.g., for a maximum count of scheduling request transmissions) for consistent LBT failures recovery and not receiving an uplink grant for transmission of a the LBT failure indication MAC CE. The wireless device may receive a configuration parameter that indicates the maximum count of SR transmissions before starting the second random access process.

Figure 33:
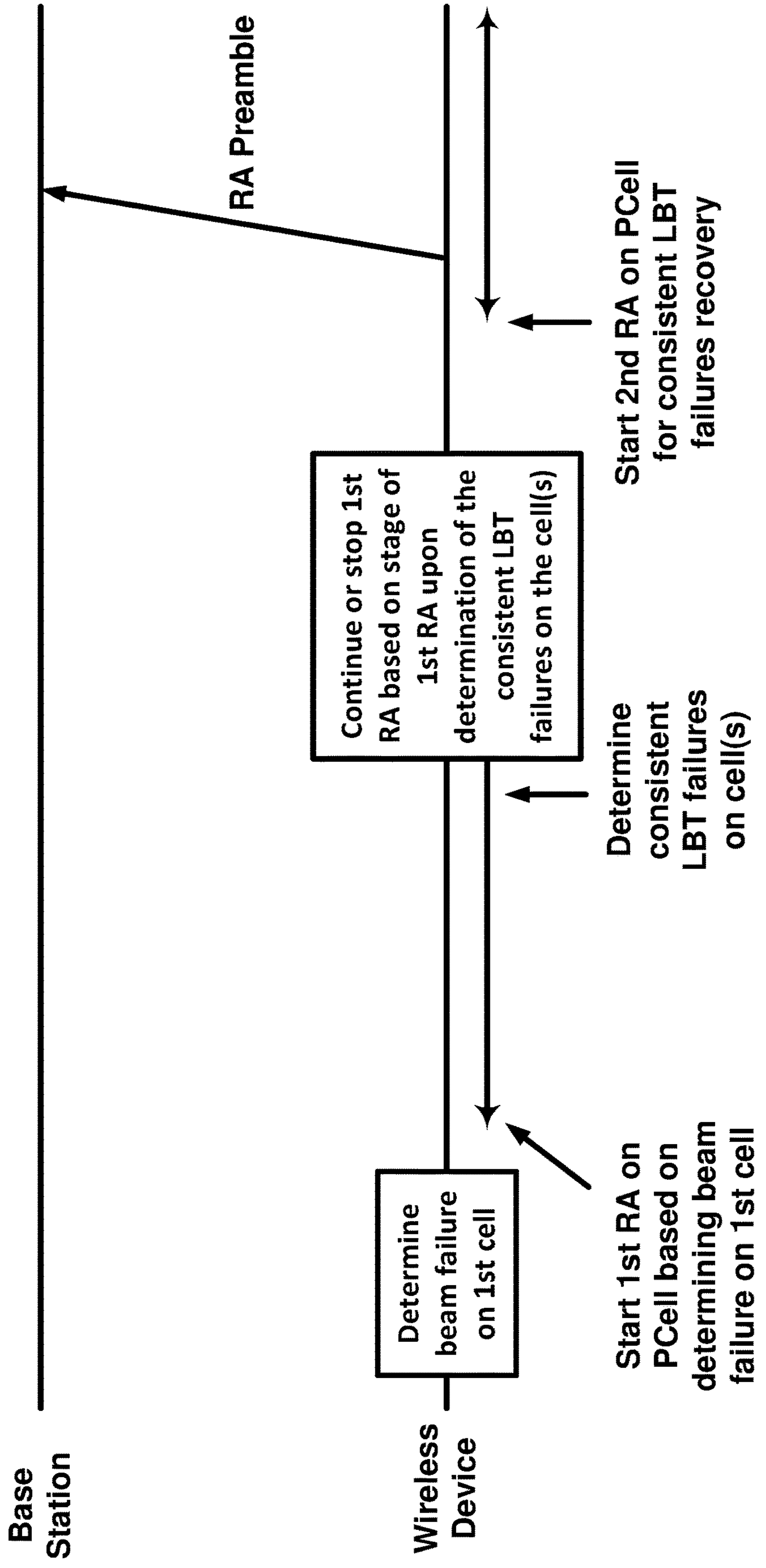
FIG. 33 shows an example process in accordance with several of various embodiments of the present disclosure.

In an example embodiment as shown in FIG. 33, based on the determining the consistent LBT failures on the one or more cells, the wireless device may continue or stop the first random access process (for beam failure recovery) on the primary cell based on a stage of the random access process, for example depending on whether a RAR has been received from the base station or depending on whether a Msg 1/Msg A/Msg 3 has been transmitted, etc. For example, the wireless device may continue the first random access process (for beam failure recovery) if the wireless device has transmitted the random access preamble or Msg A and determines the consistent LBT failures on the one or more cells after transmitting the random access preamble or Msg A. The wireless device may stop the first random access (for beam failure recovery) if the wireless device has not transmitted the random access preamble or Msg A and determines the consistent LBT failures on the one or more cells before transmission of the random access preamble or Msg A. For example, the wireless device may continue the first random access process (for beam failure recovery) if the wireless device has transmitted the Msg 3 and determines the consistent LBT failures on the one or more cells after transmitting the Msg 3. The wireless device may stop the first random access (for beam failure recovery) if the wireless device has not transmitted the Msg 3 and determines the consistent LBT failures on the one or more cells before transmission of the Msg 3.

In an example, the determining the beam failure on the first cell may be based on a beam failure instance counter/variable reaching a first value. The first value may be a beam failure instance max count value. The wireless device may receive a configuration parameter indicating the beam failure instance max count value. The wireless device may increment the beam failure instance counter/variable (e.g., BFI_COUNTER) based on receiving one or more indications/notifications of a beam failure instances from physical layer. In an example, the determining the beam failure indication on the first cell may be based on starting a beam failure detection timer based on receiving one or more notifications/indications of beam failure instances from physical layer. The wireless device may reset (e.g., reset to zero) the beam failure instance counter/variable based on the beam failure detection timer expiring.

In an example, the first random access process may be one of a two-step random access process and a four-step random access process. The second random access process may be one of a two-step random access process and four-step random access process. A two-step random access process may comprise two messages exchanged between the wireless device and the bae station (e.g., Msg A and Msg B) and a four-step random access process may comprise four messages exchanged between the wireless device and the base station (e.g., Msg 1/preamble, Msg 2/RAR, Msg 3 and Msg 4). In an example, the configuration parameters may indicate whether the wireless device may start a two-step or a four-step random access process for consistent LBT failure recovery. In an example, the configuration parameters may indicate whether the wireless device may start a two-step or a four-step random access process for beam failure recovery. In an example, the wireless device may receive configuration parameters indicating one or more first random access parameters (e.g., one or first threshold values, one or more first prioritization parameters, one or more first power parameters (e.g., power ramping parameter) for calculating a preamble power, etc.) for a random access process for consistent LBT failure recovery. In an example, the wireless device may receive configuration parameters indicating one or more second random access parameters (e.g., one or second threshold values, one or more second prioritization parameters, one or more first power parameters (e.g., power ramping parameter) for calculating a preamble power, etc.) for a random access process for beam failure recovery.

In an example embodiment, a wireless device may start a first random access process on a primary cell based on determining consistent LBT failures on one or more cells. The wireless device may transmit a random access preamble based on determining the consistent LBT failure on one or more cells and starting the first random access process. In an example, the wireless device may transmit a Msg A based on determining consistent LBT failure on one or more cells and starting the first random access process (e.g., with two-step random access). The wireless device may determine a beam failure on a first cell. Based on the determining the beam failure: the wireless device may stop the first random access process; and the wireless device may start a second random access process on the primary cell for beam failure recovery. The wireless device may start the second random access process after stopping the first random access process.

In an example embodiment, a wireless device may start a first random access process on a primary cell based on determining consistent LBT failures on one or more cells. The wireless device may transmit a random access preamble based on determining the consistent LBT failure on one or more cells and starting the first random access process. In an example, the wireless device may transmit a Msg A based on determining the consistent LBT failure on one or more cells and starting the first random access process (e.g., with two-step random access). The wireless device may determine a beam failure on a first cell. Based on the determining the beam failure on the first cell: the wireless device may continue the first random access process; and the wireless device may start a second random access process on the primary cell for beam failures recovery based on the first random access being successfully completed.

In an example, the one or more cells may with consistent LBT failures comprise the primary cell. In an example, the starting the first random access process on the primary cell may be based on the one or more cells with consistent LBT failures compromising the primary cell. In an example, based on the one or more cells with consistent LBT failures comprising the primary cell, the wireless device may switch from a first bandwidth part of the primary cell to a second bandwidth part of the primary cell and may start the first random access process on the second bandwidth part of the primary cell.

In an example, the wireless device may trigger an LBT failure indication due to determining the consistent LBT failures on the one or more cells. The wireless device may have no uplink resources being available for transmission of a consistent LBT failure indication MAC CE. In an example, no scheduling request resource for consistent LBT failure recovery may be configured for the wireless device. The wireless device may start the first random access process based on no scheduling request resource for consistent LBT failure recovery being configured for the wireless device.

In an example, the wireless device may trigger an LBT failure indication due to determining the consistent LBT failures on the one or more cells. The wireless device may have no uplink resources being available for transmission of a consistent LBT failure MAC CE. The wireless device may trigger scheduling request based on no uplink resources being available for transmission of a consistent LBT failure MAC CE. In an example, the wireless device may start the first random access process based on: transmitting scheduling request signals for consistent LBT failures recovery; and not receiving an uplink grant for transmission of a consistent LBT indication MAC CE.

In an example, the wireless device may start a third random access process on the primary cell for consistent LBT failure recovery based on the second random access process for beam failure recovery being successfully completed. The third random access process may be one of a two-step random access process or a four-step random access process.

In an example, the first cell with beam failure may be a primary cell. The wireless may start the second random access on the primary cell based on the first cell with beam failure being the primary cell.

In an example, the first cell with beam failure may be a secondary cell. The wireless device may trigger a beam failure recovery MAC CE based on the first cell with beam failure being a secondary cell. The wireless device may have no uplink resources available for transmission of the beam failure recovery MAC CE. The starting the second random access on the primary cell may be based on no scheduling request resource for beam failure recovery being configured for the wireless device.

In an example, the first cell with beam failure may be a secondary cell. The wireless device may trigger a beam failure recovery MAC CE based on the first cell with beam failure being a secondary cell. The wireless device may have no uplink resources available for transmission of the beam failure recovery MAC CE. The wireless device may trigger scheduling request and may transmit a plurality of scheduling request signals for beam failure recovery. The wireless device may not receive an uplink grant for transmission of a beam failure recovery MAC CE. The starting the second random access on the primary cell may be based on not receiving an uplink grant for transmission of a beam failure recovery MAC CE.

In an example embodiment, a wireless device may start a first random access process on a primary cell based on determining a beam failure on a first cell. The wireless device may transmit a random access preamble based on determining the beam failure on the first cell and starting the first random access process. In an example, the wireless device may transmit a Msg A based on determining the beam failure on the first cell and starting the random access process (e.g., with two-step random access). The wireless device may determine consistent LBT failures on one or more cells comprising the primary cell. Based on the determining: the wireless device may stop the first random access process; the wireless device may switch from the first bandwidth part of the primary cell to a second bandwidth part of the primary cell; and the wireless device may start a second random access process for beam failure recovery.

In an example, the wireless device may start a third random access on the primary cell for consistent LBT failure recovery based on the second random access process being successfully completed. In an example, the starting the third random access process on the primary cell may be based on the one or more cells with consistent LBT failures comprising the primary cell. In an example, the wireless device may start the third random access on the second bandwidth part of the primary cell. The third random access process may be a two-step random access or a four-step random access.

In an example, the switching from the first bandwidth part of the primary cell to the second bandwidth part of the primary cell may be based on the one or more cells with consistent LBT failures comprising the primary cell.

In an example, the first cell with beam failure may be a primary cell. The wireless may start the first random access on the primary cell based on the first cell with beam failure being the primary cell.

In an example, the first cell with beam failure may be a secondary cell. The wireless device may trigger a beam failure recovery MAC CE based on the first cell with beam failure being a secondary cell. The wireless device may have no uplink resources available for transmission of the beam failure recovery MAC CE. The starting the first random access on the primary cell may be based on no scheduling request resource for beam failure recovery being configured for the wireless device.

In an example, the first cell with beam failure may be a secondary cell. The wireless device may trigger a beam failure recovery MAC CE based on the first cell with beam failure being a secondary cell. The wireless device may have no uplink resources available for transmission of the beam failure recovery MAC CE. The wireless device may trigger scheduling request and may transmit a plurality of scheduling request signals for beam failure recovery. The wireless device may not receive an uplink grant for transmission of a beam failure recovery MAC CE. The starting the first random access on the primary cell may be based on not receiving an uplink grant for transmission of a beam failure recovery MAC CE.

In an example embodiment, a wireless device may start a first random access process on a primary cell based on determining a beam failure on a first cell. The wireless device may transmit a random access preamble based on determining the beam failure on the first cell and starting the first random access process. In an example, the wireless device may transmit a Msg A based on determining the beam failure on the first cell and starting the random access process (e.g., with two-step random access). The wireless device may determine consistent LBT failures on one or more secondary cells. Based on the determining: the wireless device may continue the first random access process; and the wireless device may start a second random access process for consistent LBT failures recovery based on the first random access process being successfully completed.

In an example, the wireless device may trigger consistent LBT failure indication. The wireless device may have no uplink resources available for transmission of a consistent LBT failure indication MAC CE. In an example, the starting the second random access process may be based on no scheduling request resource for consistent LBT failures recovery being configured for the wireless device.

In an example, the wireless device may trigger consistent LBT failure indication. The wireless device may have no uplink resources available for transmission of a consistent LBT failure indication MAC CE. The wireless device may trigger scheduling request based on no uplink resources being available for transmission of a consistent LBT failure indication MAC CE. The wireless device may start the second random access process based on transmitting scheduling request signals for consistent LBT failures recovery; and not receiving an uplink grant for transmission of a consistent LBT failure indication MAC CE.

In an example, the first cell with beam failure may be a primary cell. The wireless may start the first random access on the primary cell based on the first cell with beam failure being the primary cell.

In an example, the first cell with beam failure may be a secondary cell. The wireless device may trigger a beam failure recovery MAC CE based on the first cell with beam failure being a secondary cell. The wireless device may have no uplink resources available for transmission of the beam failure recovery MAC CE. The starting the first random access on the primary cell may be based on no scheduling request resource for beam failure recovery being configured for the wireless device.

In an example, the first cell with beam failure may be a secondary cell. The wireless device may trigger a beam failure recovery MAC CE based on the first cell with beam failure being a secondary cell. The wireless device may have no uplink resources available for transmission of the beam failure recovery MAC CE. The wireless device may trigger scheduling request and may transmit a plurality of scheduling request signals for beam failure recovery. The wireless device may not receive an uplink grant for transmission of a beam failure recovery MAC CE. The starting the first random access on the primary cell may be based on not receiving an uplink grant for transmission of a beam failure recovery MAC CE.

In an example embodiment, a wireless device may start a first random access process on a primary cell for beam failure recovery based on determining a beam failure on a first cell. The wireless device may transmit a random access preamble based on determining the beam failure on the first cell and starting the first random access process. In an example, the wireless device may transmit a Msg A based on determining the beam failure on the first cell and starting the random access process (e.g., with two-step random access). The wireless device may determine consistent LBT failures on one or more cells comprising the primary cell. Based on the determining: the wireless device may stop the first random access process; the wireless device may switch from a first bandwidth part of the primary cell to a second bandwidth part of the primary cell; the wireless device may start a second random access process, for consistent LBT failures recovery, on the second bandwidth part; and the wireless device may start a third random access process for beam failure recovery based on the second random access process being successfully completed.

In an example, the switching from the first bandwidth part of the primary cell to the second bandwidth part of the primary cell may be based on the one or more cells with consistent LBT failures comprising the primary cell. In an example, the starting the second random access process on the primary cell may be based on the one or more cells with consistent LBT failures comprising the primary cell.

In an example, the starting the third random access process may be on the second bandwidth part of the primary cell. In an example, the third random access may be one of a two-step random access and a four-step random access.

In an example, the first cell with beam failure may be a primary cell. The wireless may start the first random access on the primary cell based on the first cell with beam failure being the primary cell.

In an example, the first cell with beam failure may be a secondary cell. The wireless device may trigger a beam failure recovery MAC CE based on the first cell with beam failure being a secondary cell. The wireless device may have no uplink resources available for transmission of the beam failure recovery MAC CE. The starting the first random access on the primary cell may be based on no scheduling request resource for beam failure recovery being configured for the wireless device.

In an example, the first cell with beam failure may be a secondary cell. The wireless device may trigger a beam failure recovery MAC CE based on the first cell with beam failure being a secondary cell. The wireless device may have no uplink resources available for transmission of the beam failure recovery MAC CE. The wireless device may trigger scheduling request and may transmit a plurality of scheduling request signals for beam failure recovery. The wireless device may not receive an uplink grant for transmission of a beam failure recovery MAC CE. The starting the first random access on the primary cell may be based on not receiving an uplink grant for transmission of a beam failure recovery MAC CE.

In an example embodiment, a wireless device may start a first random access process on a primary cell for beam failure recovery based on determining a beam failure on a first cell. The wireless device may transmit a random access preamble based on determining the beam failure on the first cell and starting the first random access process. In an example, the wireless device may transmit a Msg A based on determining the beam failure on the first cell and starting the random access process (e.g., with two-step random access). The wireless device may determine consistent LBT failures on one or more secondary cells. Based on the determining: the wireless device may stop the first random access process; the wireless device may start a second random access process for consistent LBT failures recovery; and the wireless device may start a third random access process, for consistent LBT failures recovery, based on the second random access process being successfully completed.

In an example, the wireless device may trigger an LBT failure indication based on the consistent LBT failures on the one or more secondary cells. The wireless device may be configured with no uplink resources for transmission of an LBT failures indication MAC CE. In an example, the starting the second random access process may be based on no scheduling request resource for consistent LBT failures recovery being configured for the wireless device.

In an example, the wireless device may trigger an LBT failure indication based on the consistent LBT failures on the one or more secondary cells. The wireless device may be configured with no uplink resources for transmission of an LBT failures indication MAC CE. The wireless device may trigger scheduling request. In an example, the starting the second random access process may be based on transmitting scheduling request signals for consistent LBT failures recovery; and not receiving an uplink grant for transmission of a consistent LBT failure indication MAC CE.

In an example, the first cell with beam failure may be a primary cell. The wireless may start the first random access on the primary cell based on the first cell with beam failure being the primary cell.

In an example, the first cell with beam failure may be a secondary cell. The wireless device may trigger a beam failure recovery MAC CE based on the first cell with beam failure being a secondary cell. The wireless device may have no uplink resources available for transmission of the beam failure recovery MAC CE. The starting the first random access on the primary cell may be based on no scheduling request resource for beam failure recovery being configured for the wireless device.

In an example, the first cell with beam failure may be a secondary cell. The wireless device may trigger a beam failure recovery MAC CE based on the first cell with beam failure being a secondary cell. The wireless device may have no uplink resources available for transmission of the beam failure recovery MAC CE. The wireless device may trigger scheduling request and may transmit a plurality of scheduling request signals for beam failure recovery. The wireless device may not receive an uplink grant for transmission of a beam failure recovery MAC CE. The starting the first random access on the primary cell may be based on not receiving an uplink grant for transmission of a beam failure recovery MAC CE.

In an example embodiment, a wireless device may start a first random access process on a primary cell for beam failure recovery based on determining a beam failure on a first cell. The wireless device may transmit a random access preamble based on determining the beam failure on the first cell and starting the first random access process. In an example, the wireless device may transmit a Msg A based on determining the beam failure on the first cell and starting the random access process (e.g., with two-step random access). The wireless device may determine consistent LBT failures on one or more cells comprising a primary cell. Based on the determining the consistent LBT failures: the wireless device may continue the first random access process; the wireless device may switch from a first bandwidth part of the primary cell to a second bandwidth part of the primary cell based on the first random access process being successfully completed; and the wireless device may start a second random access process for consistent LBT failures recovery on the second bandwidth part.

In an example embodiment, a wireless device may start a first random access process on a primary cell for beam failure recovery based on determining a beam failure on a first cell. The wireless device may transmit a random access preamble based on determining the beam failure on the first cell and starting the first random access process. In an example, the wireless device may transmit a Msg A based on determining the beam failure on the first cell and starting the random access process (e.g., with two-step random access). The wireless device may determine consistent LBT failures on one or more secondary cells. Based on the determining the consistent LBT failures: the wireless device may continue the first random access process; and the wireless device may start a second random access process for consistent LBT failures recovery based on the first random access process being successfully completed.

In an example, the determining the beam failure on the first cell may be based on a beam failure detection counter reaching a first value. In an example, the determining the beam failure on the first cell may comprise incrementing a beam failure detection counter based on one or more notifications of beam failure instances from physical layer. In an example, the determining the beam failure on the first cell may comprise starting a beam failure detection timer based on one or more notifications of beam failure instances from physical layer. In an example, the determining the beam failure on the first cell may comprise comprises resetting a beam failure detection counter (e.g., resetting to zero) based on a beam failure detection timer expiring.

In an example, the first random access process may be one of a two-step random access or a four-step random access process; and the second random access process may be one of a two-step random access or a four-step random access process.

In an example, the wireless device may receive configuration parameters comprising: random access configuration parameters; beam failure detection and recovery configuration parameters; and consistent LBT failure detection and recovery configuration parameters. The random access configuration parameters may comprise one or more parameters indicating random access occasions on one or more bandwidth parts of the primary cell. The beam failure detection and recovery configuration parameters may comprise one or more second parameters (e.g., one or more counter and/or timer values) for detection of a beam failure based on a beam failure detection process and for recovery based on a beam failure recovery process. The consistent LBT failure detection and recovery configuration parameters may comprise one or more third parameters (e.g., one or more counter and/or timer values) for detection of consistent LBT failures on a cell based on a consistent LBT failures detection process and for recovery based on a consistent LBT failures recovery process.

Existing procedures for recovery from consistent listen before talk on a primary cell or recovery from beam failure on a primary cell may be based on initiation of a random access process. The existing procedures may not take into account the ongoing random access process processes when the recovery procedure is initiated and may lead to wireless device and network performance degradation, for example due to increased latency or inefficiency or failure of the recovery procedures. There is a need to enhance the existing consistent LBT failure recovery and/or beam failure recovery procedures. Example embodiments enhance the existing consistent LBT failure and/or beam failure recovery procedures.

In an example embodiment, a wireless device may receive one or more messages (e.g., one or more RRC messages) comprising configuration parameters. The configuration parameters may comprise serving cell configuration parameters of one or more cells. The one or more cells may comprise a primary cell. In an example, the one or more cells may comprise a primary cell and one or more secondary cells. In an example, the one or more cells may comprise an unlicensed cell or a cell that operates in unlicensed spectrum or shared spectrum. In an example, the primary cell may be an unlicensed cell or a cell that operates in unlicensed spectrum or shared spectrum. The uplink and/or downlink transmissions on a cell that operates in the unlicensed or shared spectrum may be based on a listen-before-talk (LBT) procedure, for the uplink and/or the downlink transmission, indicating that the channel is available for transmission. In an example, the one or more cells may be provided by one or more base stations, e.g., using a single-connectivity architecture or multi-connectivity architecture. In an example, a cell (e.g., the primary cell) in the one or more cells may operate using beamforming, for example, the cell may be associated with multiple beams. The configuration parameters may comprise first configuration parameters for beam failure recovery and second configuration parameters for LBT failure recovery. The wireless device may detect/determine/trigger and recover from beam failure based on the configuration parameters for beam failure recovery. The wireless device may detect/determine/trigger and recover from consistent LBT failure based on the configuration parameters for LBT failure recovery.

The configuration parameters for beam failure recovery may be based on a BeamFailureRecoveryConfig information element (IE) and/or a RadioLinkMonitoringConfig IE. The BeamFailureRecoveryConfig IE may be used to configure the UE with RACH resources and candidate beams for beam failure recovery in case of beam failure detection. The BeamFailureRecoveryConfig IE may comprise a plurality of fields/parameters. A beamFailureRecoveryTimer field may indicate a timer for beam failure recovery timer. Upon expiration of the timer the UE may not use CFRA for beam failure recovery (BFR). A candidateBeamRSList field may indicate the list of reference signals (e.g., CSI-RS and/or SSB) identifying the candidate beams for recovery and the associated random access parameters. A msg1-SubcarrierSpacing field may indicate a subcarrier spacing for contention free beam failure recovery. A rsrp-Threshold-SSB field may indicate a L1-RSRP threshold used for determining whether a candidate beam may be used by the UE to attempt contention free random access to recover from beam failure. A ra-prioritization field may indicate parameters which may apply for prioritized random access procedure for BFR. A ra-PrioritizationTwoStep field may indicate parameters which may apply for prioritized 2-step random access procedure for BFR. A ra-ssb-OccasionMaskIndex field may indicate an explicitly signaled PRACH Mask Index for RA Resource selection. A rach-ConfigBFR field may indicate configuration of contention free random access occasions for BFR. A recoverySearchSpaceId field may indicate search space to use for BFR RAR, e.g., for reception of random access response (RAR) in random access process initiated for beam failure recovery. The network may configure this search space to be within the linked DL BWP (e.g., within the DL BWP with the same bwp-Id) of the UL BWP in which the BeamFailureRecoveryConfig is provided. In an example, the CORESET associated with the recovery search space may not be associated with another search space. The network may configure the UE with a value for this field when contention free random access resources for BFR are configured. A rootSequenceIndex-BFR field may indicate PRACH root sequence index for beam failure recovery. A ssb-perRACH-Occasion field may indicate a number of SSBs per RACH occasion for CF-BFR.

A RadioLinkMonitoringConfig IE may be used to configure radio link monitoring for detection of beam- and/or cell radio link failure. The RadioLinkMonitoringConfig IE may comprise a plurality of field. A beamFailureDetectionTimer field may indicate a timer for beam failure detection. A beamFailureInstanceMaxCount field may be used to determine after how many beam failure events the UE may trigger beam failure recovery. A failureDetectionResourcesToAddModList field may indicate a list of reference signals for detecting beam failure and/or cell level radio link failure (RLF).

The configuration parameters for LBT failure recovery may be based on an LBT-FailureRecoveryConfig IE. The LBT-FailureRecoveryConfig IE may be used to configure the parameters used for detection of consistent uplink LBT failures for operation with shared spectrum channel access.

The LBT-FailureRecoveryConfig IE may comprise a plurality of parameters/fields. An lbt-FailureDetectionTimer field may indicate a timer for consistent uplink LBT failure detection. An lbt-FailureInstanceMaxCount field may determine after how many consistent uplink LBT failure events the UE may trigger uplink LBT failure recovery.

Figure 34:
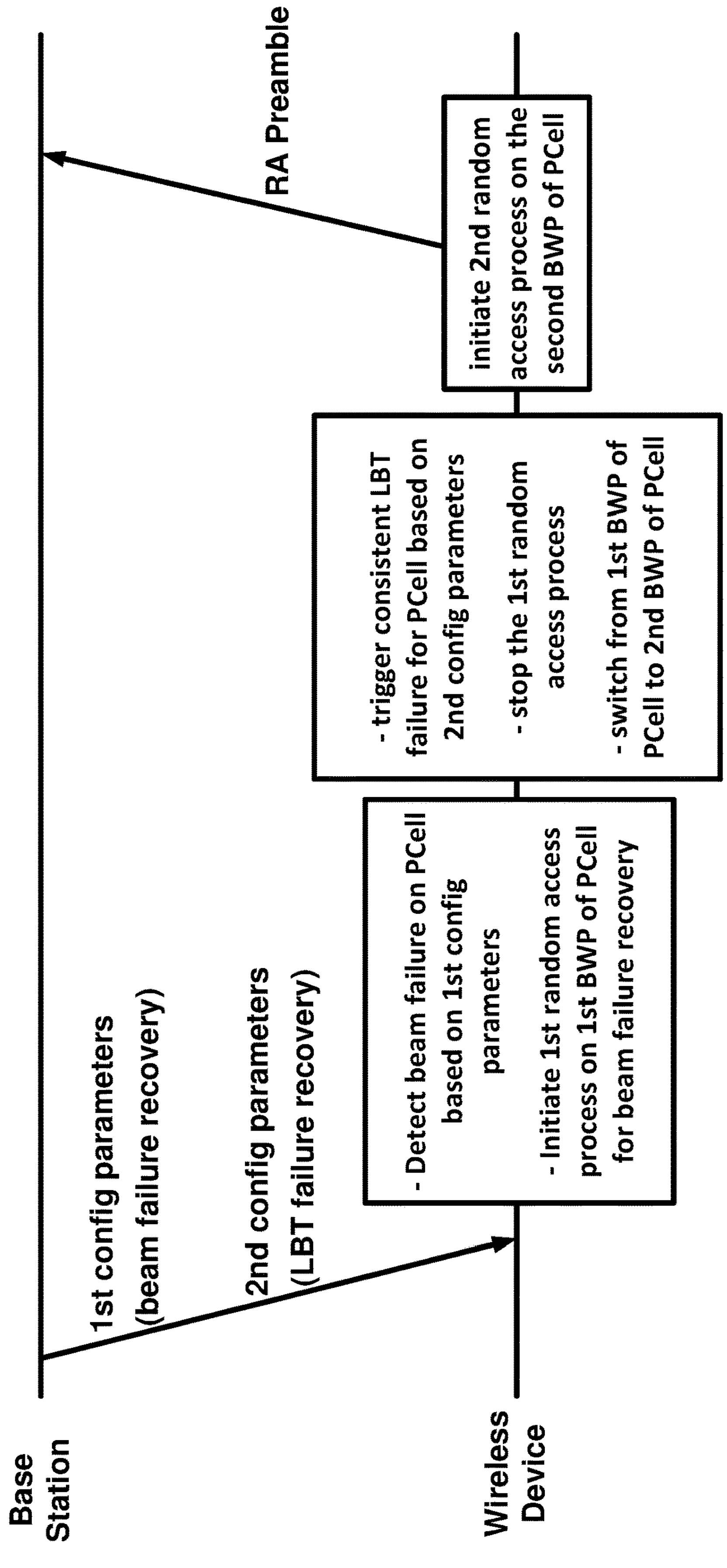
FIG. 34 shows an example process in accordance with several of various embodiments of the present disclosure.

In an example embodiment as shown in FIG. 34, the wireless device may detect a beam failure on a primary cell of the wireless device. The first configuration for beam failure recovery may comprise a first parameter (e.g., beamFailureInstanceMaxCount) indicating a first number of beam failure instances that triggers beam failure recovery. The detection of the beam failure may be based on a beam failure instance indication counter reaching the first number. In an example, the wireless device may increment the beam failure instance indication counter by one based on a beam failure indication, for example reception of the beam failure indication by a MAC layer of the wireless device from a physical layer of the wireless device. The wireless device may start or restart a beam failure detection timer in response to the beam failure indication, e.g., reception of the beam failure indication by the MAC layer from the physical layer. The wireless device may set the beam failure instance indication counter to zero (e.g., reset the beam failure instance indication counter) based on the beam failure detection timer expiring. In response to the detection of the beam failure on the primary cell, the wireless device may initiate a first random access process on a first BWP of the primary cell. The first BWP of the primary cell may be the current active BWP (e.g., the active BWP of the primary cell when the wireless device detects the beam failure on the primary cell) of the primary cell. The wireless device may initiate the first random access process on the first BWP of the primary cell for beam failure recovery.

The wireless device may trigger consistent LBT failure for the primary cell. The wireless device may trigger the consistent LBT failure for the primary cell while the first random access process for beam failure recovery is ongoing on the primary cell. The triggering of the consistent LBT failure may be for the first BWP of the primary cell and/or based on failure of LBT procedures for uplink transmissions on the first BWP of the primary cell. The second configuration for LBT failure recovery may comprise a first parameter (e.g., FailureInstanceMaxCount) indicating a first number of LBT failure instances that triggers LBT failure recovery. The triggering of the consistent LBT failure may be based on an LBT failure indication counter reaching the first number. In an example, the wireless device may increment the LBT failure indication counter by one based on an LBT failure indication, for example reception of the LBT failure indication by a MAC layer of the wireless device from a physical layer of the wireless device. The wireless device may start or restart an LBT failure detection timer in response to the LBT failure indication, e.g., reception of the LBT failure indication by the MAC layer from the physical layer. The wireless device may set the LBT failure indication counter to zero (e.g., may reset the LBT failure indication counter) based on the LBT failure detection timer expiring.

In response to the triggering of the consistent LBT failure for the primary cell, the wireless device may stop the first random access procedure, for beam failure recovery, on the primary cell (the first BWP of the primary cell). In an example, stopping the first random access process may comprise resetting counter(s) and/or timer(s) and/or variable (s) associated with the first random access process. The wireless device may switch from the first BWP of the primary cell to a second BWP of the primary cell. In an example, the one or more messages may comprise bandwidth part configuration parameters of a plurality of BWPs, comprising the first BWP and the second BWP, of the primary cell. The bandwidth part configuration parameters of the second BWP of the primary cell may comprise random access parameters for the second BWP of the primary cell, indicating that the second BWP of the primary cell is configured with random access occasions/resources. The switching, by the wireless device, from the first BWP of the primary cell to the second BWP of the primary cell may be based on the second BWP of the primary cell being configured with random access resources/occasion. In an example, one or more BWPs of the primary cell may be configured with random access resources/occasions and the selection of the second BWP, in the one or more BWPs, for switching from the first BWP, may be based on one or more criteria. The wireless device may initiate a second random access process on the second BWP of the primary cell. The wireless device may initiate the second random access process in the second BWP of primary cell based on the random access parameters configured for the second BWP of the primary cell and using the random access occasions/resources configured for the second BWP of the primary cell.

In an example, the second random access process, on the second BWP of the primary cell, may be for consistent LBT failure recovery. The wireless device may initiate a third random access process on the second BWP of the primary cell, for beam failure recovery, after completion (e.g., successful completion) of the second random access process for consistent LBT failure recovery. The second random access process, for consistent LBT failure recovery, may be based on random access process configuration parameters. The random access process configuration parameters, used for consistent LBT failure recovery, may be commonly configured for different random access processes not including random access processes performed for beam failure recovery. In an example, the random access parameters for beam failure recovery may be separately configured. For example, the first configuration parameters, for beam failure recovery, may comprise first random access parameters. The one or more messages, received by the wireless device, may comprise second random access process different from the first random access parameters. The first random access process, for beam failure recovery may be based on the first random access parameters and the second random access process for consistent LBT failure may be based on the second random access parameters. For example, the first random access parameters, for beam failure recovery, may indicate random access resources/occasions to be used for a random access process that is initiated for beam failure recovery. For example, the first random access parameters, for beam failure recovery, may indicate a random access response window for beam failure recovery, a first number of preamble transmissions before declaring a random access failure for beam failure recovery, a power ramping step for a beam failure recovery random access process, a configuration index for beam failure recovery, etc. The second random access process, for consistent LBT failure recovery, may comprise transmitting a transport block (TB), e.g., via a Msg3 message (in a four-step random access process) or a MsgA message (in a two-step random access process). The TB may comprise an LBT failure MAC CE. The LBT failure MAC CE may have one of a short format (one octet) and long format (four octets) depending on highest ServingCellIndex of the serving cells configured for the wireless device (e.g., the one-octet format when the highest ServingCellIndex is less than eight and the four-octet format otherwise). The LBT failure MAC CE may indicate for which serving cell(s) the consistent LBT failure is triggered. The wireless device may multiplex the LBT failure MAC CE with other logical channel(s) and/or MAC CE(s) in the TB. The multiplexing of the LBT failure MAC CE with other logical channel(s) and/or MAC CE(s) may be based on a logical channel prioritization procedure. The logical channel prioritization procedure may utilize the priorities of logical channel(s) and MAC CE(s). For the purpose of the logical channel prioritization procedure, the priority of the LBT failure MAC CE may be higher than the priorities of data from any logical channel except uplink common control channel (UL-CCCH) logical channel.

In an example, the second random access process, on the second BWP of the primary cell, may be for beam failure recovery. The wireless device may initiate a third random access process on the second BWP of the primary cell, for consistent LBT failure recovery, after completion (e.g., successful completion) of the second random access process for beam failure recovery. The second random access process, for beam failure recovery, may be based on random access process configuration parameters configured for beam failure recovery. The second random access process may comprise transmitting a transport block (TB), e.g., via a Msg3 message (in a four-step random access process) or a MsgA message (in a two-step random access process). The TB may comprise a beam failure recovery (BFR) MAC CE. The BFR MAC CE may have one of a short format (one octet) and long format (four octets) depending on highest ServingCellIndex of the serving cells configured for the wireless device (e.g., the one-octet format when the highest ServingCellIndex is less than eight and the four-octet format otherwise). The BFR MAC CE may indicate on which serving cell(s) the beam failure is detected. The wireless device may multiplex the BFR MAC CE with other logical channel(s) and/or MAC CE(s) in the TB. The multiplexing of the BFR MAC CE with other logical channel(s) and/or MAC CE(s) may be based on a logical channel prioritization procedure. The logical channel prioritization procedure may utilize the priorities of logical channel(s) and MAC CE(s). For the purpose of the logical channel prioritization procedure, the priority of the BFR MAC CE may be higher than the priorities of data from any logical channel except uplink common control channel (UL-CCCH) logical channel.

Figure 35:
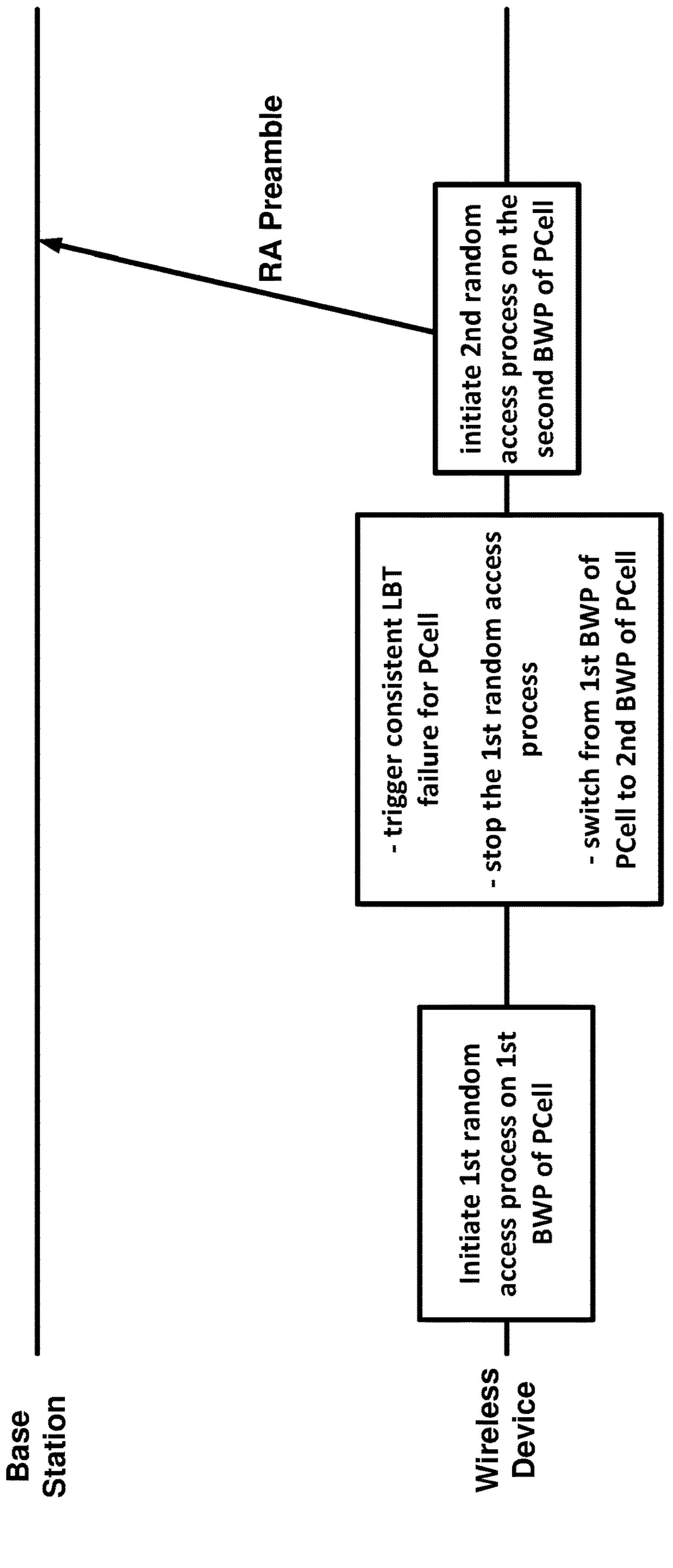
FIG. 35 shows an example process in accordance with several of various embodiments of the present disclosure.

In an example embodiment as shown in FIG. 35, a wireless device may initiate a first random access process in a first BWP of a primary cell. The first random access process may be initiated/triggered based on a triggering event such as scheduling request failure (e.g., a scheduling request counter reaching a maximum value and receiving no uplink grant), establishing time alignment for a secondary timing advance group (TAG), beam failure recovery, etc. The wireless may trigger consistent LBT failure for the primary cell. The triggering of the consistent LBT failure for the primary cell may be based on an LBT failure indication counter reaching a first number (e.g., determined based on an RRC configured parameter e.g., FailureInstanceMaxCount) as described above. In response to the triggering of the consistent LBT failure for the primary cell, the wireless device may stop the first random access process. In an example, stopping the first random access process may comprise resetting counter(s) and/or timer(s) and/or variable (s) associated with the first random access process. The wireless device may switch from the first BWP of the primary cell to a second BWP of the primary cell. In an example, the one or more messages may comprise bandwidth part configuration parameters of a plurality of BWPs, comprising the first BWP and the second BWP, of the primary cell. The bandwidth part configuration parameters of the second BWP of the primary cell may comprise random access parameters for the second BWP of the primary cell, indicating that the second BWP of the primary cell is configured with random access occasions/resources. The switching, by the wireless device, from the first BWP of the primary cell to the second BWP of the primary cell may be based on the second BWP of the primary cell being configured with random access resources/occasion. In an example, one or more BWPs of the primary cell may be configured with random access resources/occasions and the selection of the second BWP, in the one or more BWPs, for switching from the first BWP, may be based on one or more criteria. The wireless device may initiate a second random access process on the second BWP of the primary cell. The wireless device may initiate the second random access process in the second BWP of primary cell based on the random access parameters configured for the second BWP of the primary cell and using the random access occasions/resources configured for the second BWP of the primary cell. In an example, the second random access process, on the second BWP of the primary cell, may be for consistent LBT failure recovery.

Figure 36:
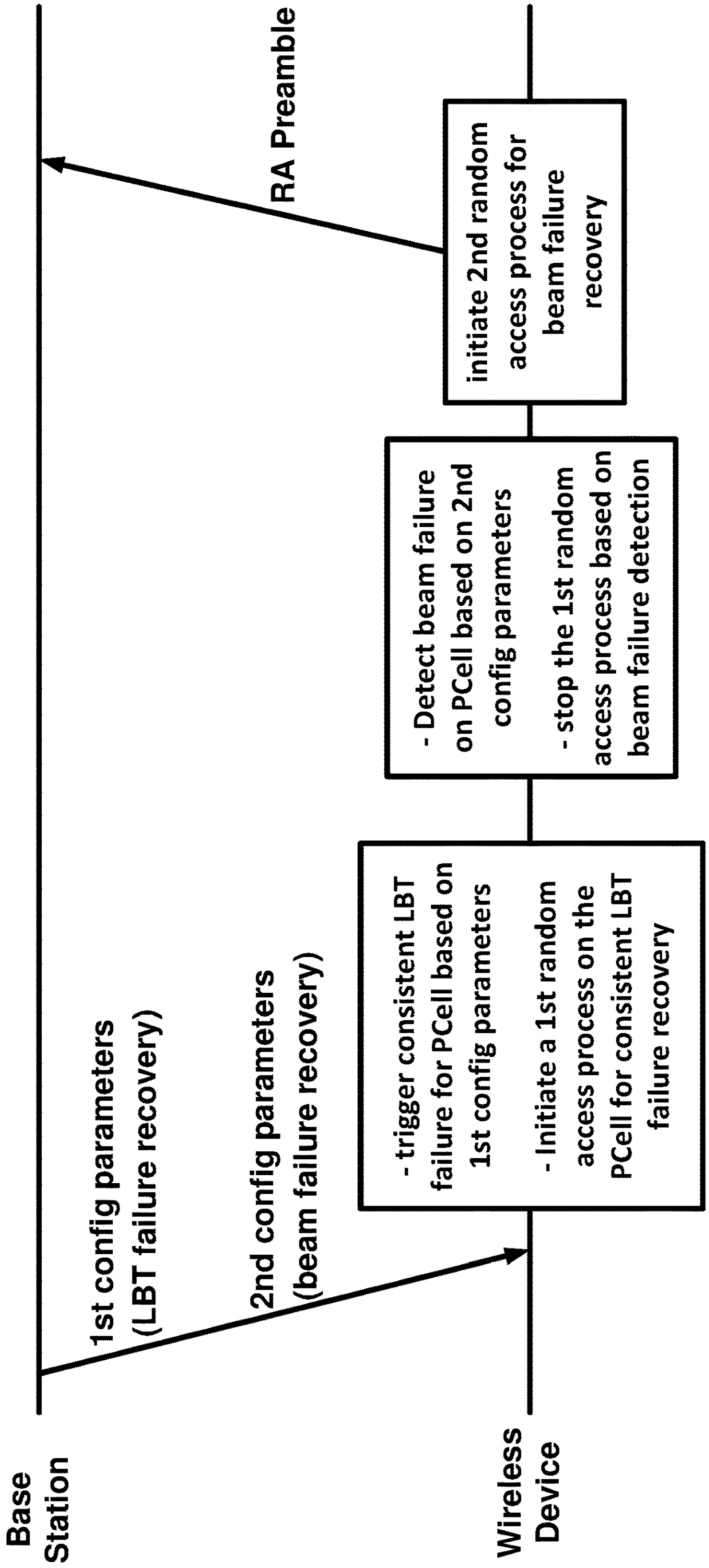
FIG. 36 shows an example process in accordance with several of various embodiments of the present disclosure.

In an example embodiment as shown in FIG. 36, a wireless device may trigger consistent LBT failures for a primary cell. The triggering of the consistent LBT failure may be based on LBT failure recovery configuration parameters. The triggering of the consistent LBT failure may be based on failure of LBT procedures for uplink transmissions on the primary cell. The configuration parameters for LBT failure recovery may comprise a first parameter (e.g., FailureInstanceMaxCount) indicating a first number of LBT failure instances that triggers LBT failure recovery. The triggering of the consistent LBT failure may be based on an LBT failure indication counter reaching the first number. In an example, the wireless device may increment the LBT failure indication counter by one based on an LBT failure indication, for example reception of the LBT failure indication by a MAC layer of the wireless device from a physical layer of the wireless device. The wireless device may start or restart an LBT failure detection timer in response to the LBT failure indication, e.g., reception of the LBT failure indication by the MAC layer from the physical layer. The wireless device may set the LBT failure indication counter to zero (e.g., may reset the LBT failure indication counter) based on the LBT failure detection timer expiring.

In response to the triggering of the consistent LBT failure for the primary cell, the wireless device may initiate a first random access on the primary cell for consistent LBT failure recovery. The first random access process, for consistent LBT failure recovery, may be based on random access process configuration parameters. The random access process configuration parameters, used for consistent LBT failure recovery, may be commonly configured for different random access processes not including random access processes performed for beam failure recovery. In an example, the random access parameters for beam failure recovery may be separately configured.

The wireless device may detect a beam failure on the primary cell of the wireless device. In an example, the detection of the beam failure on the primary cell may be while the first random access process for the consistent LBT failure recovery is ongoing. The configuration for beam failure recovery may comprise a first parameter (e.g., beamFailureInstanceMaxCount) indicating a first number of beam failure instances that triggers beam failure recovery. The detection of the beam failure may be based on a beam failure instance indication counter reaching the first number. In an example, the wireless device may increment the beam failure instance indication counter by one based on a beam failure indication, for example reception of the beam failure indication by a MAC layer of the wireless device from a physical layer of the wireless device. The wireless device may start or restart a beam failure detection timer in response to the beam failure indication, e.g., reception of the beam failure indication by the MAC layer from the physical layer. The wireless device may set the beam failure instance indication counter to zero (e.g., reset the beam failure instance indication counter) based on the beam failure detection timer expiring.

Based on the detection of the beam failure, the wireless device may stop the first random access process for consistent LBT failure. In an example, stopping the first random access process may comprise resetting counter(s) and/or timer(s) and/or variable(s) associated with the first random access process. The wireless device may initiate a second random access process on the primary cell for beam failure recovery. The wireless device may initiate/perform the second random access process based on random access process configuration parameters configured for beam failure recovery. The configuration parameters for beam failure recovery may comprise random access parameters configured for beam failure recovery. The random access parameters for beam failure recovery may indicate random access resources/occasions to be used for a random access process that is initiated for beam failure recovery. For example, the random access parameters for beam failure recovery may indicate a random access response window for beam failure recovery, a first number of preamble transmissions before declaring a random access failure for beam failure recovery, a power ramping step for a beam failure recovery random access process, a configuration index for beam failure recovery, etc. The second random access process may comprise transmitting a transport block (TB), e.g., via a Msg3 message (in a four-step random access process) or a MsgA message (in a two-step random access process). The TB may comprise a beam failure recovery (BFR) MAC CE. The BFR MAC CE may have one of a short format (one octet) and long format (four octets) depending on highest ServingCellIndex of the serving cells configured for the wireless device (e.g., the one-octet format when the highest ServingCellIndex is less than eight and the four-octet format otherwise). The BFR MAC CE may indicate on which serving cell(s) the beam failure is detected. The wireless device may multiplex the BFR MAC CE with other logical channel(s) and/or MAC CE(s) in the TB. The multiplexing of the BFR MAC CE with other logical channel(s) and/or MAC CE(s) may be based on a logical channel prioritization procedure. The logical channel prioritization procedure may utilize the priorities of logical channel(s) and MAC CE(s). For the purpose of the logical channel prioritization procedure, the priority of the BFR MAC CE may be higher than the priorities of data from any logical channel except uplink common control channel (UL-CCCH) logical channel.

In an example, the wireless device may initiate a third random access process for the consistent LBT failure recovery after the second random access process is completed (e.g., successfully completed). The third random access process, for consistent LBT failure recovery, may comprise transmitting a transport block (TB), e.g., via a Msg3 message (in a four-step random access process) or a MsgA message (in a two-step random access process). The TB may comprise an LBT failure MAC CE. The LBT failure MAC CE may have one of a short format (one octet) and long format (four octets) depending on highest ServingCellIndex of the serving cells configured for the wireless device (e.g., the one-octet format when the highest ServingCellIndex is less than eight and the four-octet format otherwise). The LBT failure MAC CE may indicate for which serving cell(s) the consistent LBT failure is triggered. The wireless device may multiplex the LBT failure MAC CE with other logical channel(s) and/or MAC CE(s) in the TB. The multiplexing of the LBT failure MAC CE with other logical channel(s) and/or MAC CE(s) may be based on a logical channel prioritization procedure. The logical channel prioritization procedure may utilize the priorities of logical channel(s) and MAC CE(s). For the purpose of the logical channel prioritization procedure, the priority of the LBT failure MAC CE may be higher than the priorities of data from any logical channel except uplink common control channel (UL-CCCH) logical channel.

Figure 37:
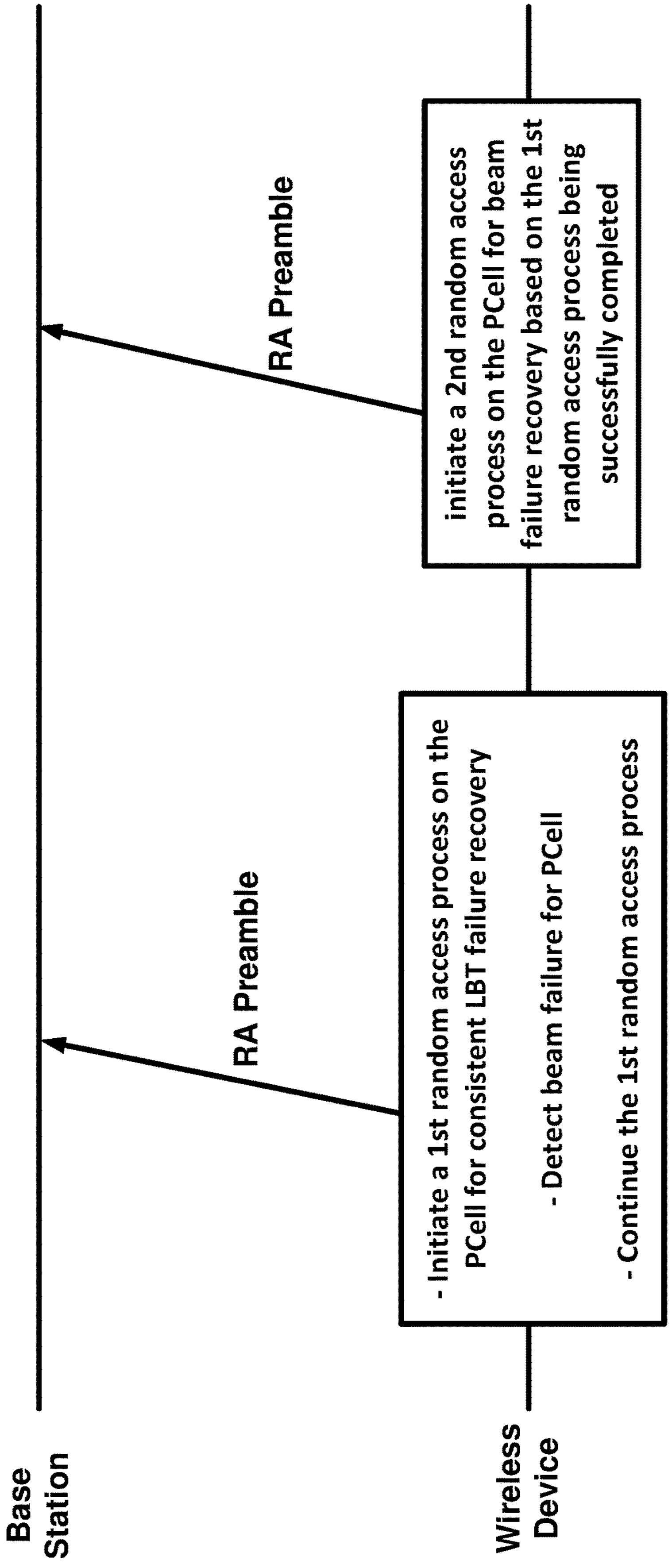
FIG. 37 shows an example process in accordance with several of various embodiments of the present disclosure.

In an example embodiment as shown in FIG. 37, the wireless device may initiate a first random access process on the primary cell in response to triggering consistent LBT failure for the primary cell. The triggering the consistent LBT failure for the primary cell may be based on the LBT failure recovery configuration parameters and based on an LBT failure instance indication counter reaching a first number (e.g., as indicated by the LBT failure recovery configuration parameters such as a FailureInstanceMaxCount parameter). The wireless device may detect beam failure for the primary cell, e.g., while the first random access process for consistent LBT failure recovery is ongoing. The wireless device may detect the beam failure for the primary cell based on the configuration parameters for beam failure recovery and/or radio link monitoring. In response to the detecting the beam failure, the wireless device may continue the first random access process, for the consistent LBT failure recovery, and may initiate a second random access process, for beam failure recovery after the first random access process being completed (e.g., being successfully completed).

Figure 38:
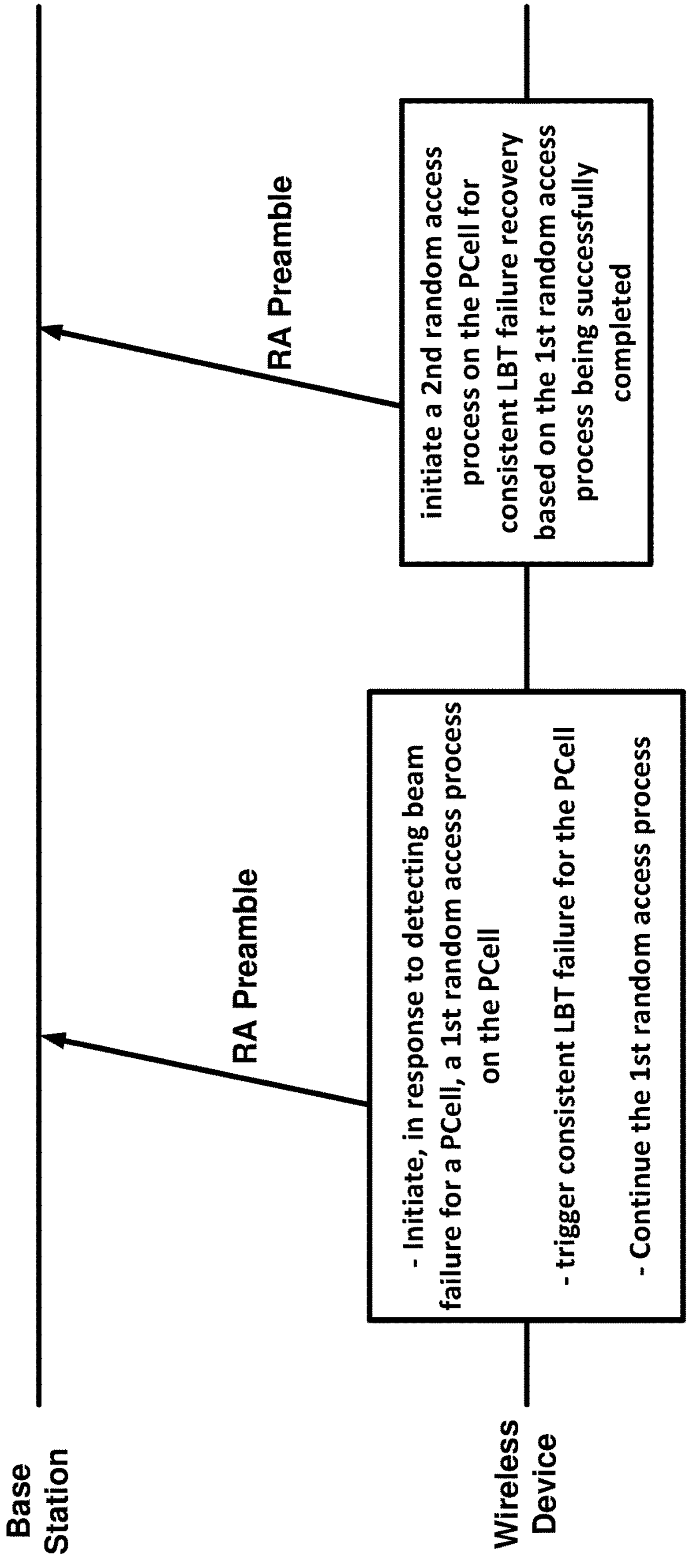
FIG. 38 shows an example process in accordance with several of various embodiments of the present disclosure.

In an example embodiment as shown in FIG. 38, the wireless device may initiate a first random access process on the primary cell in response to detecting beam failure for the primary cell. The triggering the beam failure recovery for the primary cell may be based on the beam failure recovery configuration parameters and based on a beam failure indication counter reaching a first number (e.g., as indicated by the beam failure recovery configuration parameters such as a beamFailureInstanceMaxCount parameter). The wireless device may trigger consistent failure for the primary cell, e.g., while the first random access process for beam failure recovery is ongoing. The wireless device may trigger the consistent LBT failure for the primary cell based on the configuration parameters for LBT failure recovery. In response to the triggering the consistent LBT failure, the wireless device may continue the first random access process, for the consistent LBT failure recovery, and may initiate a second random access process, for beam failure recovery after the first random access process being completed (e.g., being successfully completed). In an example, the wireless device may switch from a first BWP of the primary cell (e.g., the active BWP of the primary cell on which the first random access process, for beam failure recovery, is initiated and for which the consistent LBT failure is triggered) to a second BWP of the primary cell based on the first random access process for beam failure recovery being successfully completed.

Figure 39:
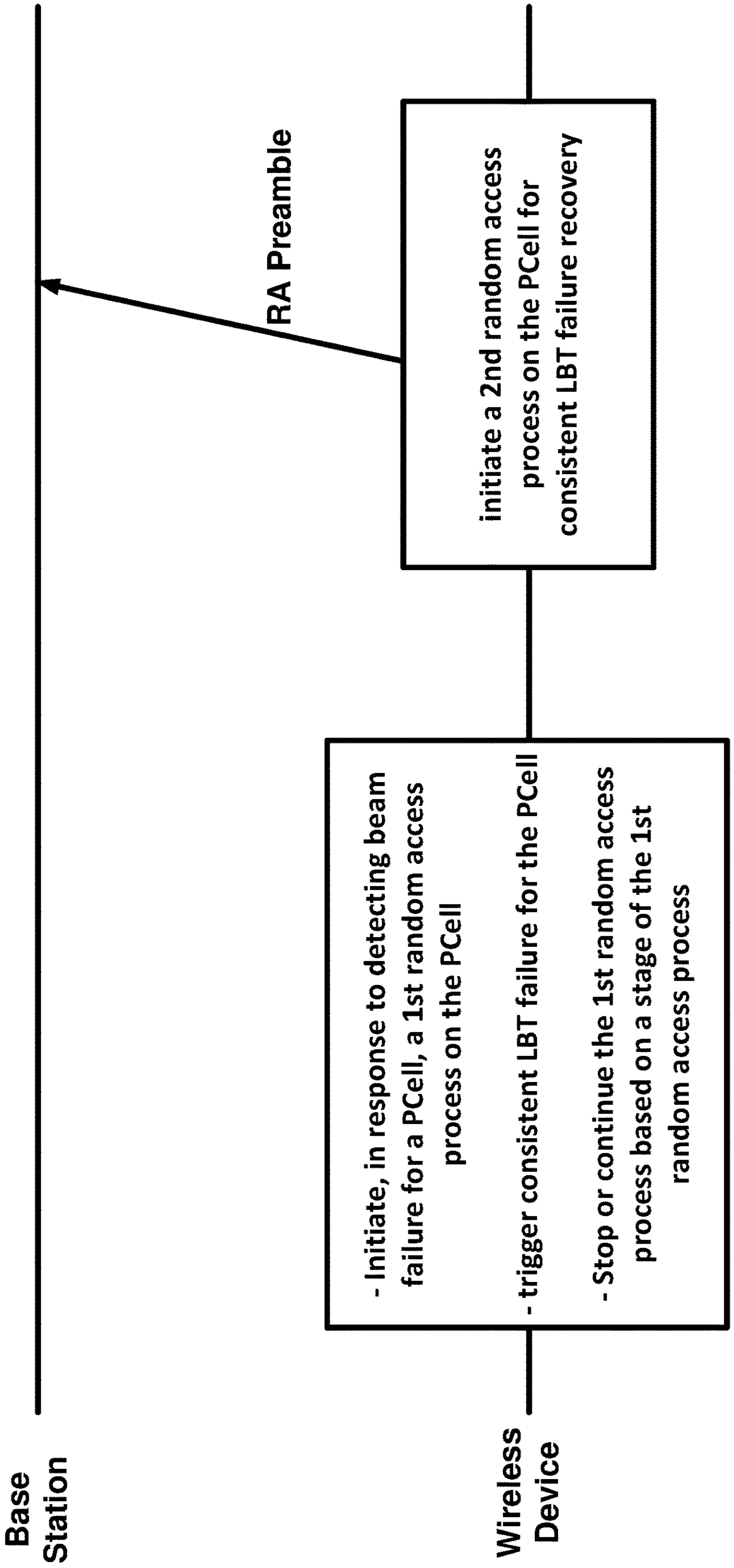
FIG. 39 shows an example process in accordance with several of various embodiments of the present disclosure.

In an example embodiment as shown in FIG. 39, the wireless device may initiate a first random access process on the primary cell in response to detecting beam failure for the primary cell and for beam failure recovery. The triggering the beam failure recovery for the primary cell may be based on the beam failure recovery configuration parameters and based on a beam failure indication counter reaching a first number (e.g., as indicated by the beam failure recovery configuration parameters such as a beamFailureInstanceMaxCount parameter). The wireless device may trigger consistent failure for the primary cell, e.g., while the first random access process, for beam failure recovery, is ongoing. The wireless device may trigger the consistent LBT failure for the primary cell based on the configuration parameters for LBT failure recovery. In response to the triggering the consistent LBT failure, the wireless device may continue or stop the first random access process, for the consistent LBT failure recovery based on a stage of the first random access process for beam failure recovery, for example based on whether random access resources are selected and/or based on whether a random access message (e.g., a MsgA in a two-step random access process; or a Msg1/preamble or a Msg3 in a four-step random access process) is transmitted or based on a random access message (e.g., a MsgB in a two-step random access process; or a Msg2/RAR or Msg4 in a four-step random access process) is received.

In accordance with various exemplary embodiments in the present disclosure, a device (e.g., a wireless device, a base station and/or alike) may include one or more processors and may include memory that may store instructions. The instructions, when executed by the one or more processors, cause the device to perform actions as illustrated in the accompanying drawings and described in the specification. The order of events or actions, as shown in a flow chart of this disclosure, may occur and/or may be performed in any logically coherent order. In some examples, at least two of the events or actions shown may occur or may be performed at least in part simultaneously and/or in parallel. In some examples, one or more additional events or actions may occur or may be performed prior to, after, or in between the events or actions shown in the flow charts of the present disclosure.

Figure 40:
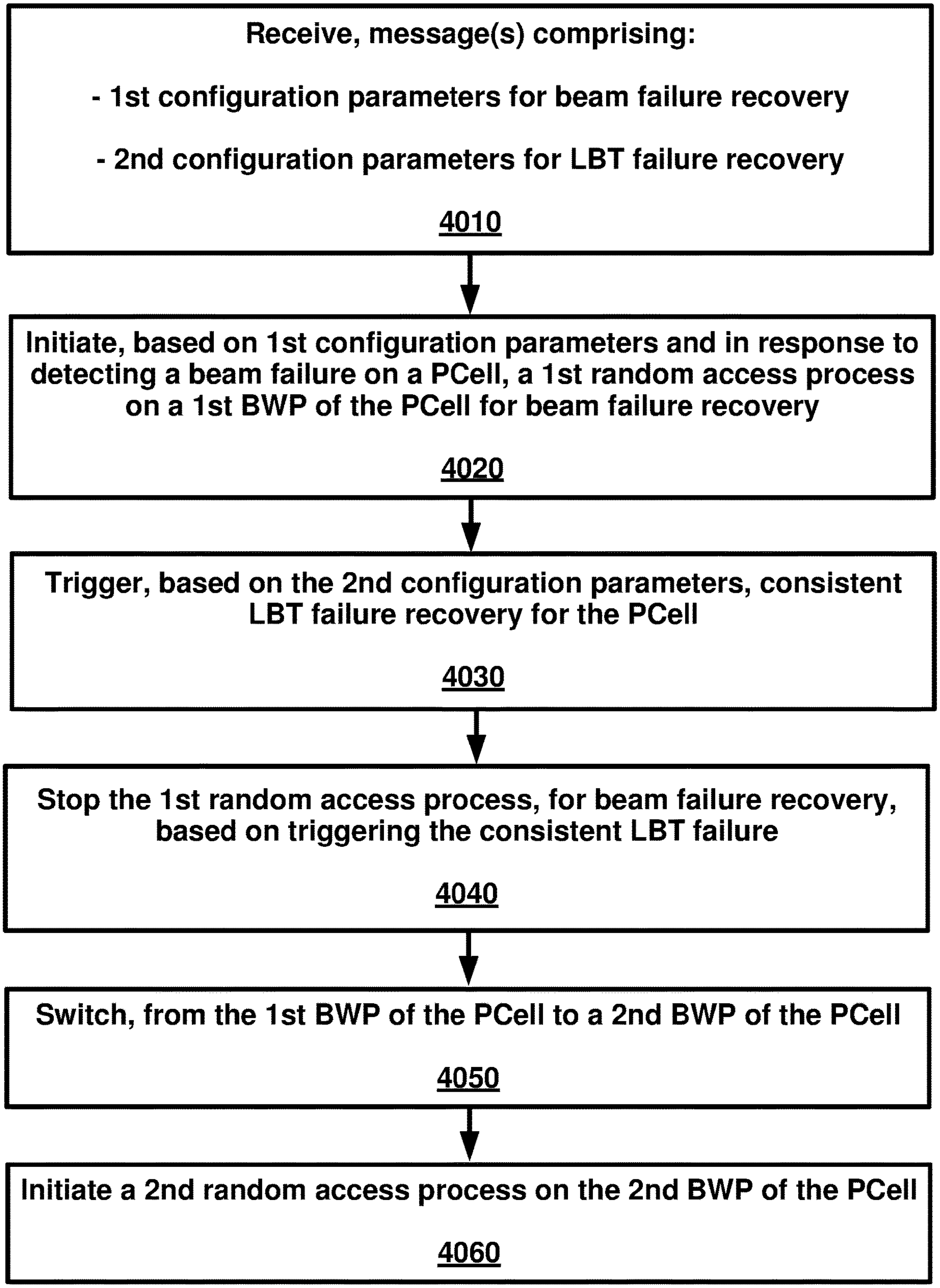
FIG. 40 shows an example flow diagram in accordance with several of various embodiments of the present disclosure.

FIG. 40 shows an example flow diagram in accordance with several of various embodiments of the present disclosure. At 4010, a wireless device may receive one or more messages comprising: first configuration parameters for beam failure recovery; and second configuration parameters for listen-before-talk (LBT) failure recovery. At 4020, the wireless device may initiate, based on the first configuration parameters and in response to detecting a beam failure on a primary cell, a first random access process on a first bandwidth part (BWP) of the primary cell for beam failure recovery. At 4030, the wireless device may trigger, based on the second configuration parameters, consistent LBT failure for the primary cell. At 4040, the wireless device may stop the first random access process, for the beam failure recovery, based on the triggering the consistent LBT failure. At 4050, the wireless device may switch from the first BWP of the primary cell to a second BWP of the primary cell as an active BWP of the primary cell. At 4060, the wireless device may initiate a second random access process on the second BWP of the primary cell.

In an example embodiment, the second random access process, initiated at 4060, may be for consistent LBT failure recovery. In an example embodiment, the wireless device may initiate a third random access process, for the beam failure recovery, after the second random access process is successfully completed. In an example, embodiment, the second random access process, initiated at 4060, may comprise transmitting a transport block comprising an LBT failure medium access control (MAC) control element (CE). In an example embodiment, the transmitting the transport block may be based on a logical channel prioritization procedure. A first priority associated with the LBT failure MAC CE may be higher than a second priority associated with data from any logical channel except uplink common control channel (UL-CCCH) logical channel.

In an example embodiment, the second random access process, initiated at 4060, may be for the beam failure recovery. In an example embodiment, the wireless device may initiate a third random access process for consistent LBT failure recovery after the second random access process is successfully completed. In an example embodiment, the second random access process, initiated at 4060, may comprise transmitting a transport block comprising a beam failure recovery medium access control (MAC) control element (CE). In an example embodiment, the transmitting the transport block may be based on a logical channel prioritization procedure. A first priority associated with the beam failure recovery MAC CE may be higher than a second priority associated with data from any logical channel except uplink common control channel (UL-CCCH) logical channel.

In an example embodiment, the first configuration parameters, received at 4010 for beam failure recovery, may comprise first random access parameters. The one or more messages, received at 4010, may further comprise second random access parameters. The first random access process, initiated at 4020 for the beam failure recovery, may be based on the first random access parameters. The second random access process, initiated at 4060, may be for consistent LBT failure recovery and may be based on the second random access parameters. In an example embodiment, the first random access parameters may indicate random access resources for a beam failure recovery random access process. In an example embodiment, the first random access parameters may indicate: a random access response window for beam failure recovery; a first number of preamble transmissions before declaring a random access failure for beam failure recovery; a power ramping step for a beam failure recovery random access process; and a configuration index for beam failure recovery.

In an example embodiment, the first configuration parameters, received at 4010 for beam failure recovery, may comprise an identifier of a search space for monitoring a control channel in a beam failure recovery random access process.

In an example embodiment, the first configuration parameters, received at 4010, may comprise a first parameter indicating a first number of beam failure instances that triggers beam failure recovery. The detecting the beam failure may be based on a beam failure instance indication counter reaching the first number. In an example embodiment, the detecting the beam failure at 4020 may comprise incrementing the beam failure instance indication counter by one based on a beam failure indication. In an example embodiment, the detecting the beam failure at 4020 may comprise setting the beam failure instance indication counter to zero based on a beam failure detection timer expiring.

In an example embodiment, the second configuration parameters, received at 4010, may comprise a first parameter indicating a first number of LBT failure instances that triggers LBT failure recovery. The triggering the consistent LBT failure, at 4030, may be based on an LBT failure indication counter reaching the first number. In an example embodiment, the triggering the consistent LBT failure, at 4030, may comprise incrementing the LBT failure indication counter by one based on an LBT failure indication. In an example embodiment, triggering the consistent LBT failure at 4030 may comprise setting the LBT failure indication counter to zero based on an LBT failure detection timer expiring.

In an example embodiment, the second BWP of the primary cell, on which the second random access process is initiated at 4060, may be configured with random access occasions. The switching, at 4050, from the first BWP of the primary cell to a second BWP of the primary cell may be based on the second BWP of the primary cell being configured with the random access occasions.

Figure 41:
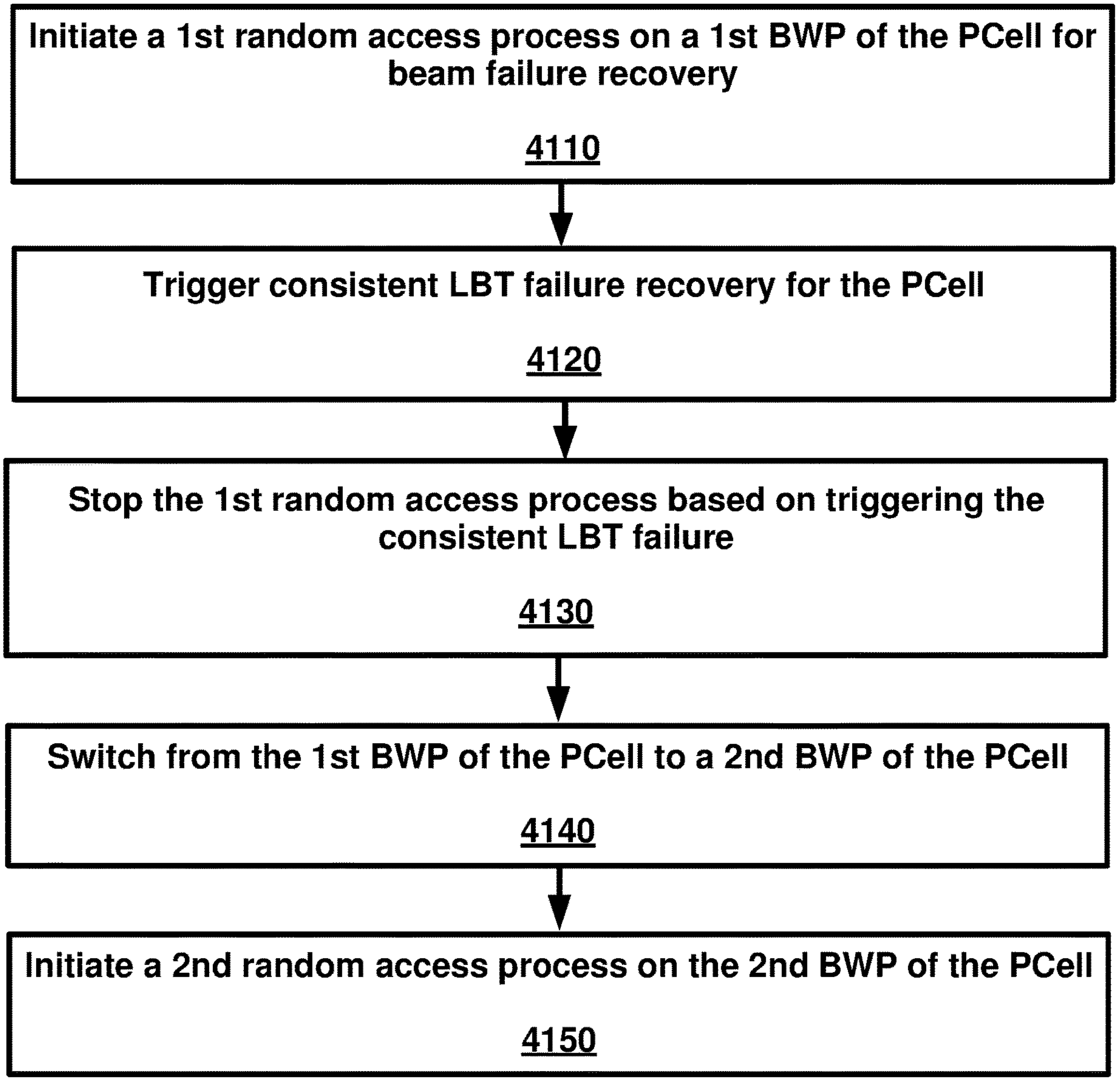
FIG. 41 shows an example flow diagram in accordance with several of various embodiments of the present disclosure.

FIG. 41 shows an example flow diagram in accordance with several of various embodiments of the present disclosure. At 4110, a wireless device may initiate a first random access process on a first bandwidth part (BWP) of a primary cell for beam failure recovery. At 4120, the wireless device may trigger consistent listen-before-talk (LBT) failure for the primary cell. At 4130, the wireless device may stop the first random access process based on the triggering the consistent LBT failure. At 4140, the wireless device may switch from the first BWP of the primary cell to a second BWP of the primary cell as an active BWP of the primary cell. At 4150, the wireless device may initiate a second random access process on the second BWP of the primary cell.

Figure 42:
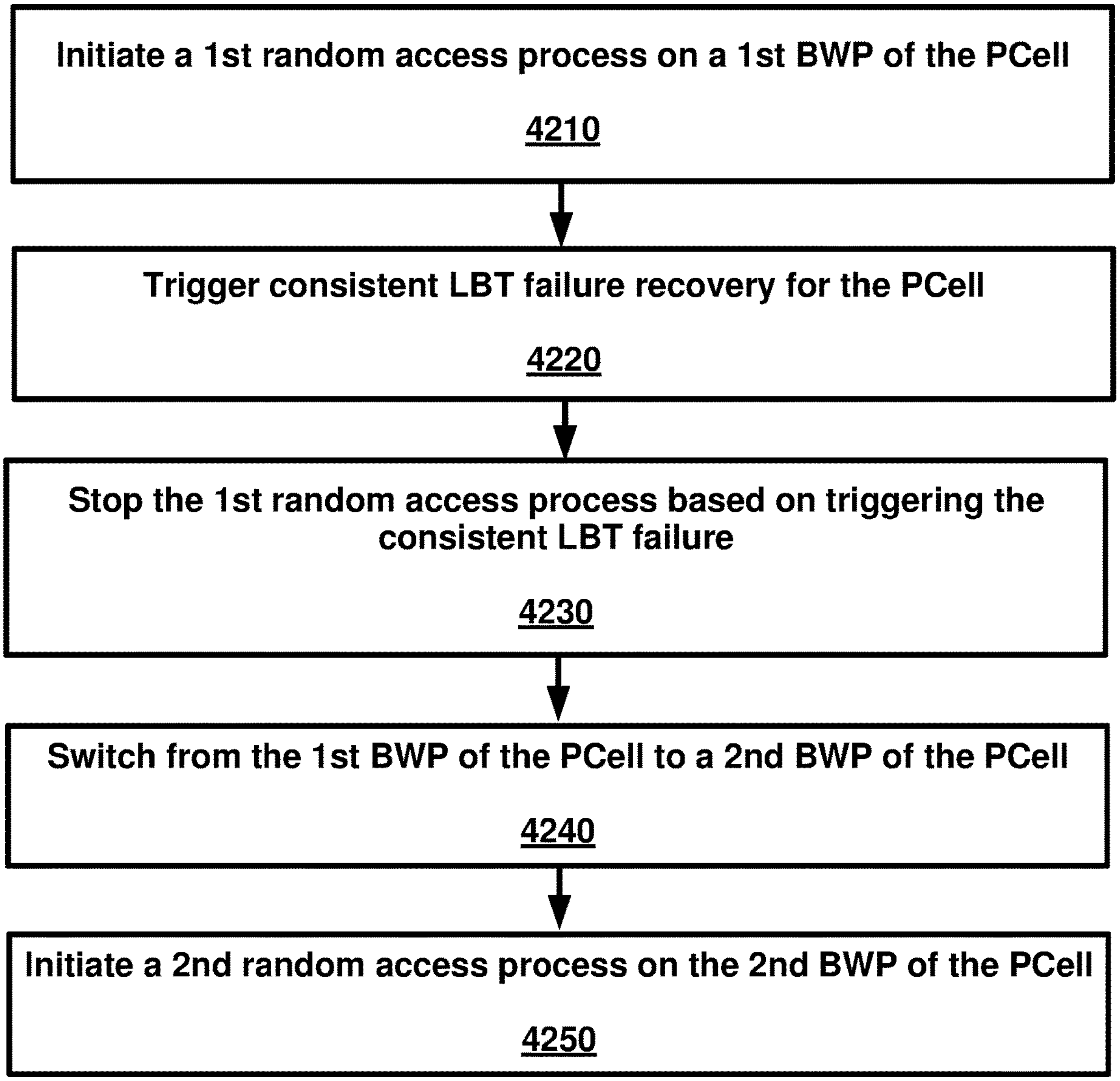
FIG. 42 shows an example flow diagram in accordance with several of various embodiments of the present disclosure.

FIG. 42 shows an example flow diagram in accordance with several of various embodiments of the present disclosure. At 4210, a wireless device may initiate a first random access process on a first bandwidth part (BWP) of a primary cell. At 4220, the wireless device may trigger consistent listen-before-talk (LBT) failure for the primary cell. At 4230, the wireless device may stop the first random access process based on the triggering the consistent LBT failure. At 4240, the wireless device may switch from the first BWP of the primary cell to a second BWP of the primary cell as an active BWP of the primary cell. At 4250, the wireless device may initiate a second random access process on the second BWP of the primary cell.

In an example embodiment, the second random access process, initiated at 4250, may be for consistent LBT failure recovery.

Figure 43:
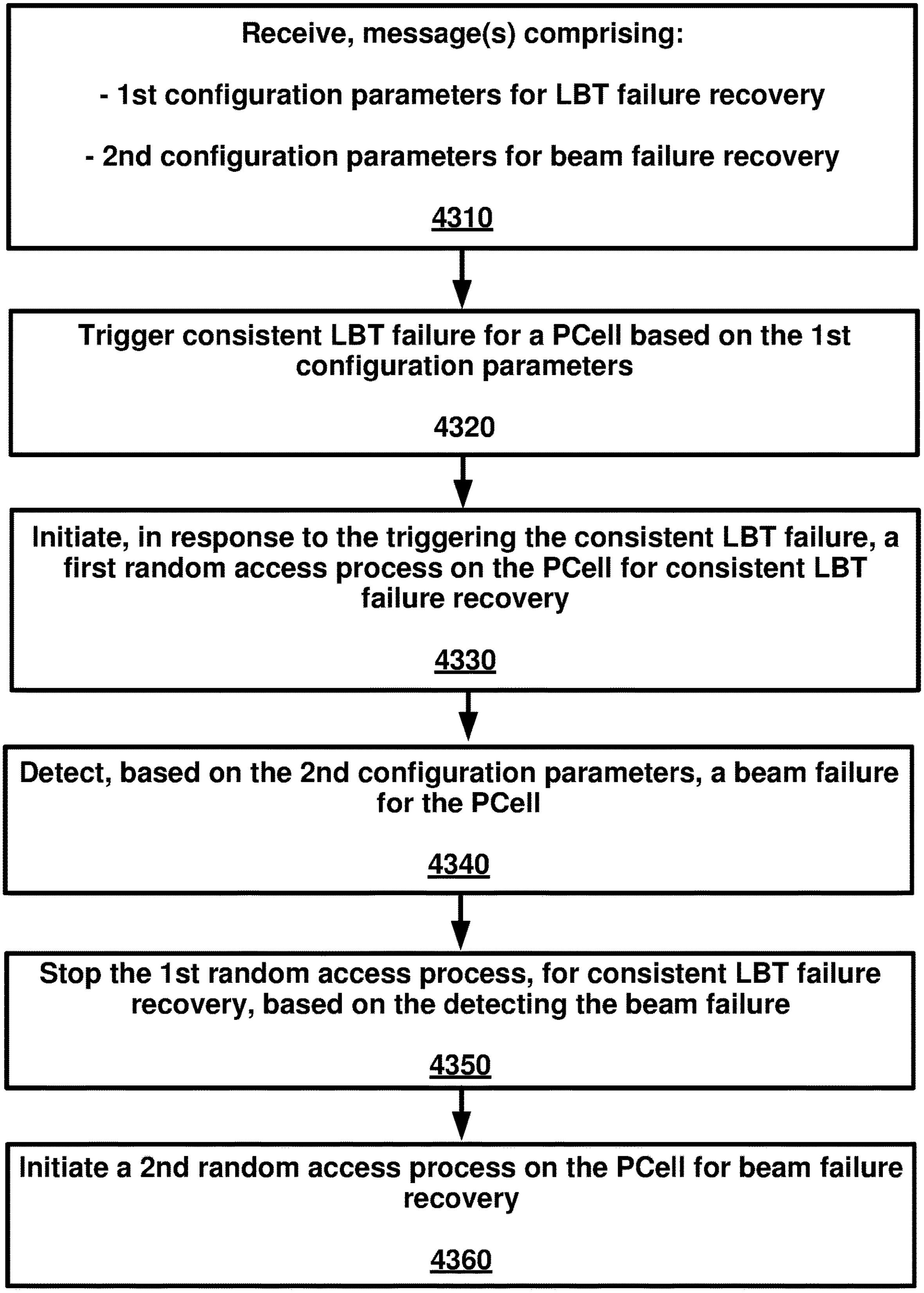
FIG. 43 shows an example flow diagram in accordance with several of various embodiments of the present disclosure.

FIG. 43 shows an example flow diagram in accordance with several of various embodiments of the present disclosure. At 4310, a wireless device may receive one or more messages comprising: first configuration parameters for listen-before-talk (LBT) failure recovery; and second configuration parameters for beam failure recovery. At 4320, the wireless device may trigger consistent LBT failure for a primary cell based on the first configuration parameters. At 4330, the wireless device may initiate, in response to the triggering the consistent LBT failure, a first random access process on the primary cell for consistent LBT failure recovery. At 4340, the wireless device may detect, based on the second configuration parameters, a beam failure for the primary cell. At 4350, the wireless device may stop the first random access process, for the consistent LBT failure recovery, based on the detecting the beam failure. At 4360, the wireless device may initiate a second random access process on the primary cell for beam failure recovery.

In an example embodiment, the wireless device may initiate a third random access process for the consistent LBT failure recovery after the second random access process, initiated at 4360, is successfully completed. In an example embodiment, the third random access process may comprise transmitting a transport block comprising an LBT failure medium access control (MAC) control element (CE). In an example embodiment, the transmitting the transport block may be based on a logical channel prioritization procedure. A first priority associated with the LBT failure recovery MAC CE may be higher than a second priority associated with data from any logical channel except uplink common control channel (UL-CCCH) logical channel.

In an example embodiment, the second random access process, initiated at 4360, may comprise transmitting a transport block comprising a beam failure recovery medium access control (MAC) control element (CE). In an example embodiment, the transmitting the transport block may be based on a logical channel prioritization procedure. A first priority associated with the beam failure recovery MAC CE may be higher than a second priority associated with data from any logical channel except uplink common control channel (UL-CCCH) logical channel.

In an example embodiment, the second configuration parameters, received at 4310 for beam failure recovery, may comprise first random access parameters. The one or more messages, received at 4310, may further comprise second random access parameters. The first random access process, initiated at 4330 for the LBT failure recovery, may be based on the second random access parameters. The second random access process, initiated at 4360 for the beam failure recovery, may be based on the first random access parameters. In an example embodiment, the first random access parameters may indicate random access resources for a beam failure recovery random access process. In an example embodiment, the first random access parameters may indicate: a random access response window for beam failure recovery; a first number of preamble transmissions before declaring a random access failure for beam failure recovery; a power ramping step for a beam failure recovery random access process; and a configuration index for beam failure recovery.

In an example embodiment, the second configuration parameters, received at 4310 for beam failure recovery, may comprise an identifier of a search space for monitoring a control channel in a beam failure recovery random access process.

In an example embodiment, the second configuration parameters, received at 4310, may comprise a first parameter indicating a first number of beam failure instances that triggers beam failure recovery. The detecting the beam failure, at 4340, may be based on a beam failure instance indication counter reaching the first number. In an example embodiment, the detecting the beam failure, at 4340, may comprise incrementing the beam failure instance indication counter by one based on a beam failure indication. In an example embodiment, the detecting the beam failure, at 4340, may comprise setting the beam failure instance indication counter to zero based on a beam failure detection timer expiring.

In an example embodiment, the first configuration parameters, received at 4310, may comprise a first parameter indicating a first number of LBT failure instances that triggers LBT failure recovery. The triggering the consistent LBT failure, at 4320, may be based on an LBT failure indication counter reaching the first number. In an example embodiment, the triggering the consistent LBT failure, at 4320, may comprise incrementing the LBT failure indication counter by one based on an LBT failure indication. In an example embodiment, the triggering the consistent LBT failure, at 4320, may comprise setting the LBT failure indication counter to zero based on an LBT failure detection timer expiring.

Figure 44:
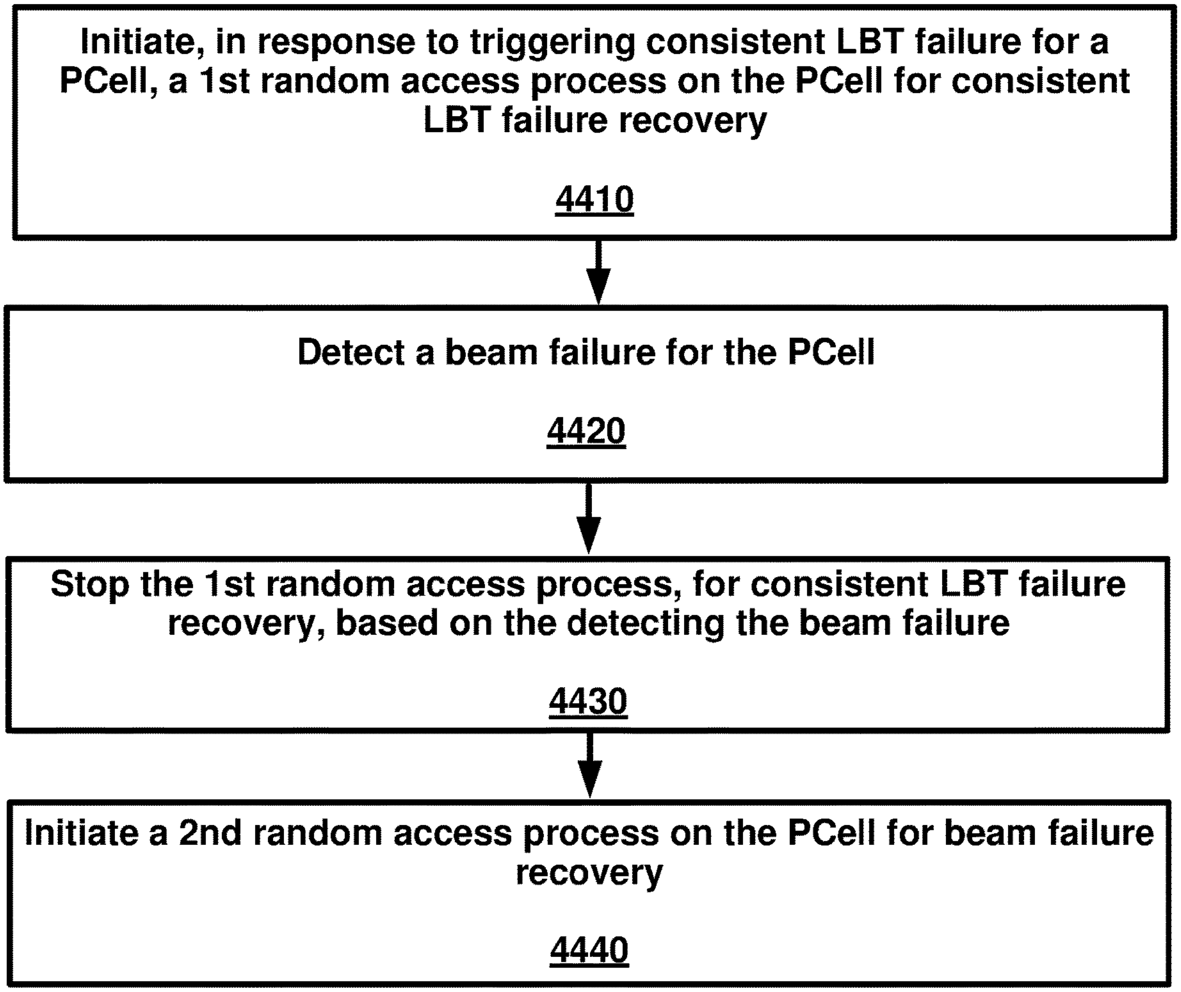
FIG. 44 shows an example flow diagram in accordance with several of various embodiments of the present disclosure.

FIG. 44 shows an example flow diagram in accordance with several of various embodiments of the present disclosure. At 4410, a wireless device may receive may initiate, in response to triggering consistent listen-before-talk (LBT) failure for a primary cell, a first random access process on the primary cell for consistent LBT failure recovery. At 4420, the wireless device may detect a beam failure for the primary cell. At 4430, the wireless device may stop the first random access process, for the consistent LBT failure recovery, based on the detecting the beam failure. At 4440, the wireless device may initiate a second random access process on the primary cell for beam failure recovery.

Figure 45:
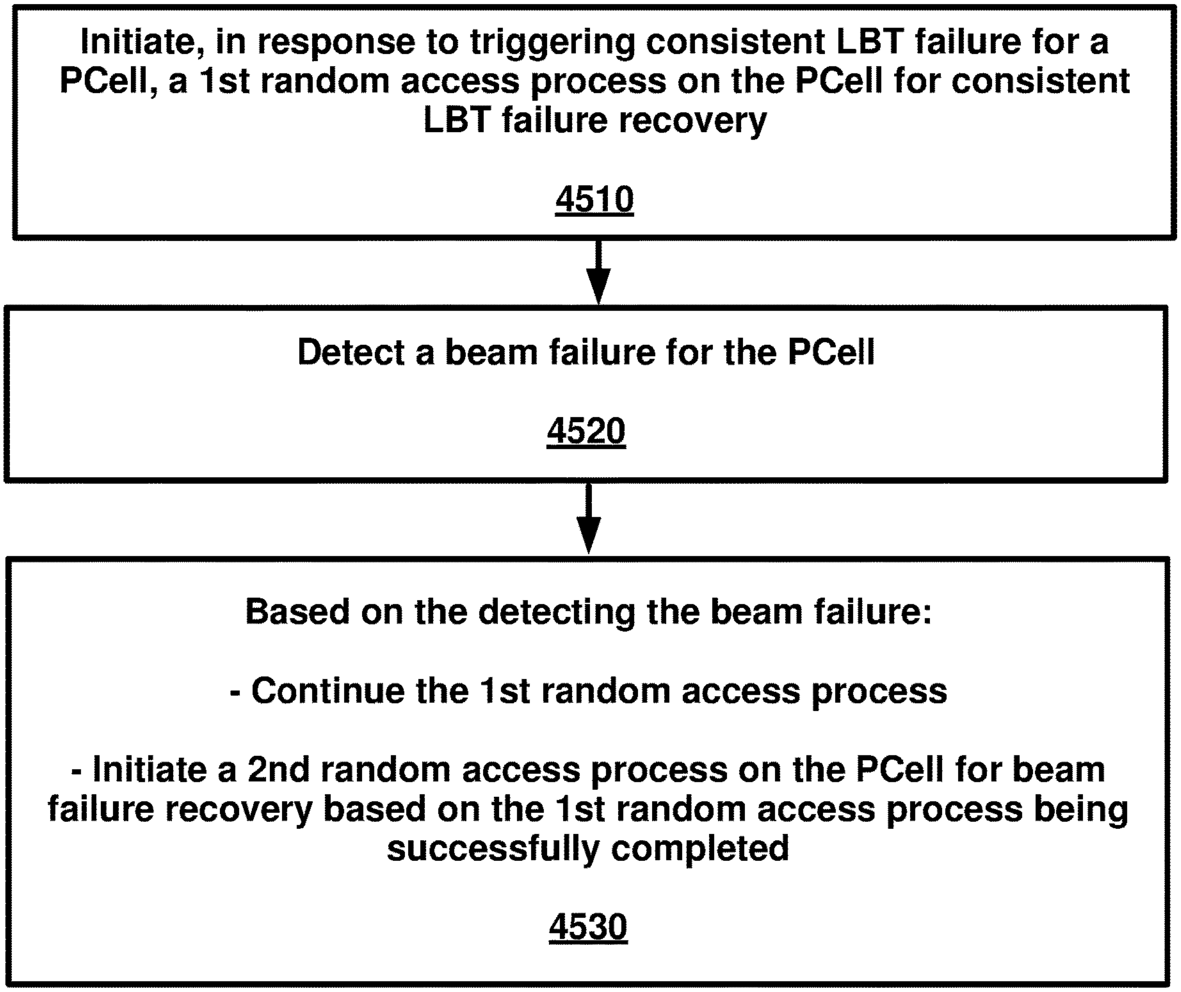
FIG. 45 shows an example flow diagram in accordance with several of various embodiments of the present disclosure.

FIG. 45 shows an example flow diagram in accordance with several of various embodiments of the present disclosure. At 4510, a wireless device may initiate, in response to triggering consistent listen-before (LBT) failure for a primary cell, a first random access process on the primary cell for consistent LBT failure recovery. At 4520, the wireless device may detect a beam failure for the primary cell. At 4530, based on the detecting the beam failure: the wireless device may continue the first random access process; and the wireless device may initiate a second random access process on the primary cell for beam failure recovery based on the first random access process being successfully completed.

In an example embodiment, the detecting the beam failure at 4520 may be while the first random access process is ongoing.

Figure 46:
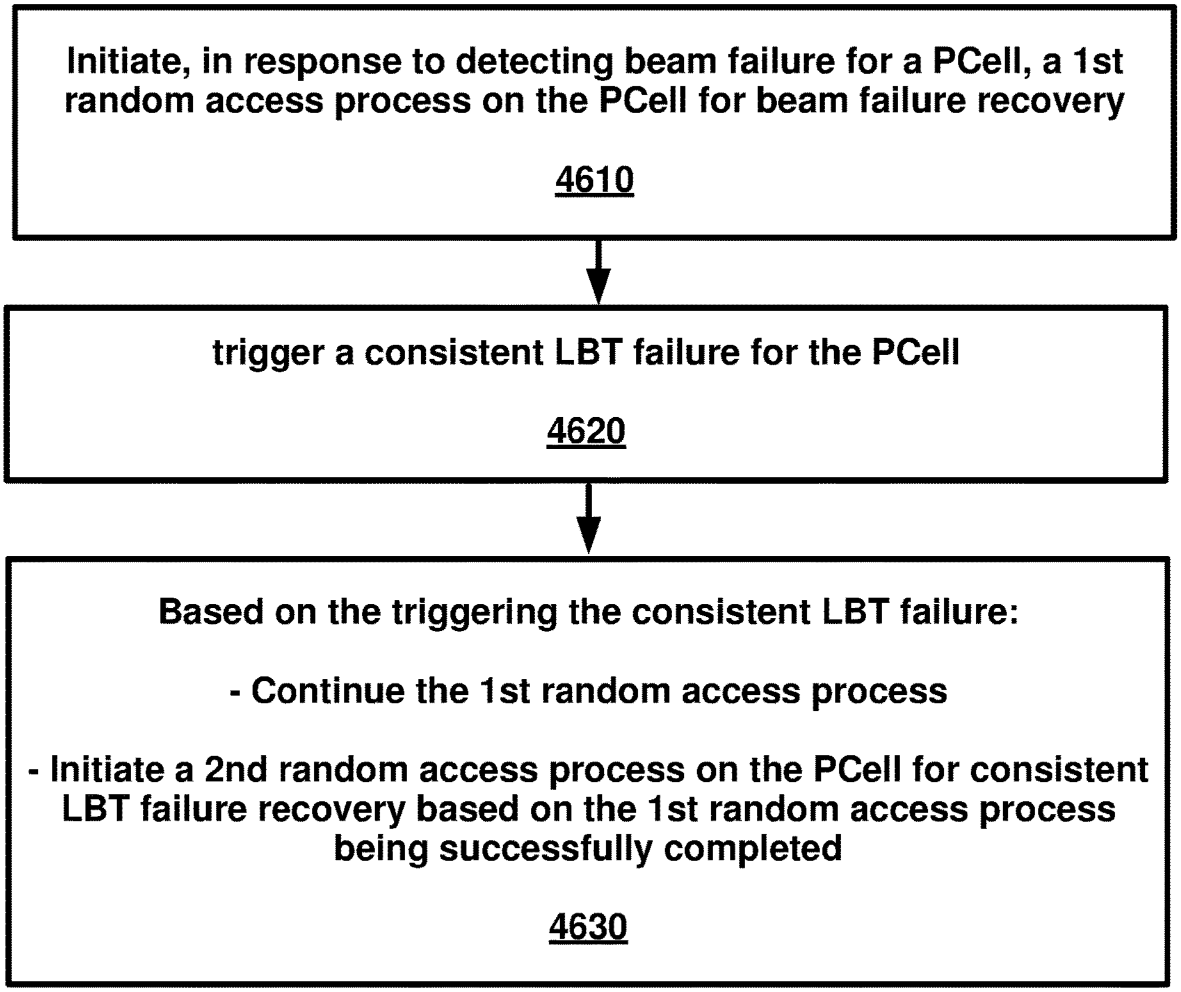
FIG. 46 shows an example flow diagram in accordance with several of various embodiments of the present disclosure.

FIG. 46 shows an example flow diagram in accordance with several of various embodiments of the present disclosure. At 4610, a wireless device may initiate, in response to detecting beam failure for a primary cell, a first random access process on the primary cell for beam failure recovery. At 4620, the wireless device may trigger a consistent listen-before-talk (LBT) failure for the primary cell. At 4630, based on the triggering the consistent LBT failure: the wireless device may continue the first random access process; and the wireless device may initiate a second random access process on the primary cell for consistent LBT failure recovery based on the first random access process being successfully completed.

In an example embodiment, the wireless device may switch from a first bandwidth part (BWP) of the primary cell to a second BWP of the primary cell based on the first random access process being successfully completed.

Figure 47:
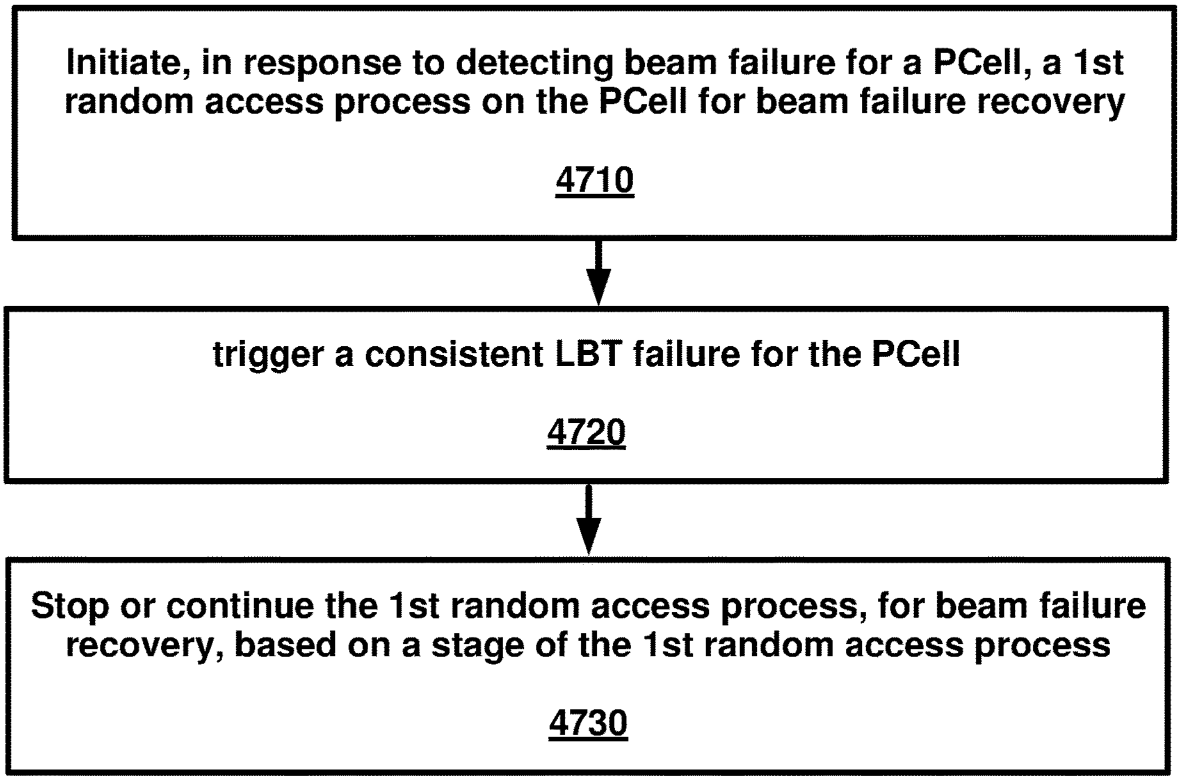
FIG. 47 shows an example flow diagram in accordance with several of various embodiments of the present disclosure.

FIG. 47 shows an example flow diagram in accordance with several of various embodiments of the present disclosure. At 4710, a wireless device may initiate, in response to detecting beam failure for a primary cell, a first random access process on the primary cell for beam failure recovery. At 4720, the wireless device may trigger a consistent listen-before-talk (LBT) failure for the primary cell. At 4730, the wireless device may stop or continue the first random access process, for beam failure recovery, based on a stage of the first random access process.

In an example embodiment, the wireless device may initiate a second random access process on the primary cell for consistent LBT failure recovery.

In an example embodiment, wherein the stopping or the continuing the first random access process, at 4730, may be based on whether a random access message is transmitted. In an example embodiment, the random access message may be one of a Msg1 message or a Msg3 message. In an example embodiment, the random access message may be a MsgA message.

In an example embodiment, the stopping or the continuing the first random access process may be based on whether a random access message is received. In an example embodiment, the random access message may be one of a Msg2 or a Msg4 message. In an example embodiment, the random access message may be a MsgB message.

Various exemplary embodiments of the disclosed technology are presented as example implementations and/or practices of the disclosed technology. The exemplary embodiments disclosed herein are not intended to limit the scope. Persons of ordinary skill in the art will appreciate that various changes can be made to the disclosed embodiments without departure from the scope. After studying the exemplary embodiments of the disclosed technology, alternative aspects, features and/or embodiments will become apparent to one of ordinary skill in the art. Without departing from the scope, various elements or features from the exemplary embodiments may be combined to create additional embodiments. The exemplary embodiments are described with reference to the drawings. The figures and the flowcharts that demonstrate the benefits and/or functions of various aspects of the disclosed technology are presented for illustration purposes only. The disclosed technology can be flexibly configured and/or reconfigured such that one or more elements of the disclosed embodiments may be employed in alternative ways. For example, an element may be optionally used in some embodiments or the order of actions listed in a flowchart may be changed without departure from the scope.

An example embodiment of the disclosed technology may be configured to be performed when deemed necessary, for example, based on one or more conditions in a wireless device, a base station, a radio and/or core network configuration, a combination thereof and/or alike. For example, an example embodiment may be performed when the one or more conditions are met. Example one or more conditions may be one or more configurations of the wireless device and/or base station, traffic load and/or type, service type, battery power, a combination of thereof and/or alike. In some scenarios and based on the one or more conditions, one or more features of an example embodiment may be implemented selectively.

In this disclosure, the articles “a” and “an” used before a group of one or more words are to be understood as “at least one” or “one or more” of what the group of the one or more words indicate. The use of the term “may” before a phrase is to be understood as indicating that the phrase is an example of one of a plurality of useful alternatives that may be employed in an embodiment in this disclosure.

In this disclosure, an element may be described using the terms “comprises”, “includes” or “consists of” in combination with a list of one or more components. Using the terms “comprises” or “includes” indicates that the one or more components are not an exhaustive list for the description of the element and do not exclude components other than the one or more components. Using the term “consists of” indicates that the one or more components is a complete list for description of the element. In this disclosure, the term “based on” is intended to mean “based at least in part on”. The term “based on” is not intended to mean “based only on”. In this disclosure, the term “and/or” used in a list of elements indicates any possible combination of the listed elements. For example, “X, Y, and/or Z” indicates X; Y; Z; X and Y; X and Z; Y and Z; or X, Y, and Z.

Some elements in this disclosure may be described by using the term “may” in combination with a plurality of features. For brevity and ease of description, this disclosure may not include all possible permutations of the plurality of features. By using the term "may" in combination with the plurality of features, it is to be understood that all permutations of the plurality of features are being disclosed. For example, by using the term "may" for description of an element with four possible features, the element is being described for all fifteen permutations of the four possible features. The fifteen permutations include one permutation with all four possible features, four permutations with any three features of the four possible features, six permutations with any two features of the four possible features and four permutations with any one feature of the four possible features.

Although mathematically a set may be an empty set, the term set used in this disclosure is a nonempty set. Set B is a subset of set A if every element of set B is in set A. Although mathematically a set has an empty subset, a subset of a set is to be interpreted as a non-empty subset in this disclosure. For example, for set A={subcarrier1, subcarrier2}, the subsets are {subcarrier1}, {subcarrier2} and {subcarrier1, subcarrier2}.

In this disclosure, the phrase "based on" may be used equally with "based at least on" and what follows "based on" or "based at least on" indicates an example of one of plurality of useful alternatives that may be used in an embodiment in this disclosure. The phrase "in response to" may be used equally with "in response at least to" and what follows "in response to" or "in response at least to" indicates an example of one of plurality of useful alternatives that may be used in an embodiment in this disclosure. The phrase "depending on" may be used equally with "depending at least on" and what follows "depending on" or "depending at least on" indicates an example of one of plurality of useful alternatives that may be used in an embodiment in this disclosure. The phrases "employing" and "using" and "employing at least" and "using at least" may be used equally in this in this disclosure and what follows "employing" or "using" or "employing at least" or "using at least" indicates an example of one of plurality of useful alternatives that may be used in an embodiment in this disclosure.

The example embodiments disclosed in this disclosure may be implemented using a modular architecture comprising a plurality of modules. A module may be defined in terms of one or more functions and may be connected to one or more other elements and/or modules. A module may be implemented in hardware, software, firmware, one or more biological elements (e.g., an organic computing device and/or a neurocomputer) and/or a combination thereof and/or alike. Example implementations of a module may be as software code configured to be executed by hardware and/or a modeling and simulation program that may be coupled with hardware. In an example, a module may be implemented using general-purpose or special-purpose processors, digital signal processors (DSPs), microprocessors, microcontrollers, application-specific integrated circuits (ASICs), programmable logic devices (PLDs) and/or alike. The hardware may be programmed using machine language, assembly language, high-level language (e.g., Python, FORTRAN, C, C++ or the like) and/or alike. In an example, the function of a module may be achieved by using a combination of the mentioned implementation methods.

What is claimed is:

1. A method comprising:

receiving, by a wireless device, configuration parameters comprising:

first random access parameters associated with beam failure recovery; and second random access parameters;

initiating, in response to detecting a beam failure on a primary cell and based on the first random access parameters, a first random access process on a first bandwidth part (BWP) of the primary cell;

stopping the first random access process in response to triggering consistent listen-before-talk (LBT) failure for the primary cell;

switching from the first BWP to a second BWP of the primary cell as an active BWP; and initiating a second random access process on the second BWP for consistent LBT failure recovery and based on the second random access parameters.

2. The method of claim 1, wherein:

the second BWP is configured with random access occasions; and the switching from the first BWP to a second BWP is based on the second BWP being configured with the random access occasions.

3. The method of claim 1, wherein the first random access parameters indicate random access resources for a beam failure recovery random access process.

4. The method of claim 1, wherein:

the configuration parameters comprise a first parameter indicating a first number of beam failure instances that triggers beam failure recovery; and the initiating the first random access process is based on a beam failure instance indication counter reaching the first number.

5. The method of claim 1, wherein:

the configuration parameters comprise a first parameter indicating a first number of LBT failure instances that triggers LBT failure recovery; and the triggering the consistent LBT failure is based on an LBT failure indication counter reaching the first number.

6. The method of claim 5, wherein the triggering the consistent LBT failure comprises incrementing the LBT failure indication counter by one based on an LBT failure indication.

7. The method of claim 5, wherein the triggering the consistent LBT failure comprises setting the LBT failure indication counter to zero based on an LBT failure detection timer expiring.

8. The method of claim 1, wherein:

the second random access process comprises transmitting a transport block comprising an LBT failure medium access control (MAC) control element (CE);

the transmitting the transport block is based on a logical channel prioritization procedure; and a first priority, associated with the LBT failure MAC CE, is higher than a second priority associated with data from any logical channel except uplink common control channel (UL-CCCH) logical channel.

9. The method of claim 1, further comprising initiating a third random access process for beam failure recovery after the second random access process is successfully completed.

10. The method of claim 9, wherein:

the third random access process comprises transmitting a transport block comprising a beam failure recovery medium access control (MAC) control element (CE);

the transmitting the transport block is based on a logical channel prioritization procedure; and a first priority, associated with the beam failure recovery MAC CE, is higher than a second priority associated with data from any logical channel except uplink common control channel (UL-CCCH) logical channel.

11. A wireless device comprising:

one or more processors; and memory storing instructions that, when executed by the one or more processors, cause the wireless device to:

receive configuration parameters comprising:

first random access parameters associated with beam failure recovery; and second random access parameters;

initiate, in response to detecting a beam failure on a primary cell and based on the first random access parameters, a first random access process on a first bandwidth part (BWP) of the primary cell;

stop the first random access process in response to triggering consistent listen-before-talk (LBT) failure for the primary cell;

switch from the first BWP to a second BWP of the primary cell as an active BWP; and initiate a second random access process on the second BWP for consistent LBT failure recovery and based on the second random access parameters.

12. The wireless device of claim 11, wherein:

the second BWP is configured with random access occasions; and switching from the first BWP to a second BWP is based on the second BWP being configured with the random access occasions.

13. The wireless device of claim 11, wherein the first random access parameters indicate random access resources for a beam failure recovery random access process.

14. The wireless device of claim 11, wherein:

the configuration parameters comprise a first parameter indicating a first number of beam failure instances that triggers beam failure recovery; and initiating the first random access process is based on a beam failure instance indication counter reaching the first number.

15. The wireless device of claim 11, wherein:

the configuration parameters comprise a first parameter indicating a first number of LBT failure instances that triggers LBT failure recovery; and the triggering the consistent LBT failure is based on an LBT failure indication counter reaching the first number.

16. The wireless device of claim 15, wherein the triggering the consistent LBT failure comprises incrementing the LBT failure indication counter by one based on an LBT failure indication.

17. The wireless device of claim 15, wherein the triggering the consistent LBT failure comprises setting the LBT failure indication counter to zero based on an LBT failure detection timer expiring.

18. The wireless device of claim 11, wherein:

the second random access process comprises transmitting a transport block comprising an LBT failure medium access control (MAC) control element (CE);

the transmitting the transport block is based on a logical channel prioritization procedure; and a first priority, associated with the LBT failure MAC CE, is higher than a second priority associated with data from any logical channel except uplink common control channel (UL-CCCH) logical channel.

19. The wireless device of claim 11, wherein the instructions, when executed by the one or more processors, further cause the wireless device to initiate a third random access process for beam failure recovery after the second random access process is successfully completed.

20. The wireless device of claim 19, wherein:

the third random access process comprises transmitting a transport block comprising a beam failure recovery medium access control (MAC) control element (CE);

the transmitting the transport block is based on a logical channel prioritization procedure; and a first priority, associated with the beam failure recovery MAC CE, is higher than a second priority associated with data from any logical channel except uplink common control channel (UL-CCCH) logical channel.

* * * * *